(12) United States Patent
O'Leary et al.

(10) Patent No.: US 12,380,653 B2
(45) Date of Patent: Aug. 5, 2025

(54) DEVICES, METHODS, AND GRAPHICAL USER INTERFACES FOR MAPS

(71) Applicant: Apple Inc., Cupertino, CA (US)

(72) Inventors: Fiona P. O'Leary, Mountain View, CA (US); Matthew J. Sundstrom, Campbell, CA (US); Stephen O. Lemay, Palo Alto, CA (US); Julian K. Missig, Burlingame, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/655,521

(22) Filed: Mar. 18, 2022

(65) Prior Publication Data
US 2022/0301264 A1 Sep. 22, 2022

Related U.S. Application Data

(60) Provisional application No. 63/164,296, filed on Mar. 22, 2021.

(51) Int. Cl.
*G06T 19/00* (2011.01)
*G01C 21/36* (2006.01)
(Continued)

(52) U.S. Cl.
CPC ........ *G06T 19/003* (2013.01); *G01C 21/3664* (2013.01); *G06F 3/013* (2013.01);
(Continued)

(58) Field of Classification Search
CPC . G06T 19/003; G06T 19/006; G06T 2200/02; G01C 21/3664; G06F 3/013; G06F 3/04883; G06F 3/04815; G06F 3/04886; G06F 3/011; G06F 3/017; G06F 3/04842
See application file for complete search history.

(56) References Cited

U.S. PATENT DOCUMENTS 6,323,846 B1  11/2001  Westerman et al.
6,570,557 B1   5/2003  Westerman et al.
(Continued)

FOREIGN PATENT DOCUMENTS

CN  104981681 A  * 10/2015 ............. G01C 21/34
CN  117043722 A  * 11/2023 ......... G01C 21/3664
(Continued)

OTHER PUBLICATIONS

International Search Report received for PCT Patent Application No. PCT/US2022/071228, mailed on Aug. 25, 2022, 6 pages.
(Continued)

*Primary Examiner* — Chante E Harrison
(74) *Attorney, Agent, or Firm* — Kubota & Basol LLP

(57) ABSTRACT

In some embodiments, an electronic device concurrently presents a navigation user interface element with a respective physical location designated and a content element including content corresponding to the respective physical location. In some embodiments, an electronic device presents navigation from a first physical location to a second physical location with reduced visual prominence in a content element in response to an input corresponding to a request to present content corresponding to the second physical location.

48 Claims, 34 Drawing Sheets

(51) Int. Cl.
*G06F 3/01* (2006.01)
*G06F 3/04815* (2022.01)
*G06F 3/04883* (2022.01)

(52) U.S. Cl.
CPC ........ *G06F 3/04815* (2013.01); *G06T 19/006* (2013.01); *G06F 3/04883* (2013.01); *G06T 2200/24* (2013.01)

(56) References Cited

U.S. PATENT DOCUMENTS

| | | |
|---|---|---|
| 6,677,932 B1 | 1/2004 | Westerman |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,436,872 B2 * | 5/2013 | Wright .................... G06T 17/05 345/633 |
| 8,479,122 B2 | 7/2013 | Hotelling et al. |
| 9,164,975 B2 * | 10/2015 | Milewski .............. G06F 40/169 |
| 9,196,072 B2 * | 11/2015 | Oh ........................ G06T 13/40 |
| 9,348,458 B2 | 5/2016 | Hotelling et al. |
| 9,437,047 B2 * | 9/2016 | Chang ..................... G06T 17/05 |
| 9,933,937 B2 | 4/2018 | Lemay et al. |
| 10,768,421 B1 | 9/2020 | Rosenberg et al. |
| 11,861,136 B1 * | 1/2024 | Faulkner ............... G06F 1/1694 |
| 11,922,588 B2 * | 3/2024 | Fillhardt ................. G06F 16/29 |
| 2002/0015024 A1 | 2/2002 | Westerman et al. |
| 2005/0190059 A1 | 9/2005 | Wehrenberg |
| 2006/0017692 A1 | 1/2006 | Wehrenberg et al. |
| 2006/0033724 A1 | 2/2006 | Chaudhri et al. |
| 2006/0197753 A1 | 9/2006 | Hotelling |
| 2008/0186255 A1 * | 8/2008 | Cohen .................. G06F 3/0321 345/179 |
| 2009/0049408 A1 | 2/2009 | Naaman et al. |
| 2009/0319181 A1 | 12/2009 | Khosravy et al. |
| 2010/0115459 A1 | 5/2010 | Kinnunen et al. |
| 2011/0164163 A1 * | 7/2011 | Bilbrey ................ H04N 23/632 348/E5.022 |
| 2012/0194547 A1 | 8/2012 | Johnson et al. |
| 2013/0263016 A1 * | 10/2013 | Lehtiniemi ............ G06Q 30/02 715/753 |
| 2014/0063058 A1 * | 3/2014 | Fialho ................... G06T 19/006 345/633 |
| 2015/0262428 A1 | 9/2015 | Tatzgern et al. |
| 2016/0127690 A1 * | 5/2016 | Kaehler ................ G06V 20/52 348/143 |
| 2016/0133044 A1 | 5/2016 | Lynch |
| 2017/0147180 A1 * | 5/2017 | Yoon .................. G01C 21/3638 |
| 2018/0136815 A1 | 5/2018 | Tomizuka et al. |
| 2018/0218214 A1 * | 8/2018 | Pestun ................. G06V 20/188 |
| 2019/0325654 A1 * | 10/2019 | Stisser .................... A63F 13/26 |
| 2021/0173340 A1 * | 6/2021 | Kim ...................... G03H 1/2249 |
| 2021/0248674 A1 * | 8/2021 | Ogunbunmi ........... G06T 11/60 |
| 2021/0272367 A1 * | 9/2021 | Richter .................... G06F 3/011 |
| 2022/0292783 A1 * | 9/2022 | Jayaram ..................... G06T 7/33 |
| 2022/0292784 A1 * | 9/2022 | Jayaram ................. G06Q 50/01 |
| 2022/0292785 A1 * | 9/2022 | Jayaram .................. G06F 3/012 |
| 2022/0295032 A1 * | 9/2022 | Jayaram ................. G06V 20/20 |
| 2022/0295040 A1 * | 9/2022 | Jayaram .................. G06T 7/579 |
| 2022/0295139 A1 * | 9/2022 | Jayaram .............. H04N 13/183 |
| 2023/0260240 A1 * | 8/2023 | Jayaram .............. H04N 13/243 |
| 2023/0377295 A1 * | 11/2023 | Angevine ............. G06Q 50/16 |
| 2024/0403080 A1 | 12/2024 | Laurita et al. |
| 2024/0404207 A1 | 12/2024 | Laurita et al. |

FOREIGN PATENT DOCUMENTS

| | | | |
|---|---|---|---|
| EP | 3688726 B1 * | 8/2023 | ............ G06F 16/29 |
| WO | 2013/169849 A2 | 11/2013 | |
| WO | 2014/105276 A1 | 7/2014 | |

OTHER PUBLICATIONS

International Search Report received for PCT Patent Application No. PCT/US2024/032140, mailed on Sep. 10, 2024, 4 pages.
International Search Report received for PCT Patent Application No. PCT/US2024/032423, mailed on Sep. 25, 2024, 5 pages.

* cited by examiner

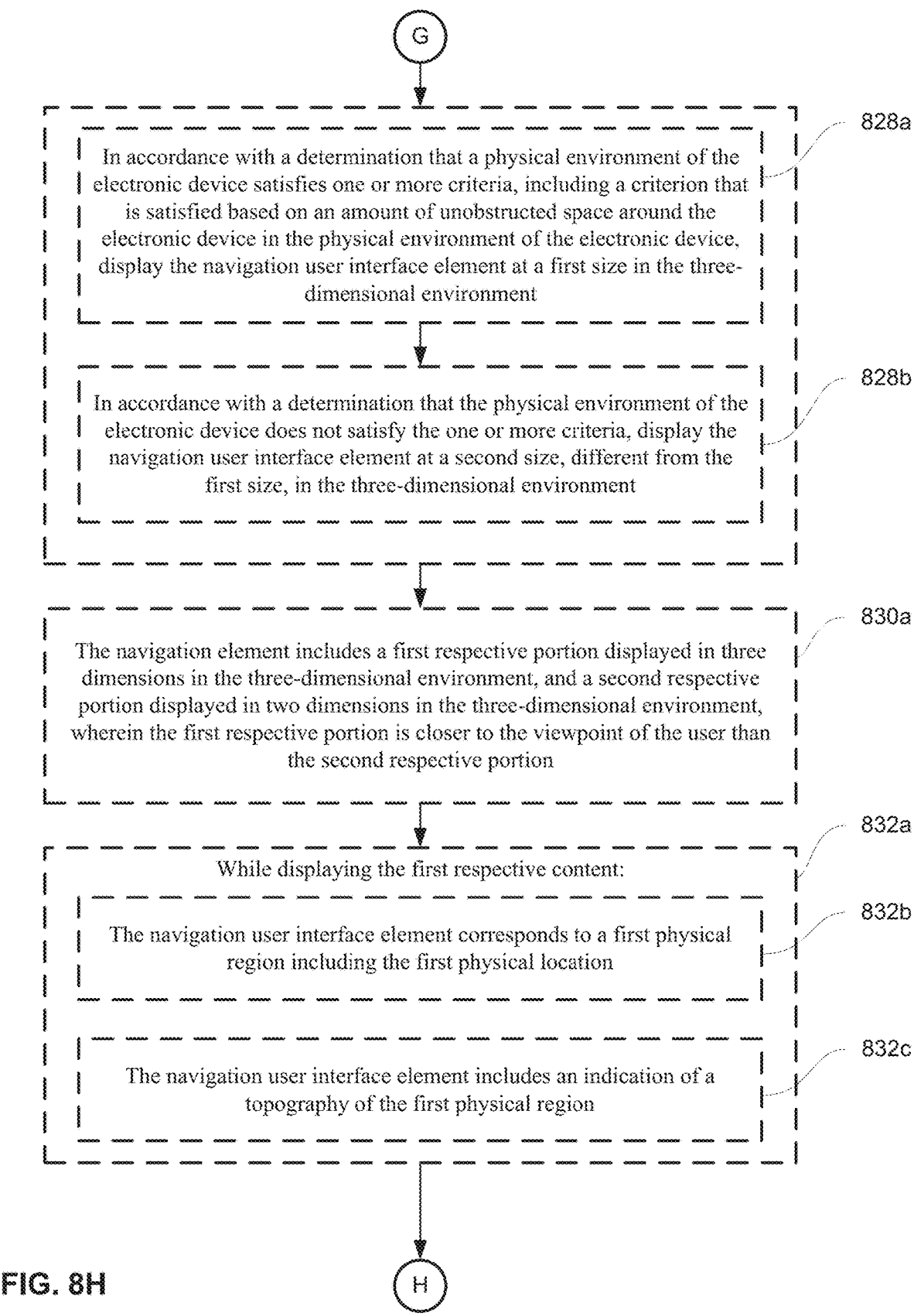

DEVICES, METHODS, AND GRAPHICAL USER INTERFACES FOR MAPS

CROSS-REFERENCE TO RELATED APPLICATIONS

This application claims the benefit of U.S. Provisional Application No. 63/164,296, filed Mar. 22, 2021, the content of which is incorporated herein by reference in its entirety for all purposes.

TECHNICAL FIELD

This relates generally to computer systems with a display generation component and one or more input devices that present graphical user interfaces, including but not limited to electronic devices that present graphical user interfaces, via the display generation component, including maps.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects include digital images, video, text, icons, and control elements such as buttons and other graphics.

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious and error-prone, create a significant cognitive burden on a user, and detract from the experience with the virtual/augmented reality environment. In addition, these methods take longer than necessary, thereby wasting energy. This latter consideration is particularly important in battery-operated devices.

SUMMARY

Accordingly, there is a need for computer systems with improved methods and interfaces for providing computer generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for navigating user interfaces. Such methods and interfaces may complement or replace conventional methods for interacting with a graphical user interface. Such methods and interfaces reduce the number, extent, and/or the nature of the inputs from a user and produce a more efficient human-machine interface.

In some embodiments, an electronic device concurrently presents content corresponding to a first physical location at a first location in a user interface and a navigation user interface element with an indication of the first physical location. In some embodiments, in response to an input corresponding to a request to display content corresponding to a second physical location, the electronic device displays navigation from the first physical location to the second physical location with a reduced degree of visual prominence.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 8A-8J is a flowchart illustrating a method of concurrently presenting a navigation user interface element with a respective physical location designated and a content element including content corresponding to the respective physical location in accordance with some embodiments.

DESCRIPTION OF EMBODIMENTS

Figure 1:
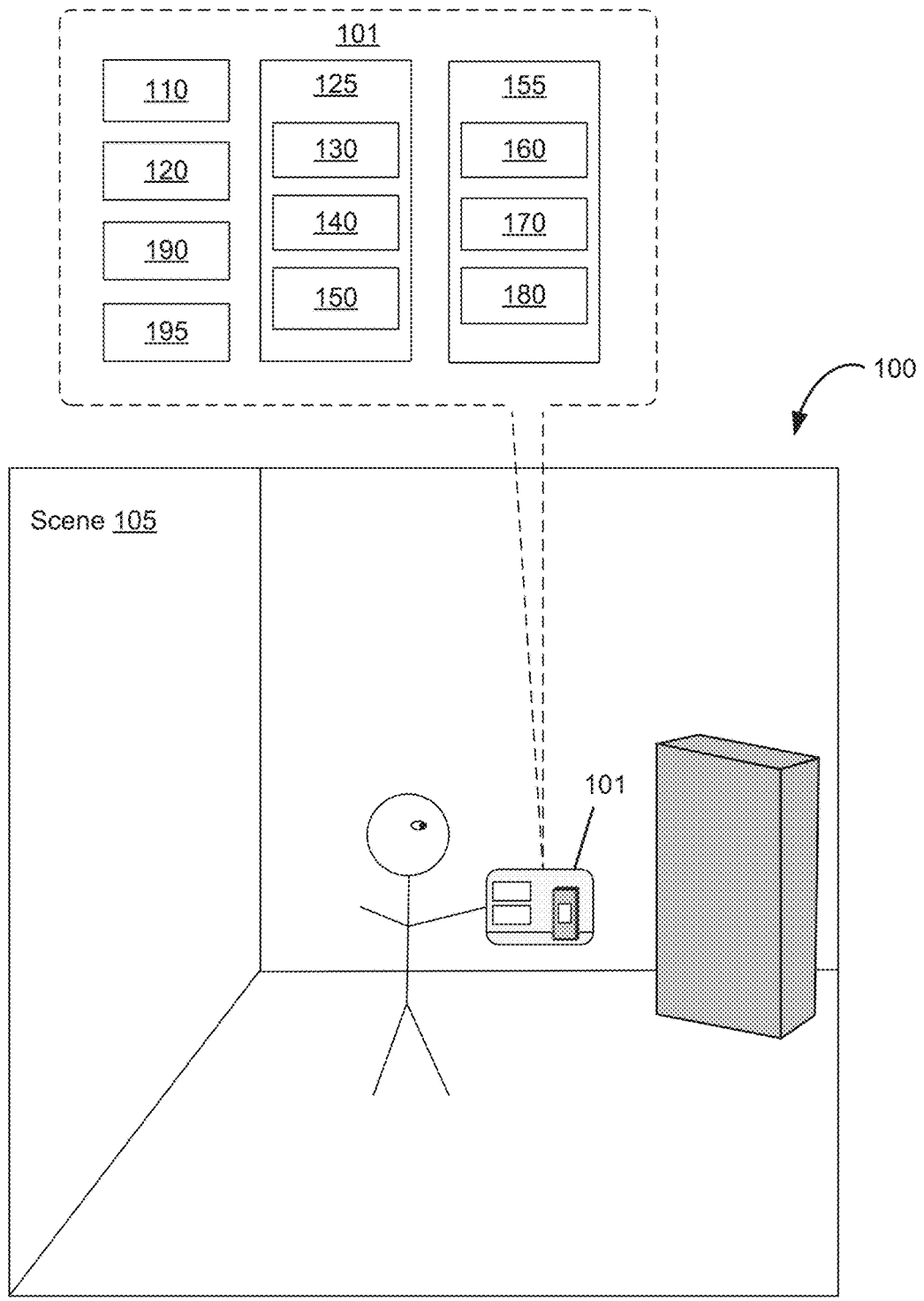
FIG. 1 is a block diagram illustrating an operating environment of a computer system for providing XR experiences in accordance with some embodiments.

The present disclosure relates to user interfaces for providing a computer generated reality (XR) experience to a user, in accordance with some embodiments.

The systems, methods, and GUIs described herein provide improved ways for an electronic device to present content corresponding to physical locations indicated in a navigation user interface element.

In some embodiments, a computer system concurrently displays, in a three-dimensional environment, a navigation user interface element with a first physical location designated and first content corresponding to the first physical location. In some embodiments, the navigation user interface element is displayed between the first content and a viewpoint of the user in the three-dimensional environment. In some embodiments, in response to an input corresponding to a request to present content corresponding to a second physical location, the electronic device ceases display of the first content and displays the second content at the location in the three-dimensional environment at which the first content had been displayed. Presenting the second content at the same location in the three-dimensional environment at which the first content was displayed provides an efficient way of browsing content corresponding to physical locations, which additional reduces power usage and improves battery life of the electronic device by enabling the user to use the electronic device more quickly and efficiently (e.g., without the user having to direct their attention to a different region of the three-dimensional environment or provide an input to continue displaying the content at the same location).

In some embodiments, a computer system concurrently displays a navigation user interface element and a content element including content corresponding to a first physical location represented by the navigation user interface element. In some embodiments, the electronic device displays the first content with a first degree of visual prominence. In some embodiments, while detecting a user input corresponding to a request to display content corresponding to a second physical location, the electronic device displays, in the content element, navigation from the first physical location to the second physical location with a reduced degree of visual prominence relative to the first degree of visual prominence. After displaying the navigation from the first physical location to the second physical location, the electronic device optionally displays the second content with a degree of visual prominence that is greater than the reduced degree of visual prominence relative to the first degree of visual prominence. Decreasing the visual prominence of the content element while detecting the user input corresponding to the request to designate the second location provides an efficient way of indicating to the user that designating the second location will update the content element, which additionally reduces power usage and improves battery life of the electronic device by enabling the user to use the electronic device more quickly and efficiently and reduces errors in usage which would have to be corrected with further user inputs and reduces the need for the electronic device to fully render content corresponding to the first location and/or intermediate locations between the first and second location (e.g., while the visual indication of the location corresponding to the content is being moved).

FIGS. 1-6 provide a description of example computer systems for providing XR experiences to users. FIGS. 7A-7I illustrate examples of how an electronic device provides for navigation of a user interface in accordance with detection of a gaze of a user in accordance with some embodiments. FIGS. 8-9 are flow diagrams of methods of providing navigation in accordance with detection of gaze of a user, in accordance with various embodiments. The user interfaces in FIGS. 7A-7I are used to illustrate the processes in FIGS. 8-9, respectively.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with CRG content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operation environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
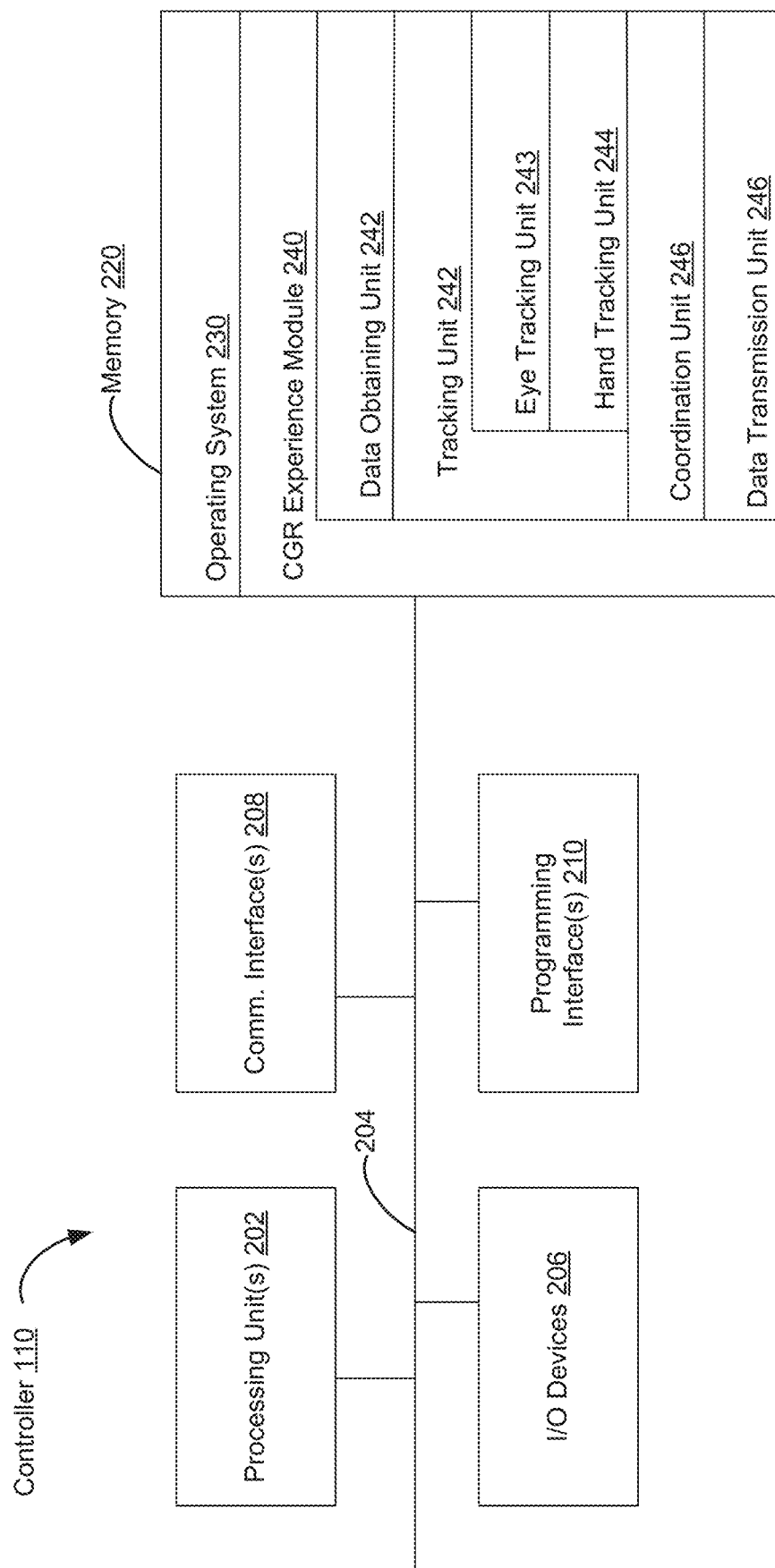
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
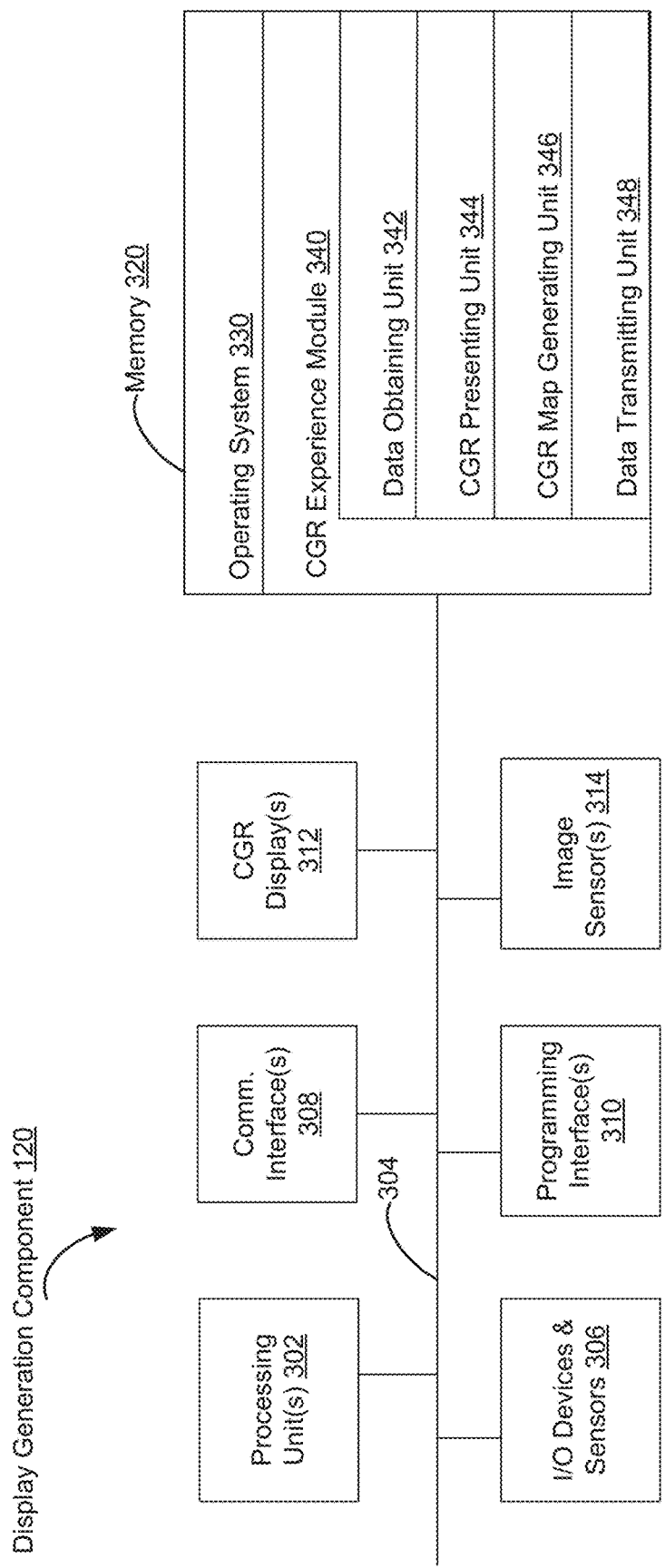
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer generated objects can be placed to generate the computer generated reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
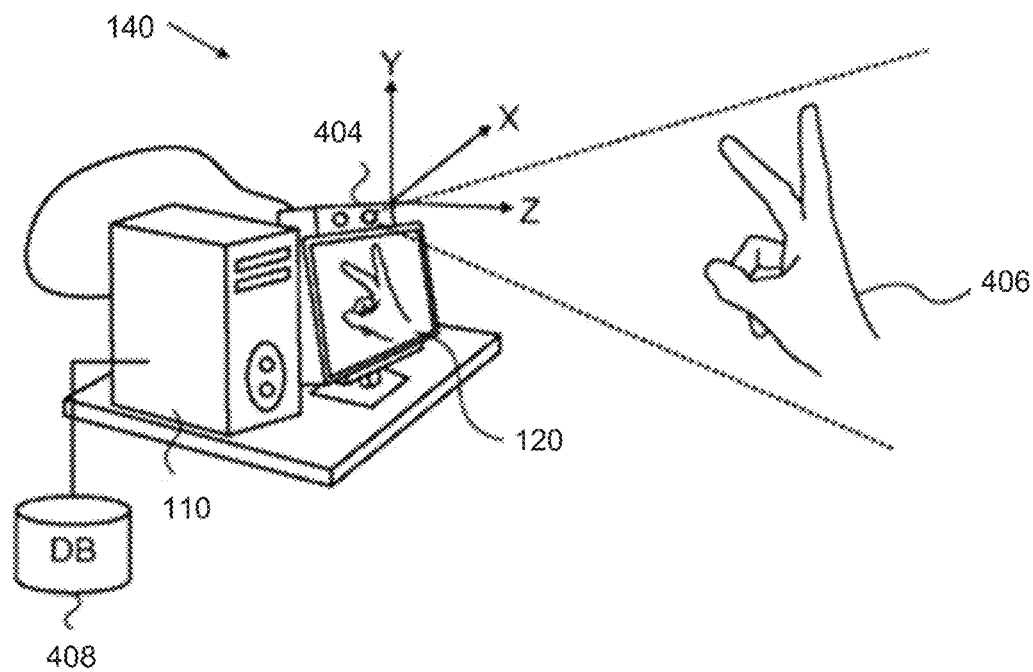
FIG. 4 is a block diagram illustrating a hand tracking unit of a computer system that is configured to capture gesture inputs of the user in accordance with some embodiments.
Figure 4:
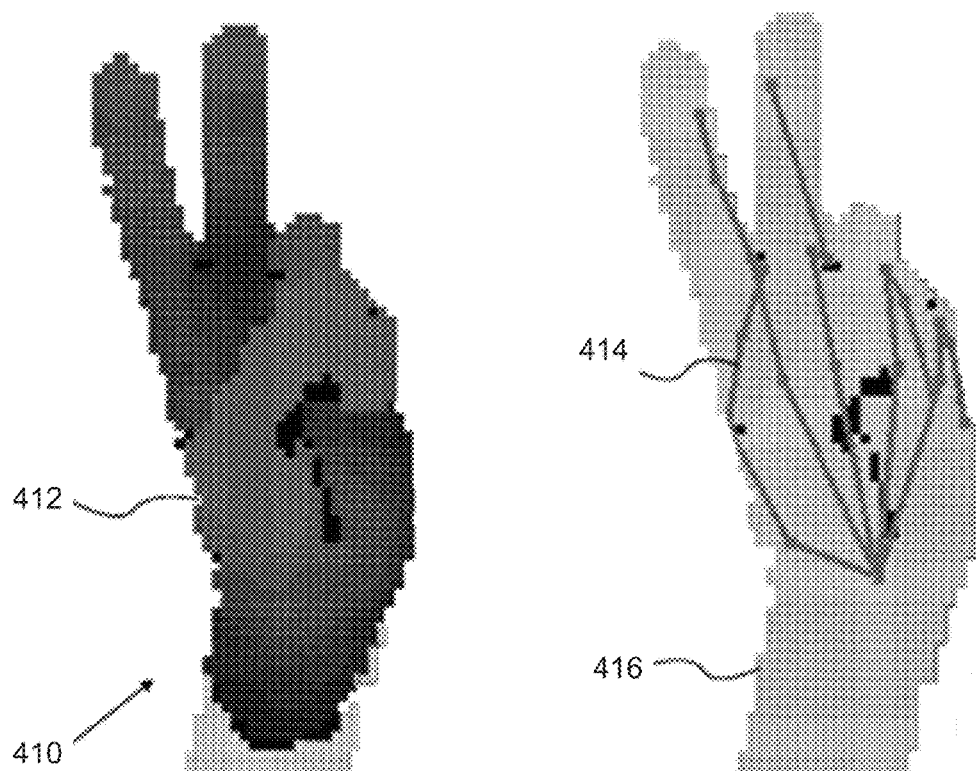

FIG. 4 is a schematic, pictorial illustration of an example embodiment of the hand tracking device 140. In some embodiments, hand tracking device 140 (FIG. 1) is controlled by hand tracking unit 243 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands)

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 440, some or all of the processing functions of the controller may be performed by a suitable microprocessor and software or by dedicated circuitry within the housing of the hand tracking device 402 or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
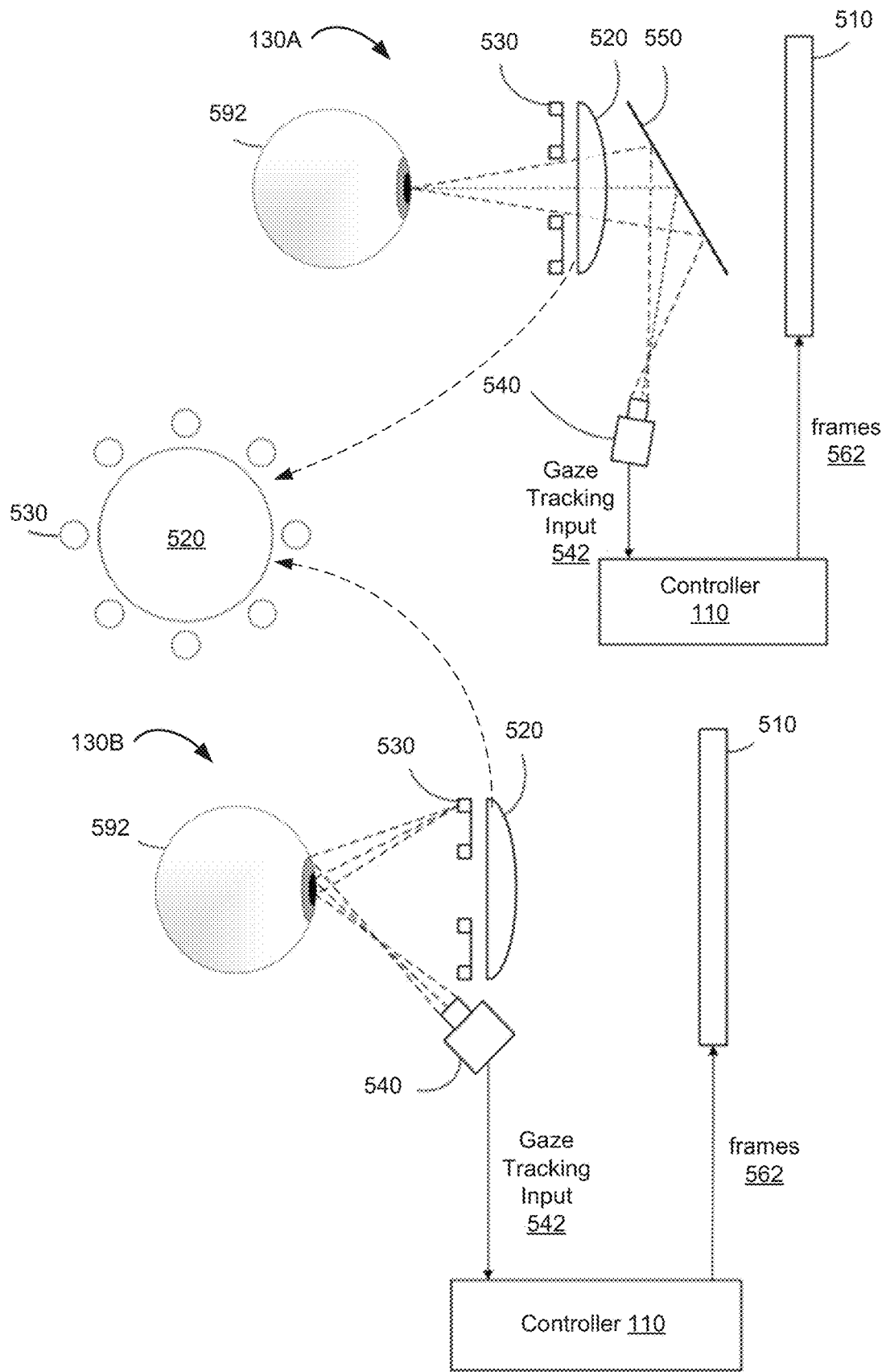
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 245 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, a gaze tracking device 130 includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The gaze tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g. 850 nm) and a camera 540 that operates at a different wavelength (e.g. 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6A:
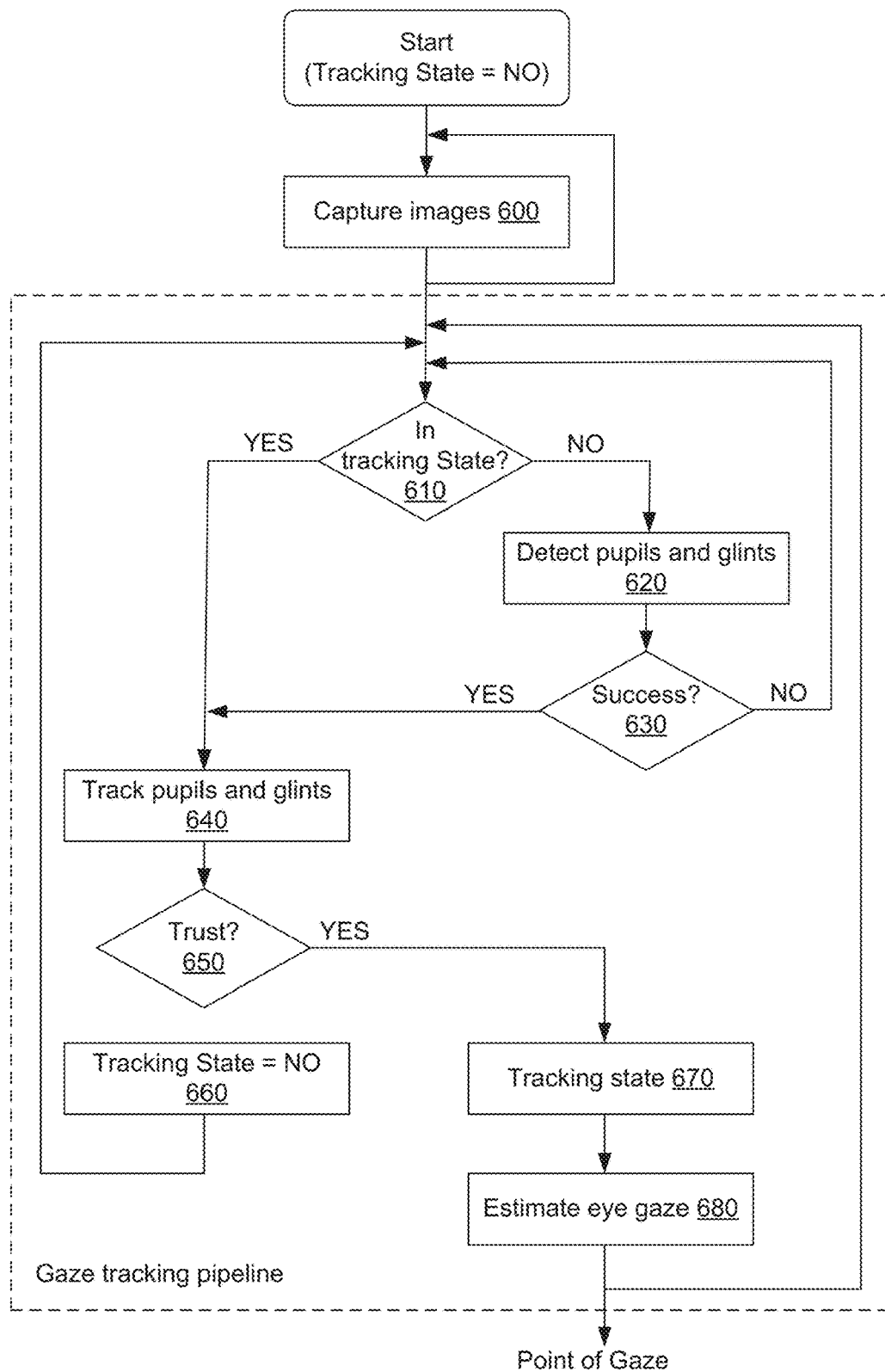
FIG. 6A is a flowchart illustrating a glint-assisted gaze tracking pipeline in accordance with some embodiments.

FIG. 6A illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6A, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6A is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Figure 6B:
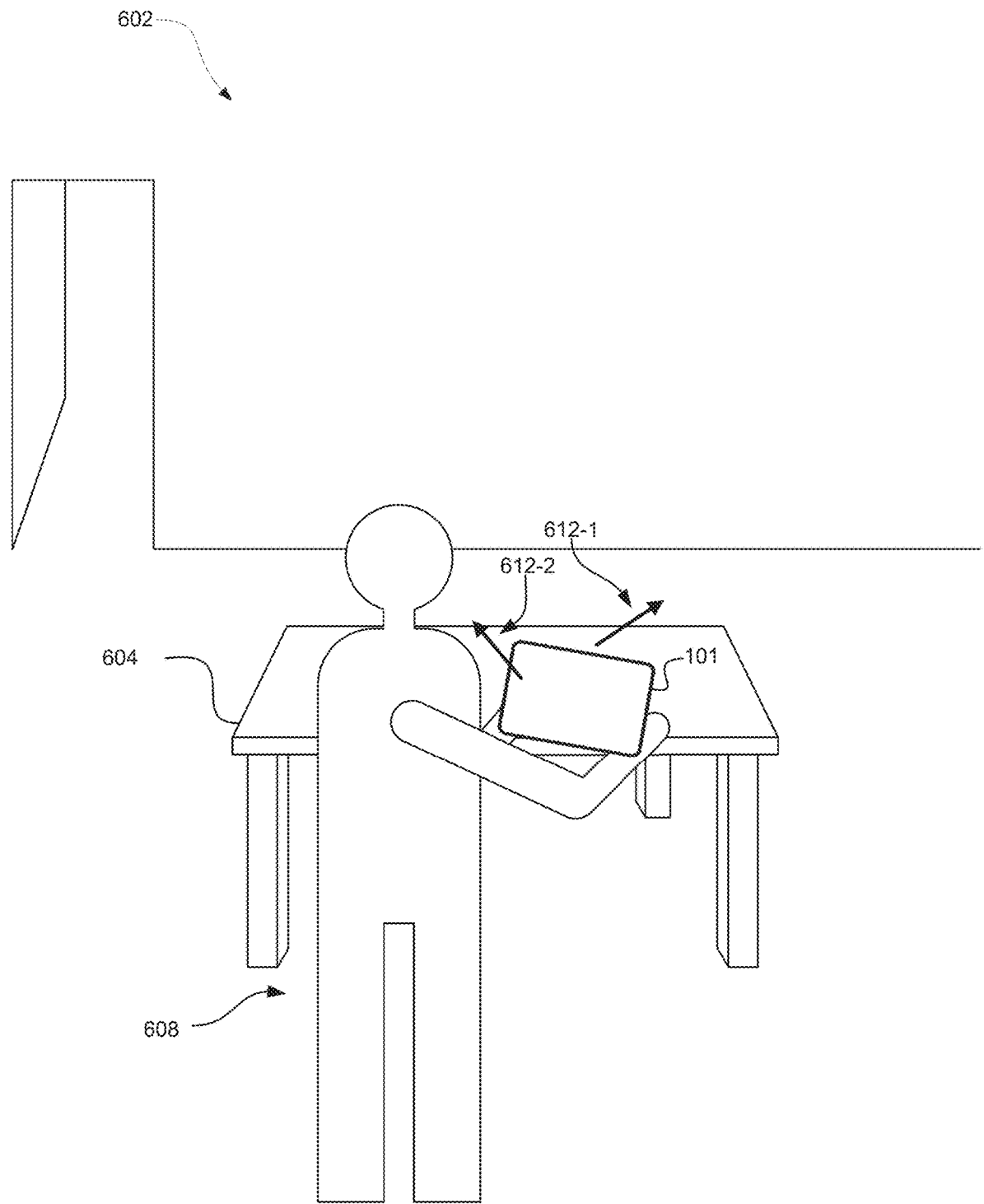
FIG. 6B illustrates an exemplary environment of an electronic device providing a XR experience in accordance with some embodiments.

FIG. 6B illustrates an exemplary environment of an electronic device 101 providing a XR experience in accordance with some embodiments. In FIG. 6B, real world environment 602 includes electronic device 101, user 608, and a real world object (e.g., table 604). As shown in FIG. 6B, electronic device 101 is optionally mounted on a tripod or otherwise secured in real world environment 602 such that one or more hands of user 608 are free (e.g., user 608 is optionally not holding device 101 with one or more hands). As described above, device 101 optionally has one or more groups of sensors positioned on different sides of device 101. For example, device 101 optionally includes sensor group 612-1 and sensor group 612-2 located on the "back" and "front" sides of device 101, respectively (e.g., which are able to capture information from the respective sides of device 101). As used herein, the front side of device 101 is the side that is facing user 608, and the back side of device 101 is the side facing away from user 608.

In some embodiments, sensor group 612-2 includes an eye tracking unit (e.g., eye tracking unit 245 described above with reference to FIG. 2) that includes one or more sensors for tracking the eyes and/or gaze of the user such that the eye tracking unit is able to "look" at user 608 and track the eye(s) of user 608 in the manners previously described. In some embodiments, the eye tracking unit of device 101 is able to capture the movements, orientation, and/or gaze of the eyes of user 608 and treat the movements, orientation, and/or gaze as inputs.

In some embodiments, sensor group 612-1 includes a hand tracking unit (e.g., hand tracking unit 243 described above with reference to FIG. 2) that is able to track one or more hands of user 608 that are held on the "back" side of device 101, as shown in FIG. 6B. In some embodiments, the hand tracking unit is optionally included in sensor group 612-2 such that user 608 is able to additionally or alternatively hold one or more hands on the "front" side of device 101 while device 101 tracks the position of the one or more hands. As described above, the hand tracking unit of device 101 is able to capture the movements, positions, and/or gestures of the one or more hands of user 608 and treat the movements, positions, and/or gestures as inputs.

In some embodiments, sensor group 612-1 optionally includes one or more sensors configured to capture images of real world environment 602, including table 604 (e.g., such as image sensors 404 described above with reference to FIG. 4). As described above, device 101 is able to capture images of portions (e.g., some or all) of real world environment 602 and present the captured portions of real world environment 602 to the user via one or more display generation components of device 101 (e.g., the display of device 101, which is optionally located on the side of device 101 that is facing the user, opposite of the side of device 101 that is facing the captured portions of real world environment 602).

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of an computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

Similarly, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7I illustrate examples of how an electronic device concurrently presents a navigation user interface element with a respective physical location designated and a content element including content corresponding to the respective physical location in accordance with some embodiments.

Figure 7A:
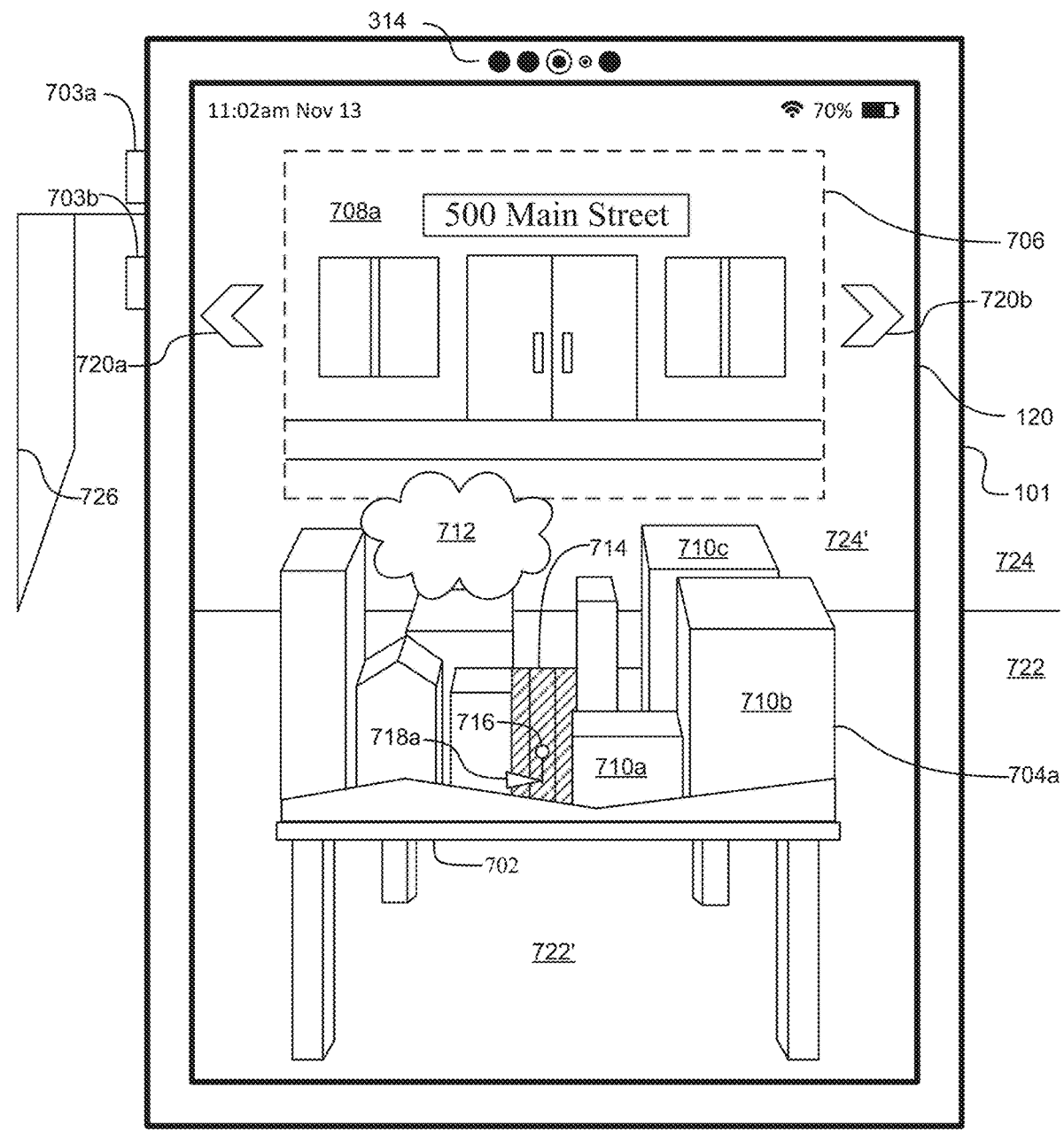
FIGS. 7A-7I illustrate examples of how an electronic device concurrently presents a navigation user interface element with a respective physical location designated and a content element including content corresponding to the respective physical location in accordance with some embodiments.

FIG. 7A illustrates electronic device 101 displaying, via display generation component 120, a three-dimensional environment. It should be understood that, in some embodiments, electronic device 101 utilizes one or more techniques described with reference to FIGS. 7A-7I in a two-dimensional environment or user interface without departing from the scope of the disclosure. As described above with reference to FIGS. 1-6, the electronic device 101 optionally includes display generation component 120 (e.g., touch screen) and a plurality of image sensors 314. The image sensors optionally include one or more of a visible light camera, an infrared camera, a depth sensor, or any other sensor the electronic device 101 would be able to use to capture one or more images of a user or a part of the user while the user interacts with the electronic device 101. In some embodiments, display generation component 120 is a touch screen that is able to detect gestures and movements of a user's hand. In some embodiments, the user interfaces described below could also be implemented on a head-mounted display that includes a display generation component that displays the user interface to the user, and sensors to detect the physical environment and/or movements of the user's hands (e.g., external sensors facing outwards from the user), and/or gaze of the user (e.g., internal sensors facing inwards towards the face of the user).

In FIG. 7A, the electronic device 101 presents a three-dimensional environment that includes a navigation user interface element 704a and a content user interface element 706. The three-dimensional environment further includes representations of real objects in the physical environment of electronic device 101, such as representation 702 of real table, representation 722' of floor 722, and representation 724' of wall 724. The physical environment of the electronic device 101 further includes doorway 726.

As mentioned above, the three-dimensional environment presented by the electronic device 101 includes a navigation user interface element 704a displayed between the content user interface element 706 and a viewpoint of the user in the three-dimensional environment. In some embodiments, the viewpoint of the user corresponds to a location in the three-dimensional environment from which the three-dimensional environment is presented by the electronic device 101. The navigation user interface element 704a includes representations 710a-c of physical objects (e.g., buildings) and a representation 714 of a road located in a physical region represented by the navigation user interface element 704a. In some embodiments, the navigation user interface element 704a further includes representations of other physical objects, such as infrastructure, landmarks, landforms, plants, and the like. In some embodiments, the navigation user interface element 704a is a (at least partially) three-dimensional map of a physical region represented by the map.

The navigation user interface element 704a further includes an indication 712 of weather (e.g., a cloud). The indication 712 of the weather illustrates the weather condition currently being experienced at a physical location corresponding to the location of the indication 712 within the navigation user interface element 704a. For example, if the physical cloud represented by indication 712 moves, the electronic device 101 updates the position of indication 712 in accordance with the movement of the physical cloud. As another example, if the weather at the physical location corresponding to the location of indication 712 within the navigation user interface element 704a becomes rainy, the electronic device 101 updates the indication 712 (or more generally navigation user interface element 704a) to include representations of rain. As shown in FIG. 7A, the navigation user interface element 704a illustrates the topography of the physical region represented by the navigation user interface element 704a (e.g., by displaying the cross-section of such topography (e.g., elevation changes, etc.) at the edges and/or in the inner region of the navigation user interface element 704a).

The navigation user interface element 704a further includes an indication 716 of a respective location corresponding to the content 708a presented in content user interface element 706, and a field of view indicator 718a that indicates the field of view corresponding to content 708a. For example, the content 708a is an image (or video) captured from the physical location corresponding to the location of indication 716 within the navigation user interface element 704a with boundaries that correspond to the field of view indictor 718a. As shown in FIG. 7A, the electronic device 101 presents the navigation user interface element 704a so that the navigation user interface element appears to be resting on the surface of the representation 702 of real table in the physical environment of the electronic device 101. In some embodiments, rather than displaying the navigation user interface element 704a such that it appears to be resting on a representation of a surface in the physical environment of the electronic device 101, the electronic device 101 displays the navigation user interface element 704a at a location in the three-dimensional environment between the viewpoint of the user and the content user interface element 706 that is away from any of the representations of real (e.g., horizontal) surfaces in the three-dimensional environment (e.g., floating in space in the three-dimensional environment, not connected to a surface in the three-dimensional environment).

As shown in FIG. 7A, the electronic device 101 presents selectable options 720a and 720b that, when selected, cause the electronic device 101 to adjust the field of view of the content in the content user interface element 706 by translating and/or rotating the location from which (or of which) the content was taken. In some embodiments, in response to an input directed to option 720a or 720b, the electronic device 101 updates the content in the content user interface element 706 and updates the position and/or orientation of indication 716 and field of view indicator 718a in the navigation user interface element 704a, as will be described in more detail below with reference to FIGS. 7C-7D.

In some embodiments, the navigation user interface element 704a further includes one or more indications of the physical location(s) of one or more other electronic devices in communication with electronic device 101. For example, the navigation user interface element 704a includes an indication of a second electronic device associated with a user other than the user of the electronic device 101 (e.g., a contact in an address book of the user of the electronic device). In some embodiments, in response to detecting selection of the indication of the second electronic device, the electronic device 101 presents, in the content user interface element 706, an image captured by the second electronic device. For example, the image is a live video feed from a camera in communication with the second electronic device.

In some embodiments, the navigation user interface element 704a includes, in addition to a three-dimensional portion similar to the navigation user interface element 704a illustrated in FIG. 7A, a two-dimensional portion. In some embodiments, the two-dimensional portion of the navigation user interface element 704a is displayed, from the perspective of the viewpoint of the user, behind the three-dimensional portion of the navigation user interface element. For example, the navigation user interface element 704a is folded and/or curved upward at the rear of the navigation user interface element 704a (e.g., the portion of the navigation user interface element 704a closer to content user interface element 706) so that the two-dimensional portion of the navigation user interface element 704a is displayed at the location in the three-dimensional environment at which the content user interface element 706 is displayed in FIG. 7A. In some embodiments, the physical locations represented by the three-dimensional portion of the navigation user interface element 704a and the physical locations represented by the two-dimensional portion of the navigation user interface element 704a are adjacent to each other in the real world. In some embodiments, in response to a user input to pan the navigation user interface element 704a, the electronic device pans the navigation user interface element 704a in accordance with the user input, including moving one or more representations from the three-dimensional portion of the navigation user interface element 704a to the two-dimensional portion of the navigation user interface element 704a and vice-versa, as appropriate.

As previously described, the content user interface element 706 includes content 708a corresponding to a physical location represented by indication 716 in the navigation user interface element 704a. In some embodiments, the content 708a is an image that was captured at the location represented by indication 716 or, additionally/alternatively, is an image of the location indicated by indication 716. In some embodiments, the edges of the content user interface element 706 are feathered against the rest of the three-dimensional environment. In some embodiments, the boundary of the content user interface element is blurred or blended with the rest of the three-dimensional environment surrounding the content user interface element 706.

Figure 7B:
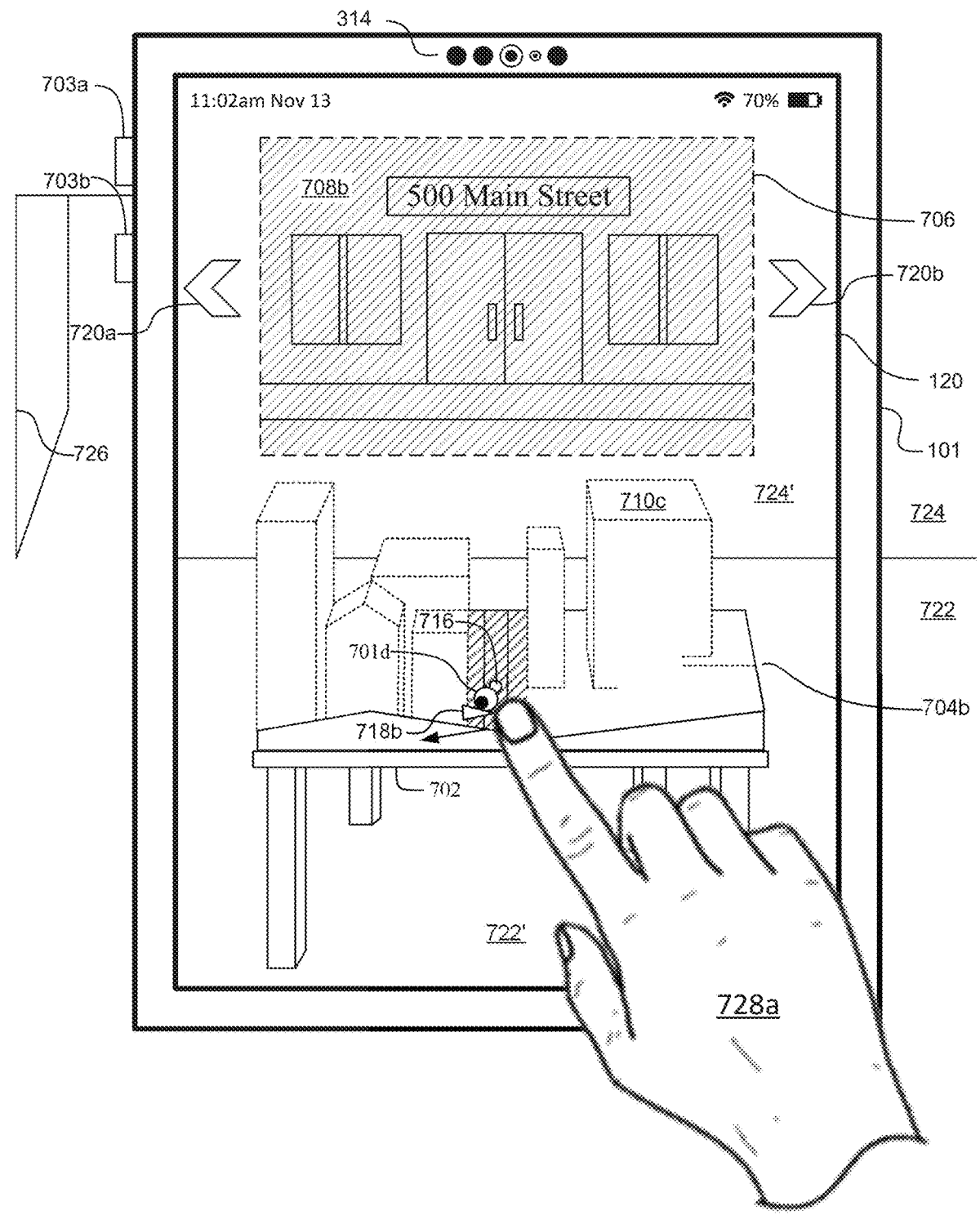

In FIG. 7B, the electronic device 101 detects a user input corresponding to a request to update the content user interface element 706 to present content corresponding to a physical location different from the physical location designated in FIG. 7A. Detecting the input optionally includes concurrently detecting the gaze 701d of the user directed to (e.g., the indication 716 in) the navigation user interface element 704b and detecting a predetermined gesture performed by the hand 728a of the user. In some embodiments, the predetermined gesture is a pinch gesture in which the user moves the thumb of hand 728a to another finger of the hand. In some embodiments, detecting the pinch gesture causes the electronic device 101 to "pick up" the indication 716 so that the user is able to move the indication 716 in accordance with movement of the hand 728a while the user continues to touch their thumb to the other finger of hand 728a. In some embodiments, in response to detecting the user move their thumb away from the other finger of hand 728a, the electronic device 101 "drops" the indication 716 at the location at which indication 716 was displayed when the electronic device 101 detected the user move their thumb away from the finger.

While detecting the input illustrated in FIG. 7B, the electronic device 101 visually de-emphasizes the content user interface element 706 (e.g., including content 708b within the content user interface element 706) relative to the amount of visual emphasis with which the content user interface element 706 was displayed prior to detecting the input (e.g., in FIG. 7A). In some embodiments, visually de-emphasizing the content user interface element 706 includes blurring, fading, darkening, and or increasing the translucency of the content user interface element 706. In some embodiments, the entire content user interface element 706 is de-emphasized. In some embodiments, only the edges of the content user interface element 706 are de-emphasized and a portion of the content user interface element 706 in the center of the content user interface element 706 is not visually de-emphasized. In some embodiments, while the input is being detected, the electronic device 101 displays one or more images corresponding to the intermediate locations of indication 716 with the visual de-emphasis in the content user interface element 706.

In some embodiments, while the input in FIG. 7B is being detected, the electronic device 101 modifies the appearance of the representations (e.g., such as representation 710c) of physical objects (e.g., buildings, infrastructure, plants, other physical objects in the region represented by the navigation user interface element 704b) in the navigation user interface element 704b. Modifying the appearance of the representations of physical objects in the navigation user interface element 704b optionally incudes one or more of fading the three-dimensional representations and/or reducing the height of or flattening the representations. In some embodiments, the electronic device 101 blurs, fades, flattens, or ceases display of one or more representations at the location of (or within a threshold distance, such as 1, 2, 5, 10, 20 inches of) the hand 728a of the user. For example, in FIG. 7B, the electronic device 101 ceases display of representations 710a and 710b illustrated in FIG. 7A because these representations 710a and 710b were displayed at the location in FIG. 7A at which the hand 728a is located in FIG. 7B. In some embodiments, the electronic device 101 pans the navigation user interface element 704b as the user provides the input and ceases display of one or more representations of physical objects intersected by the boundary of the navigation user interface element 704b (e.g., representations that do not "fit" within the boundary of the navigation user interface element 704b).

Figure 7C:
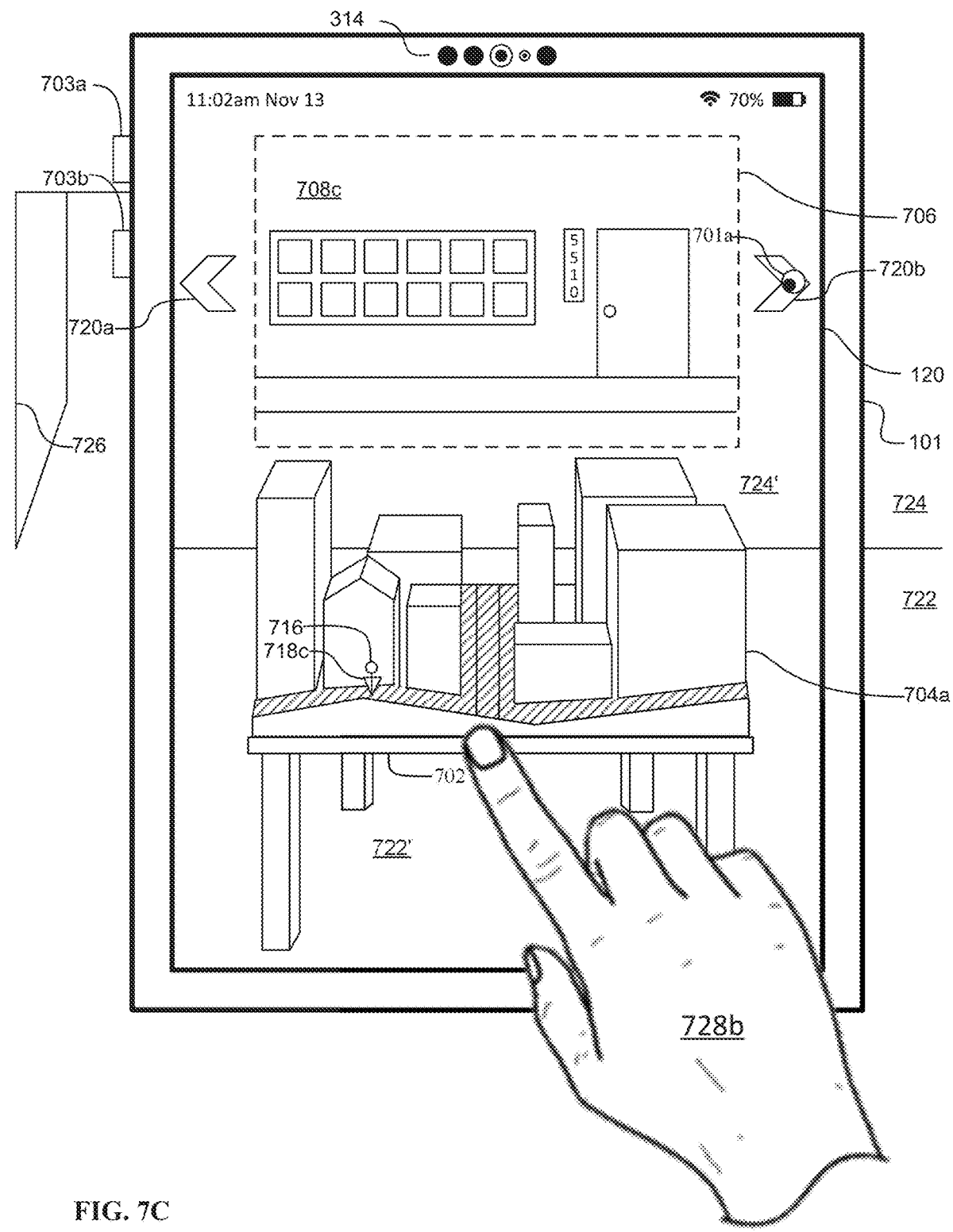

In response to the input illustrated in FIG. 7B, the electronic device 101 updates the three-dimensional environment to include content in the content user interface element 706 that corresponds to the updated location of indication 716 in navigation user interface element 704a, as shown in FIG. 7C. In FIG. 7C, the location of the indication 716 and field of view indicator 713c are updated in the navigation user interface element 704a in accordance with the input illustrated in FIG. 7B, and the content user interface element 706 is updated to include content 708c corresponding to the location of indication 716 in navigation user interface element 704a and field of view indicator 718c. The locations of the content user interface element 706 and the navigation user interface element 704b in the three-dimensional environment remain the same as shown in FIG. 7A prior to detecting the input in FIG. 7B and after detecting the input in FIG. 7B, as shown in FIG. 7C.

As shown in FIG. 7C, the amount of visual de-emphasis of the content user interface element 706 is reduced relative to the amount of de-emphasis of the content user interface element 706 in FIG. 7C while the input was being detected. In some embodiments, the amount of de-emphasis (or lack thereof) after receiving the input in FIG. 7B, as shown in FIG. 7C, is the same as the amount of de-emphasis of the content user interface 706 in FIG. 7A prior to detecting the input in FIG. 7B (e.g., no visual de-emphasis). In some embodiments, the amounts of de-emphasis before and after receiving the input in FIG. 7B are different.

The electronic device 101 also displays the representations in navigation user interface element 704a with less de-emphasis in FIG. 7C than the amount of de-emphasis with which the representations in navigation user interface element 704a were displayed in FIG. 7B while the input was being detected. For example, if the representations (e.g., of buildings or other physical structures or features) were flattened, blurred, darkened, and/or faded in FIG. 7B, the representations are displayed taller, clearer, and/or brightened in FIG. 7C after the input in FIG. 7B is no longer being detected. In some embodiments, the electronic device 101 displays the navigation user interface element 704a with the same degree of visual clarity/prominence in FIG. 7A before receiving the input in FIG. 7B as in FIG. 7C after receiving the input in FIG. 7B. In some embodiments, the degrees of visual clarity/prominence of the navigation user interface element 704a in FIGS. 7A and 7C are different.

In FIG. 7C, the electronic device 101 detects an input directed to selectable option 720b to update the location corresponding to the content in the content user interface element 706. Detecting the input optionally includes concurrently detecting the gaze 701a of the user directed to the selectable option 720b and detecting the user make a pinch gesture (e.g., moving the thumb to touch another finger on the hand and then moving the thumb away from the finger) with their hand 728b. In response to the input illustrated in FIG. 7C, the electronic device 101 updates the location of indication 716 and the field of view indicator 718c in the navigation user interface element 704a and updates the content user interface element 706 to include content corresponding to the updated position/orientation of the indication 716 and field of view indicator 718c, as shown in FIG. 7D.

Figure 7D:
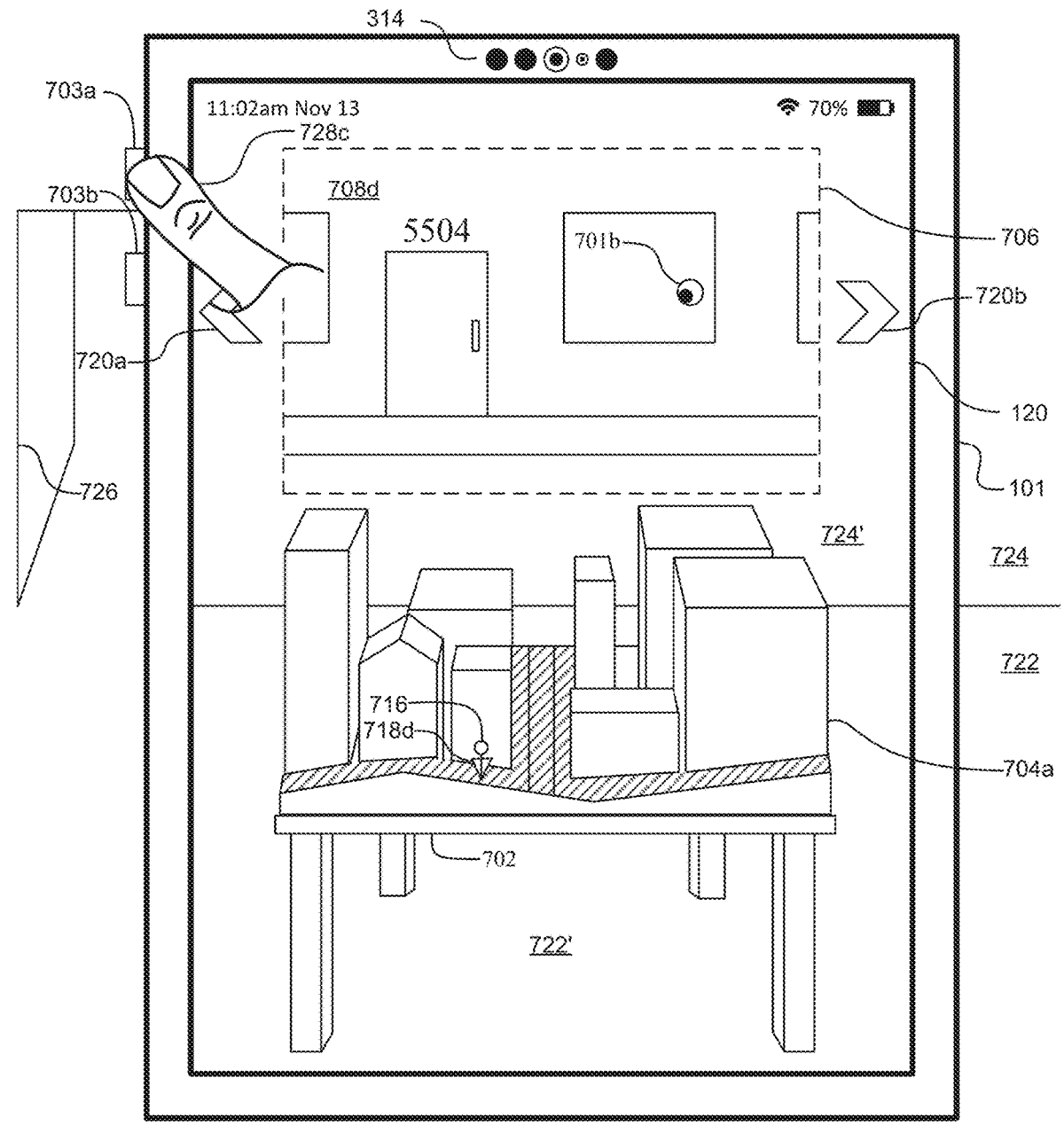

FIG. 7D illustrates the updated three-dimensional environment in response to the input detected in FIG. 7C. The electronic device 101 displays indication 716 and field of view indicator 718d at updated positions in the navigation user interface element 704a in accordance with the input detected in FIG. 7C. Because the input in FIG. 7C was detected to option 720b to pan the content in content user interface element 706 to the right, the electronic device 101 moves the indication 716 and field of view 718d in the navigation user interface element 704a to the right. The electronic device 101 also updates the content user interface element 706 to include content 708d corresponding to the updated positions of the indication 716 and field of view indicator 718d.

Figure 7E:
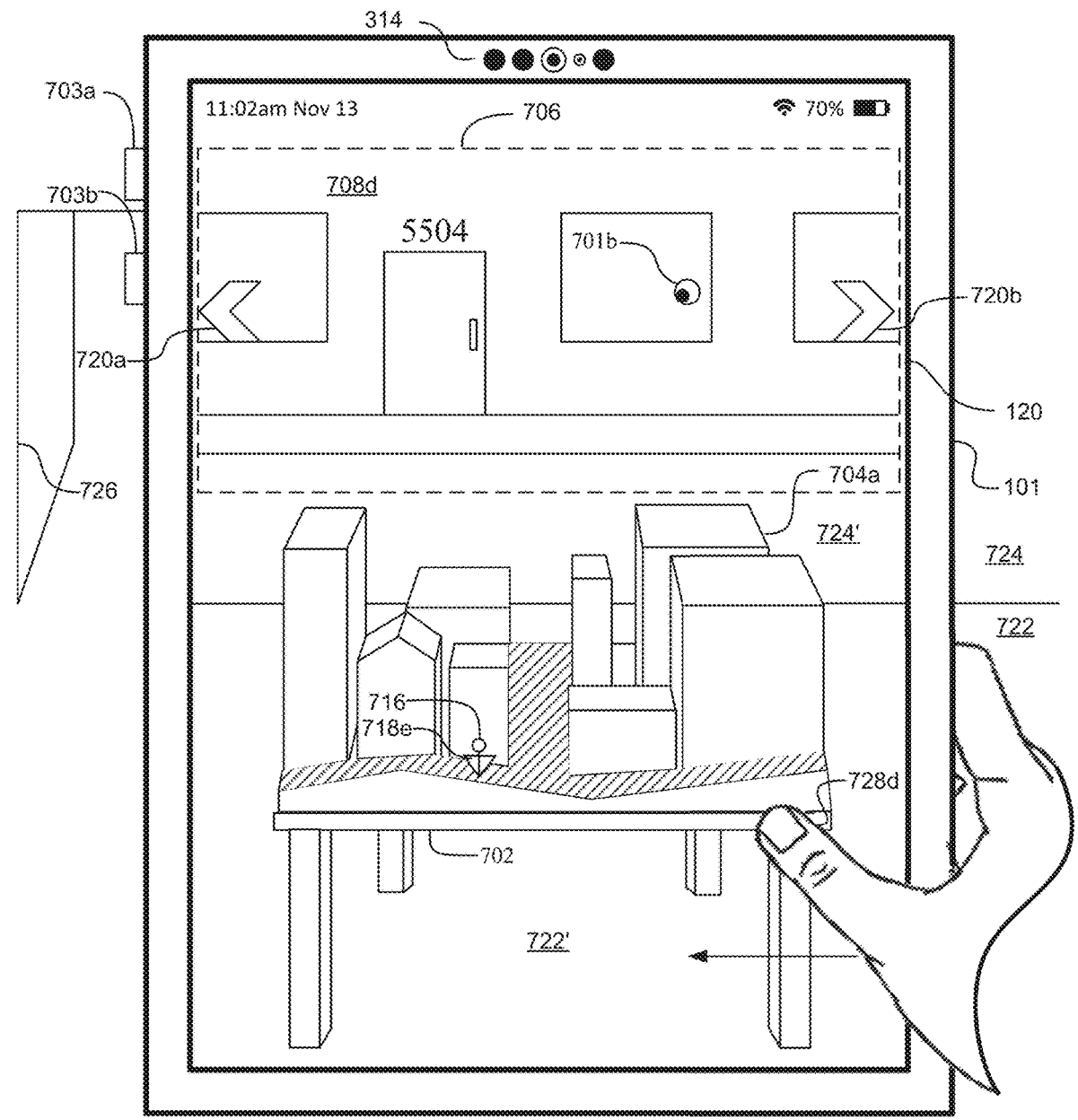

In some embodiments, the electronic device 101 increases the size of the content user interface element 706 as shown in FIG. 7E in response to detecting the gaze 701b of the user directed to the content user interface element 706 for at least a predetermined time threshold (e.g., 0.5, 1, 2, 3, 5, 10, etc. seconds) as shown in FIG. 7D. Additionally or alternatively, in some embodiments, the electronic device 101 increases the size of the content user interface element 706 as shown in FIG. 7E in response to manipulation of a physical button 703a of electronic device 101 by the user 728c, as shown in FIG. 7D. In some embodiments, physical buttons 703a and 703b of electronic device 101 control a level of immersion of the virtual content of three-dimensional environment. For example, while displaying the three-dimensional environment with relatively high levels of immersion, the electronic device increases the visual prominence (e.g., size, brightness, clarity, opacity, etc.) of the virtual objects in the three-dimensional environment (e.g., content user interface element 706, navigation user interface element 704a, other virtual objects such as content, application user interface elements, etc.) and decreases the visual prominence of representations of real objects in the three-dimensional environment (e.g., representation 724' of wall 724, representation 722' of floor 722, and representation 702 of table). As another example, while displaying the three-dimensional environment with relatively low levels of immersion, the electronic device decreases the visual prominence (e.g., size, brightness, clarity, opacity, etc.) of the virtual objects in the three-dimensional environment (e.g., content user interface element 706, navigation user interface element 704a, other virtual objects such as content, application user interface elements, etc.) and increases the visual prominence of representations of real objects in the three-dimensional environment (e.g., representation 724' of wall 724, representation 722' of floor 722, and representation 702 of table).

FIG. 7E illustrates the three-dimensional environment updated in response to one or more of the inputs illustrated in FIG. 7D. As shown in FIG. 7E, the size of the content user interface element 706 in FIG. 7E is larger than the size at which the content user interface element 706 was displayed in FIG. 7D before receiving the input(s) to expand the content user interface element 706. Updating the content user interface element 706 in FIG. 7E includes increasing the amount of content 708d corresponding to the location of indicator 716 that is displayed in the content user interface element 706. The electronic device 101 also updates the field of view indicator 718e in the navigation user interface element 704a to reflect the updated width of the physical area depicted in content 708d. In some embodiments, rather than increasing the amount of content displayed (e.g., and updating the field of view 718e), the electronic device 101 instead scales up the content 708d shown in FIG. 7D and maintains the same field of view 718d in FIG. 7D in response to the input(s) in FIG. 7D.

Figure 7F:
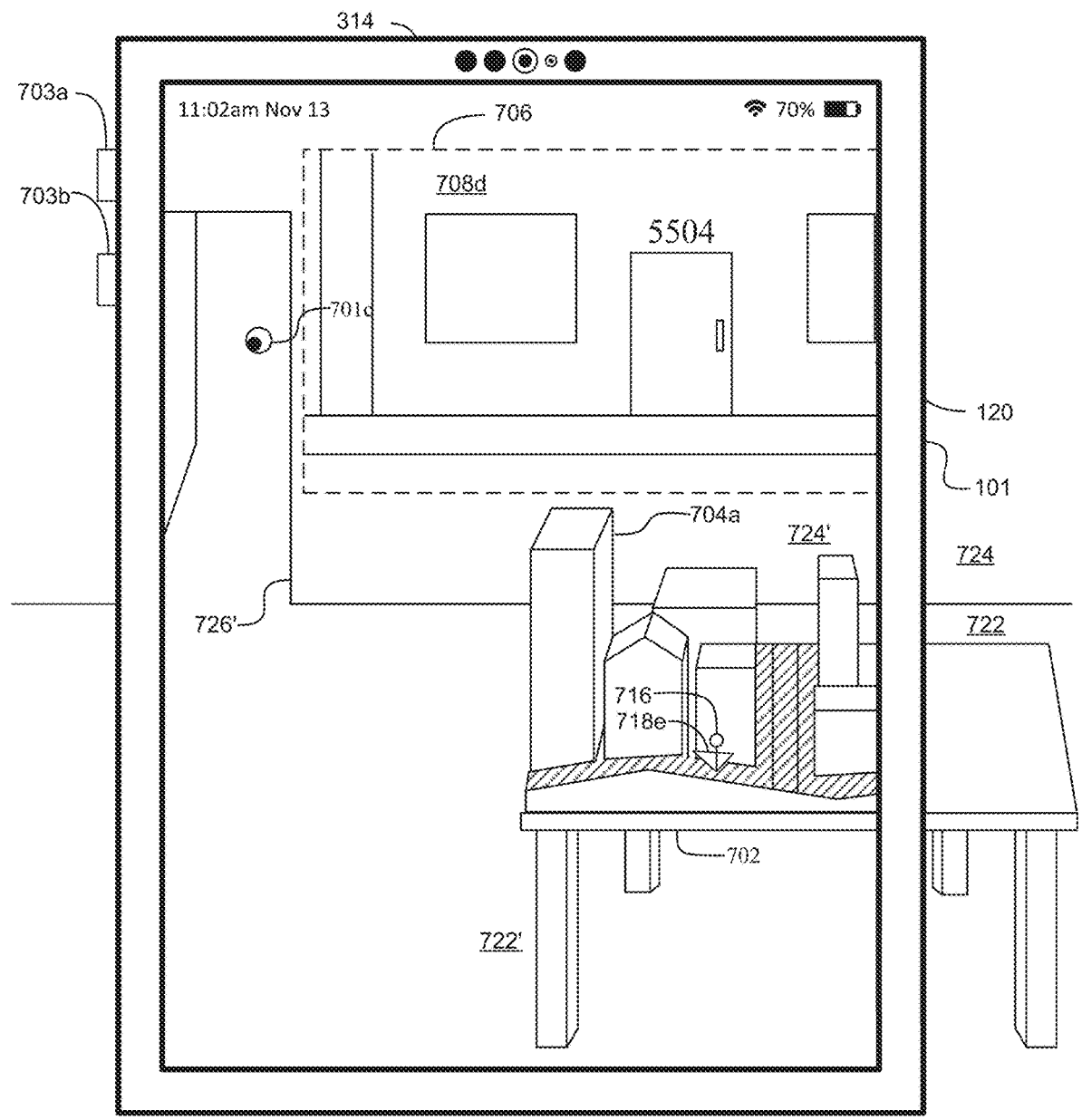

In some embodiments, the electronic device 101 updates the content user interface element 706 in accordance with movement of the electronic device 101 and/or of the user's head. For example, in response to detecting movement of the electronic device 101 and/or the user's head, the electronic device 101 shifts the perspective with which the content 708d in the content user interface element 706 is displayed. In some embodiments, the electronic device shifts the content 708d with a parallax effect. In some embodiments, the electronic device moves and/or expands the content user interface element 706 in accordance with the movement of the electronic device 101. FIG. 7E illustrates the user 728d moving the electronic device 101 to the left. FIG. 7F illustrates an example way the electronic device 101 updates the content user interface element 706 in response to the movement of the electronic device 101 illustrated in FIG. 7E.

In FIG. 7F, the electronic device 101 displays the three-dimensional environment from the viewpoint of the user updated in accordance with the movement of the electronic device 101 in FIG. 7E. Because the user 728*d* moved the electronic device 101 to the left in FIG. 7E, the electronic device 101 expands the content 708*d* in the content user interface element 706 to the left and updates (e.g., expands) the field of view indicator 718*e* in accordance with the (e.g., larger) field of view of the content 708*d*. Expanding the content 708*d* includes presenting content including real-world objects to the left of the real world objects shown in the content user interface element 706 in FIG. 7E. In some embodiments, the electronic device 101 similarly expands the content user interface element 706 to the right, upwards, and/or downwards in response to detecting movement of the electronic device 101 (and/or the user's head) to the right, upwards, and/or downwards, respectively. In some embodiments, the electronic device 101 expands the width of the content user interface element 706 in accordance with the movement of the electronic device 101. For example, in response to detecting movement of the electronic device 101 to the left, the electronic device 101 expands the content user interface element 706—and thus the content 708*d* displayed within the content user interface element 706—to the left in the three-dimensional environment.

As shown in FIG. 7F, the electronic device 101 ceases display of a portion of the navigation user interface element 704*a* that was presented on a portion of the representation 702 of the table that is no longer within the field of view of the display generation component 120 of the electronic device 101. In some embodiments, the electronic device 101 does not update the position of the navigation user interface element 704*a* in response to expanding the content user interface element 706 in response to movement of the electronic device 101 and/or the user's head. In some embodiments, if the entire navigation user interface element 704*a* is still within the field of view of the display generation component 120 while/after the movement of the electronic device 101 and/or the head of the user is detected, the electronic device 101 continues display of the entire navigation user interface element 704*a*. For example, if the entire representation 702 of the table were still in the field of view of the display generation component 120 of the electronic device 101 in FIG. 7F, the electronic device 101 would continue to present the entire navigation user interface element 704*a* at the same location in the three-dimensional environment at which the navigation user interface element 704*a* was displayed prior to detecting movement of the electronic device 101 and/or the head of the user. In some embodiments, moving the electronic device 101 and/or the head of the user updates the position of the viewpoint of the user in the three-dimensional environment so displaying the navigation user interface element 704*a* at a constant location in the three-dimensional environment includes changing the portion of the display generation component 120 that presents the map navigation user interface element 704*a* in some situations.

In some embodiments, in accordance with a determination that the user is looking at a representation of a real object in the three-dimensional environment (e.g., during the movement of device 101), the electronic device 101 stops expanding the content user interface element 706 to prevent it from obscuring the representation of the real object at which the user is looking. In FIG. 7F, the electronic device 101 detects the gaze 701*c* of the user directed to a representation 726' of a doorway in the physical environment of the electronic device 101 and, in response, only expands the content user interface element 706 up to a boundary of the doorway, and does not expand the content user interface element 706 to obscure the representation 726' of the doorway. In some embodiments, if the electronic device 101 did not detect the gaze 701*c* of the user directed to the representation 726' of the doorway (e.g., during the movement of device 101), the electronic device 101 would have expanded the content user interface element 706 to obscure (at least a portion of) the representation 726' of the doorway.

Figure 7G:
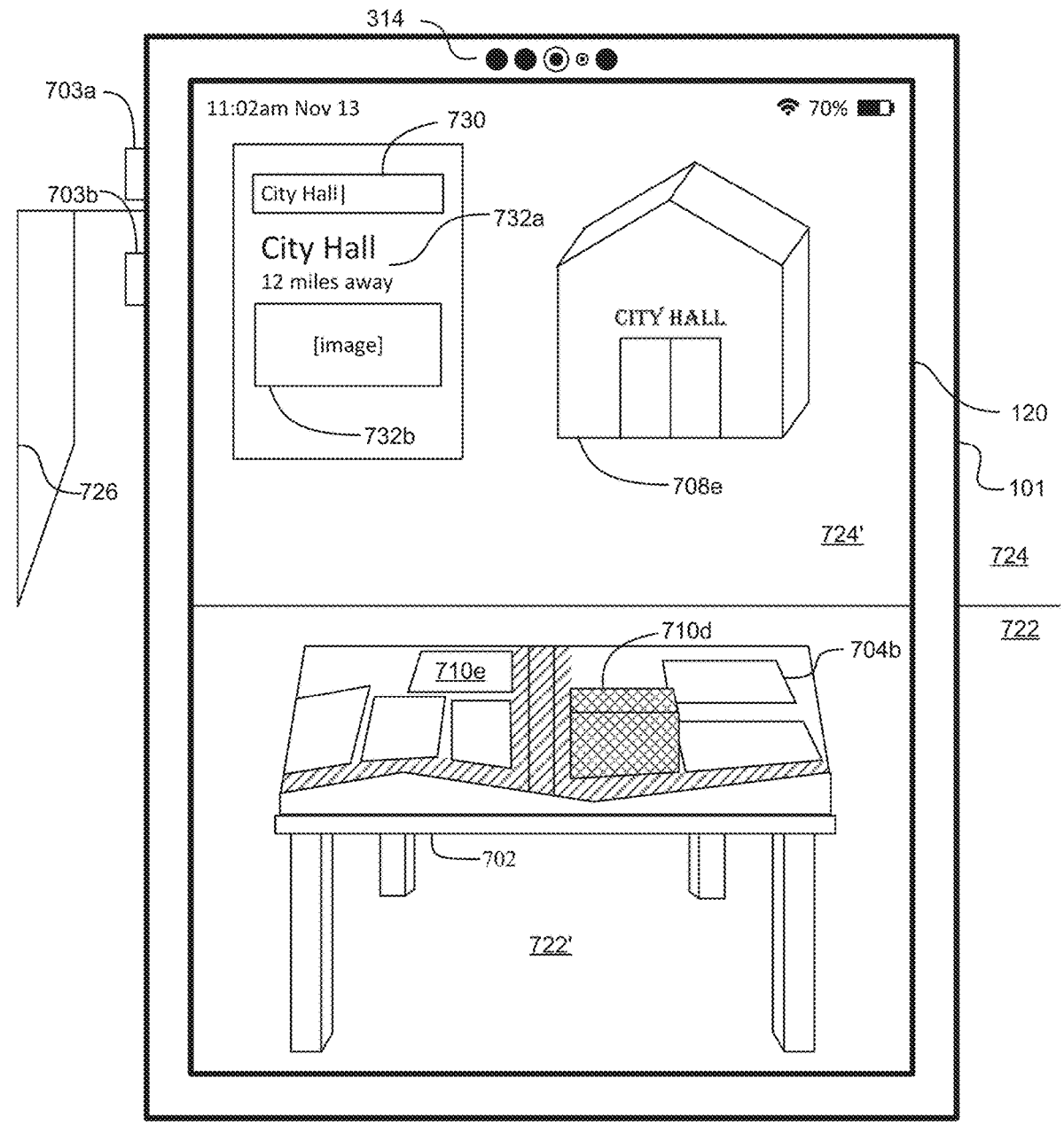

In some embodiments, the electronic device 101 facilitates searching for a physical location corresponding to a search query provided by the user. For example, the user is able to search for specific locations (e.g., addresses, names of buildings, businesses, landmarks, and other locations) or types of locations (e.g., types of businesses (e.g., coffee, gas station, grocery store), landmarks, and other locations). FIG. 7G illustrates the electronic device 101 presenting search results in the three-dimensional environment.

In FIG. 7G, the electronic device 101 presents a text entry field 730 (or more generally a search field) into which the user has entered the search query "city hall". The electronic device 101 also presents an indication 732*a* of the name of the search result and the distance of the location of the search result from the current location of the electronic device and an image 732*b* of the search result. Additionally, the electronic device 101 presents a (e.g., three-dimensional) rendering 708*e* of the physical object corresponding to the search result (e.g., a three-dimensional representation of the City Hall building that was searched). In some embodiments, the rendering 708*e* of the physical object corresponding to the search result is presented in front of the image 732*b* of the physical object corresponding to the search result and/or at a position in the three-dimensional environment that is closer to the viewpoint of the user than the image 732*b* is to the viewpoint of the user. As shown in FIG. 7G, the electronic device 101 presents the navigation user interface element 704*b* between the viewpoint of the user and the rendering 732*b*. The electronic device 101 presents the navigation user interface element between the viewpoint of the user and the image 732*b* of the physical object corresponding to the search result.

In FIG. 7G, in response to detecting the search query (e.g., "city hall"), the electronic device 101 updates the navigation user interface element 704*b* to indicate the search result(s). In FIG. 7G, the electronic device 101 displays representations of physical locations/objects/features that do not match the search query (e.g., representation 710*e*) with reduced visual prominence (e.g., at least partially flattening the three-dimensional representations of physical objects in the navigation user interface element 704*b*) while maintaining the visual prominence of the representation 710*d* of the object (e.g., building) that matches the search query and/or displaying the representation 710*d* in a different color than the color of the representations of other objects (e.g., including representation 710*e*). In some embodiments, the electronic device 101 either updates the color of the representation 710*d* of the object matching the search query or reduces the visual prominence of the representations that do not match the search query (e.g., including representation 710*e*), but not both. In some embodiments, if more than one location matches the search query, the electronic device 101 displays the plurality of representations of locations matching the search query with the visual distinction (e.g., color, visual prominence) that is different from the visual distinction of representations of locations that do not match the search query. In some embodiments, the representation 710*d* of the physical object corresponding to the search query is a three-dimensional representation of the physical object. For example, the representation 710*d* is a three-dimensional rendering of the physical object presented from a different viewing angle than the viewing angle of rendering 708e. In some embodiments, the electronic device 101 presents the rendering 708e and the representation 710d of the physical object in the navigation user interface element 704b from the same viewing angle.

Figure 7H:
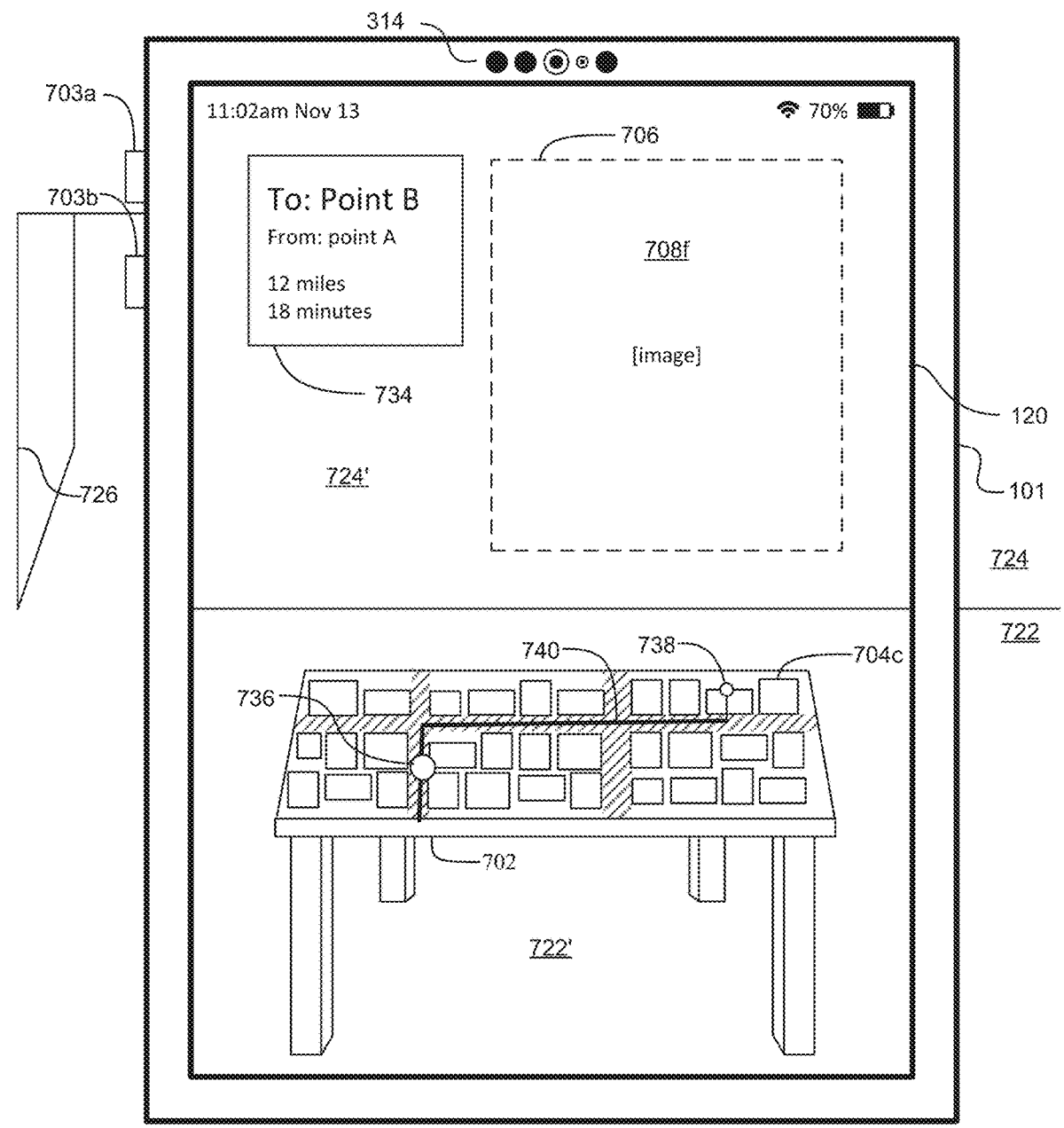

In some embodiments, the electronic device 101 presents, in the three-dimensional environment, navigation directions from one physical location to another. In some embodiments, in response to a request to present navigation directions, the electronic device 101 presents a selectable option that, when selected, causes the electronic device 101 to present an animation navigating the navigation directions. FIG. 7H illustrates the electronic device 101 presenting an animation navigating navigation directions (e.g., in response to the selection of the selectable option).

In FIG. 7H, the electronic device 101 presents an indication 734 of the navigation directions, including the starting point and ending point, route distance, and/or route duration, the navigation user interface element 704c, and one or more images 708f (e.g., one or more still images, a video, an animation) corresponding to the navigation route. The navigation user interface element 704c includes an indication 740 of the navigation route, an indication of the endpoint 738 of the route, and an indication 736 of a location corresponding to the image 708f currently being presented in the content user interface element 706. In some embodiments, the navigation user interface element 704c is three-dimensional. In some embodiments, the navigation user interface element 704c is two-dimensional. In some embodiments, the navigation user interface element 704c is a bird's eye (e.g., top-down) view. In some embodiments, the navigation user interface element is presented from a perspective view. The navigation user interface element 704c is presented between the viewpoint of the user and the image 708f corresponding to the navigation route. the navigation user interface element 704c is presented between the viewpoint of the user and the indication 734 of the navigation directions. In some embodiments, the electronic device 101 presents an animation of indication 736 navigating along the navigation route 740 and, as the indication 736 moves along the route 740, the electronic device 101 presents an image 708f or a portion of a video or animation corresponding to the current location represented by indication 736. For example, the image 708f is a first-person video/view of navigating the navigation route that the electronic device 101 concurrently presents with the animation of indication 736 traversing the navigation route 740.

In some embodiments, the electronic device 101 selects the size of the navigation user interface element based on the size of (e.g., one or more features of) the physical environment of the electronic device 101. For example, in FIGS. 7A-7E, the electronic device 101 displays the navigation user interface element 704a to fit the area of the representation 702 of the top surface of the table in the physical environment of the electronic device 101 (e.g., because device 101 displays the navigation user interface element 704a on the top surface of the table). In some embodiments, if the top surface of the table is smaller, the navigation user interface element 704a would be displayed at a smaller size, either including representations of a smaller physical area or by scaling down the representations of a physical area of the same size. In some embodiments, if the top surface of the table is larger, the navigation user interface element 704a would be displayed at a larger size, either including representations of a larger physical area or by scaling up the representations of a physical area of the same size. In some embodiments, if the navigation user interface element were presented on a different surface/feature or away from any surfaces/features in the three-dimensional environment, the electronic device 101 would size (e.g., and shape) the navigation user interface element based on the surface/feature and/or area on/in which the navigation user interface element was displayed.

Figure 7I:
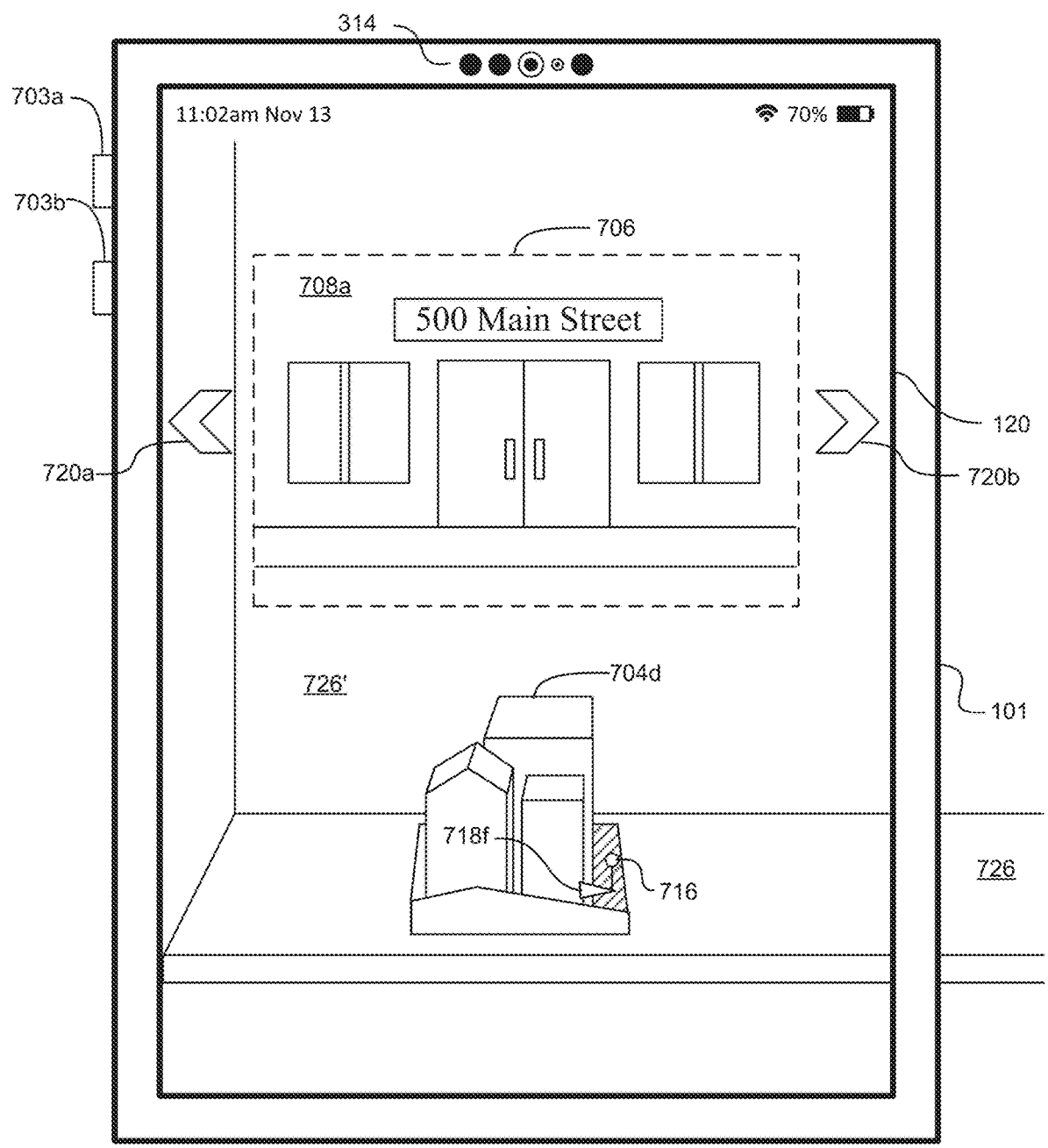
Figure 8A:
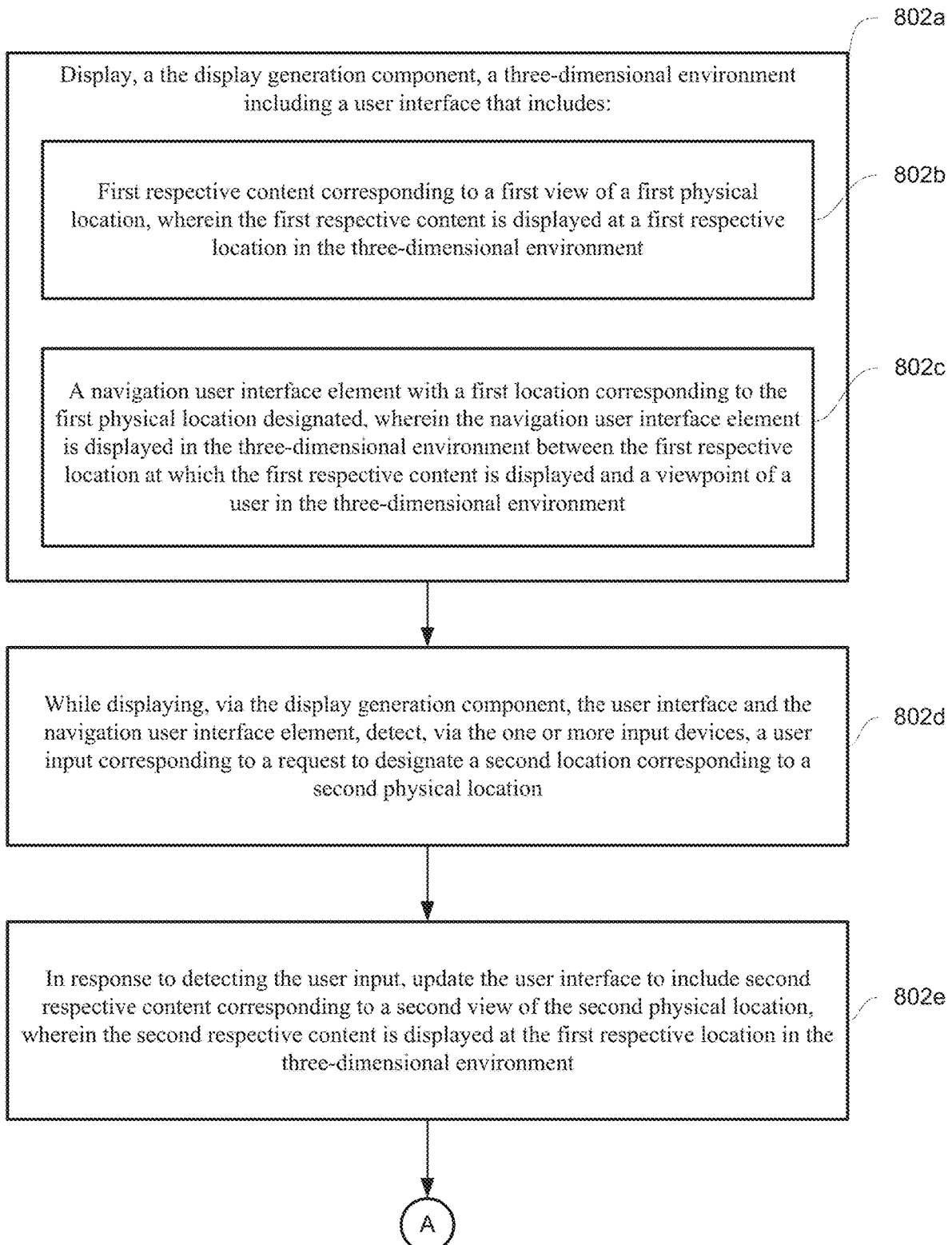
Figure 8B:
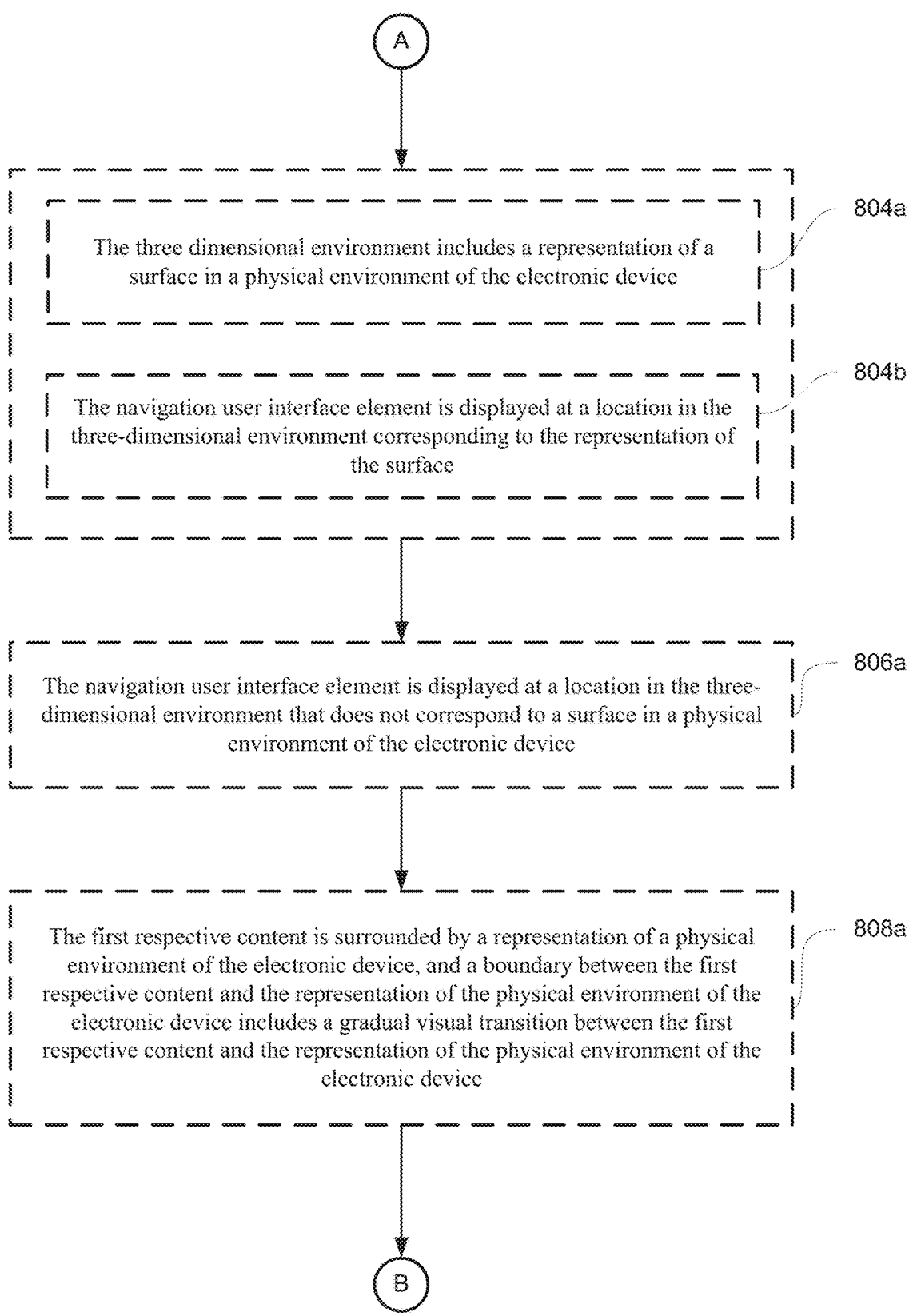
Figure 8C:
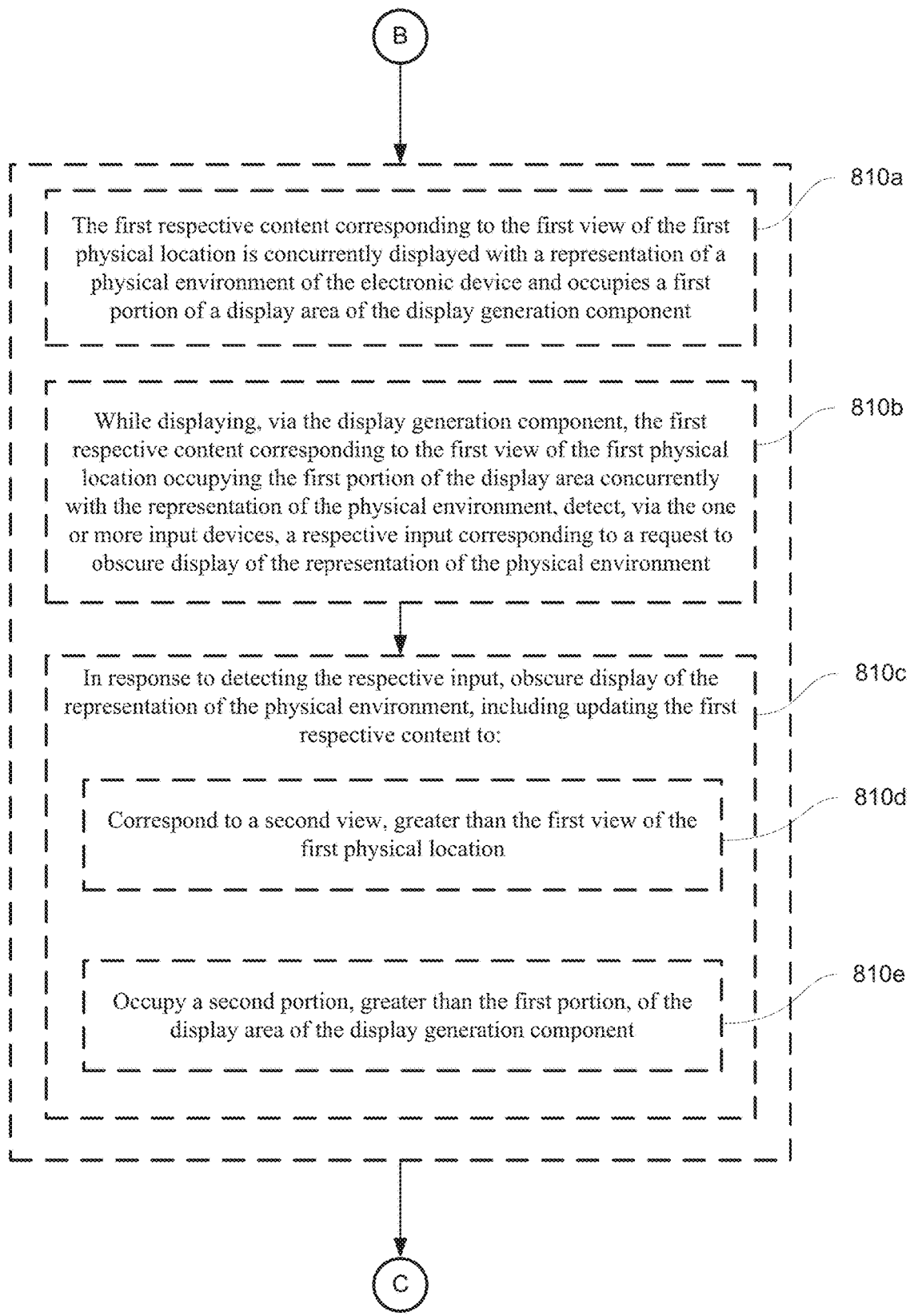
Figure 8D:
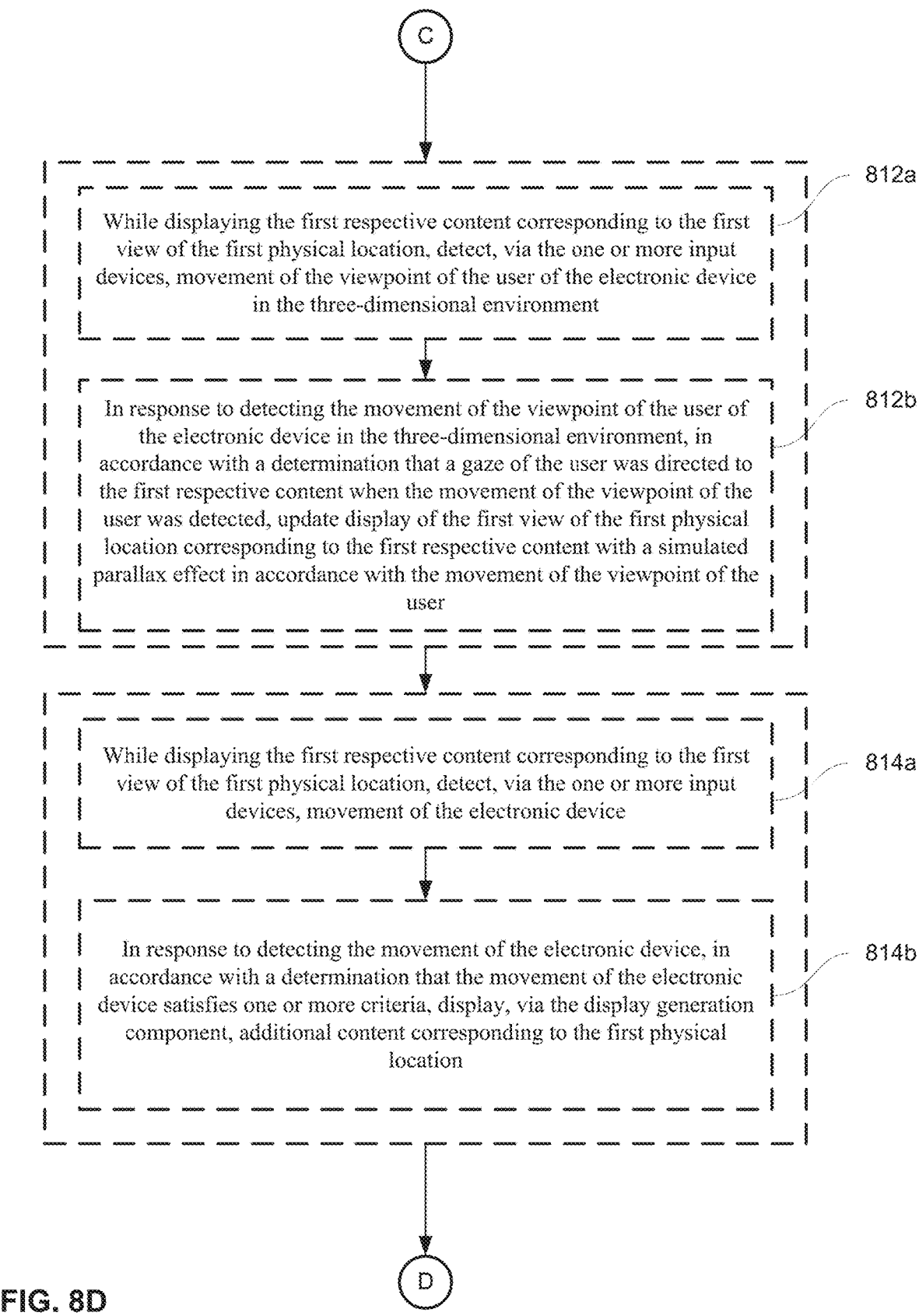
Figure 8E:
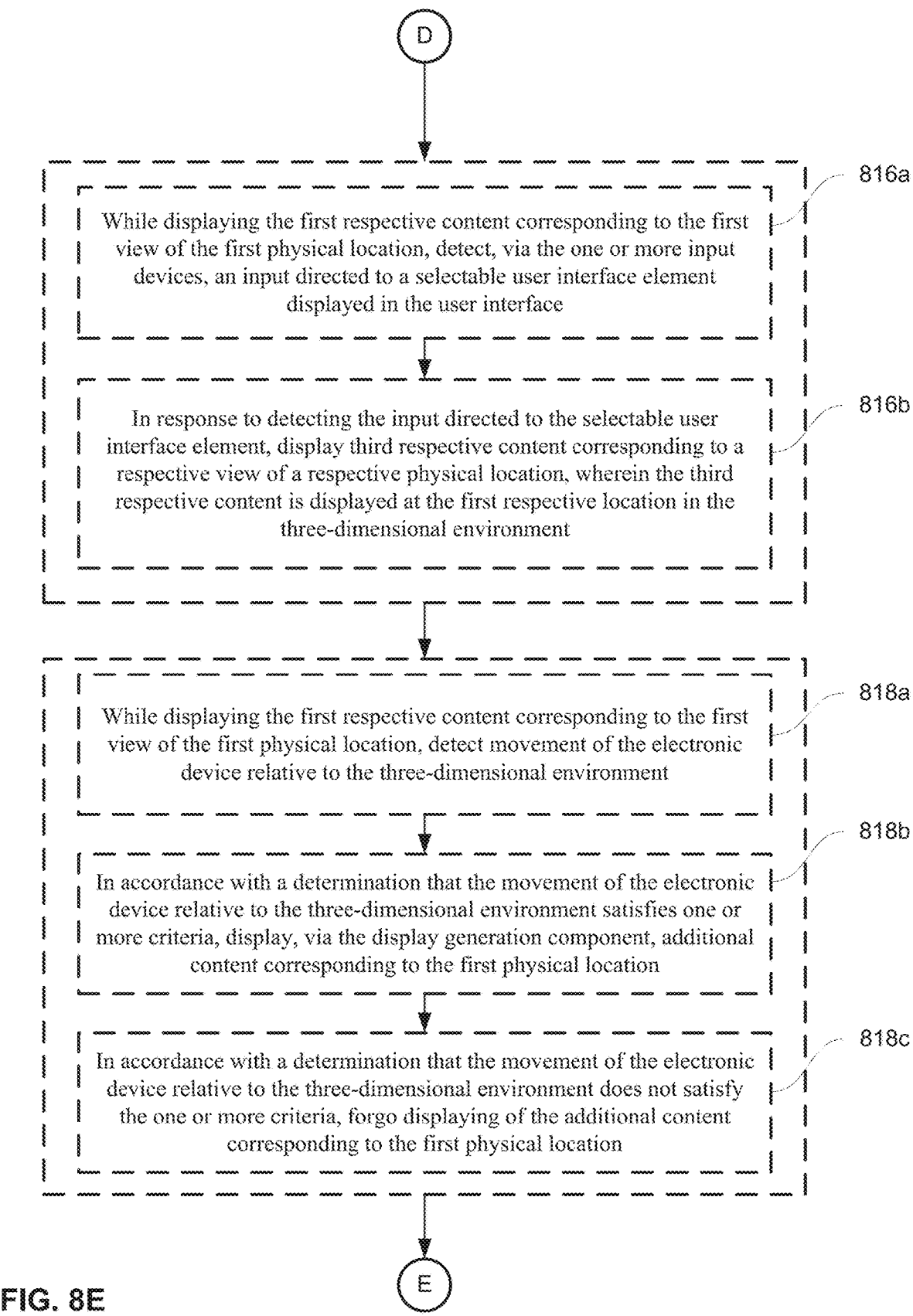
Figure 8F:
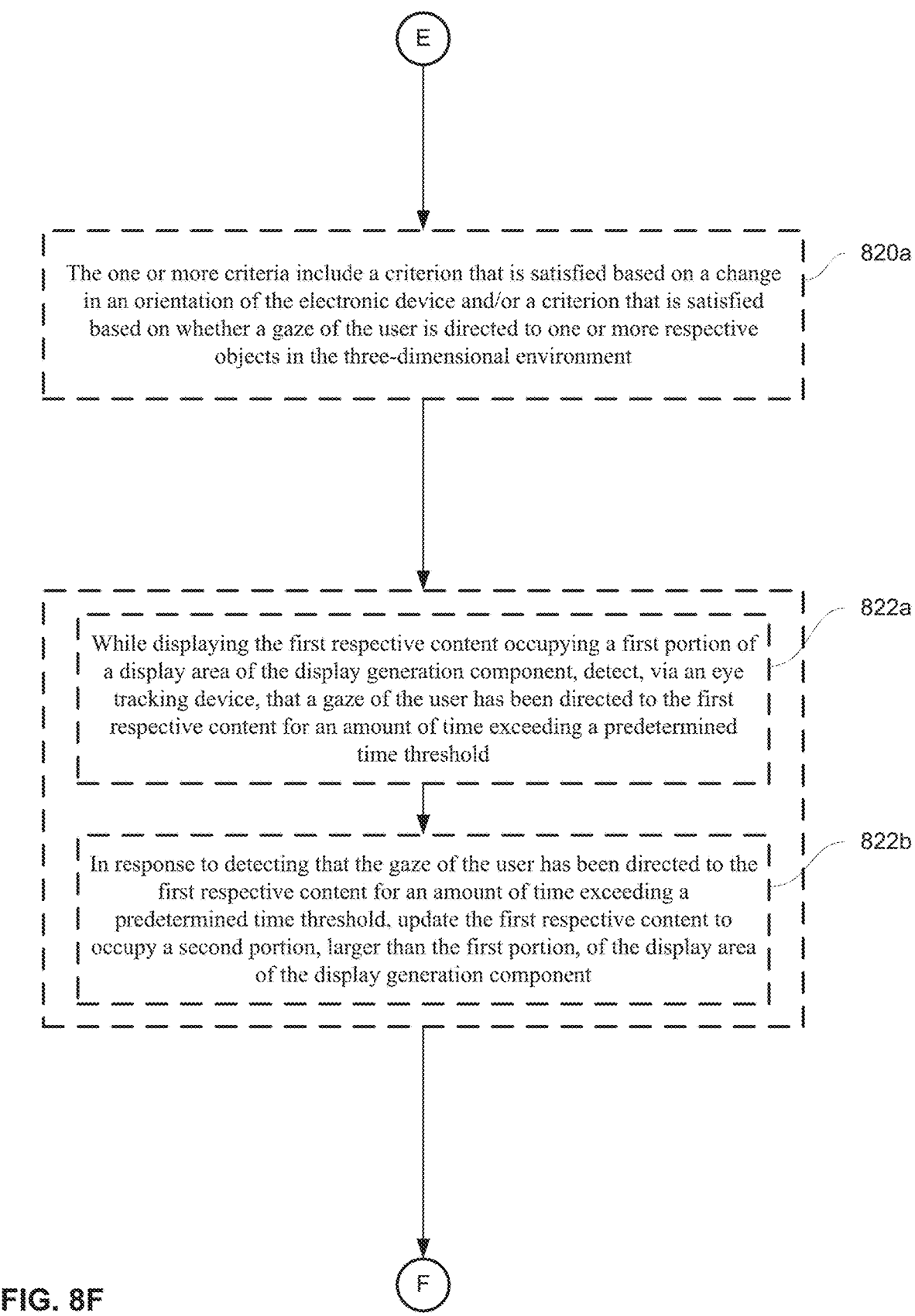
Figure 8G:
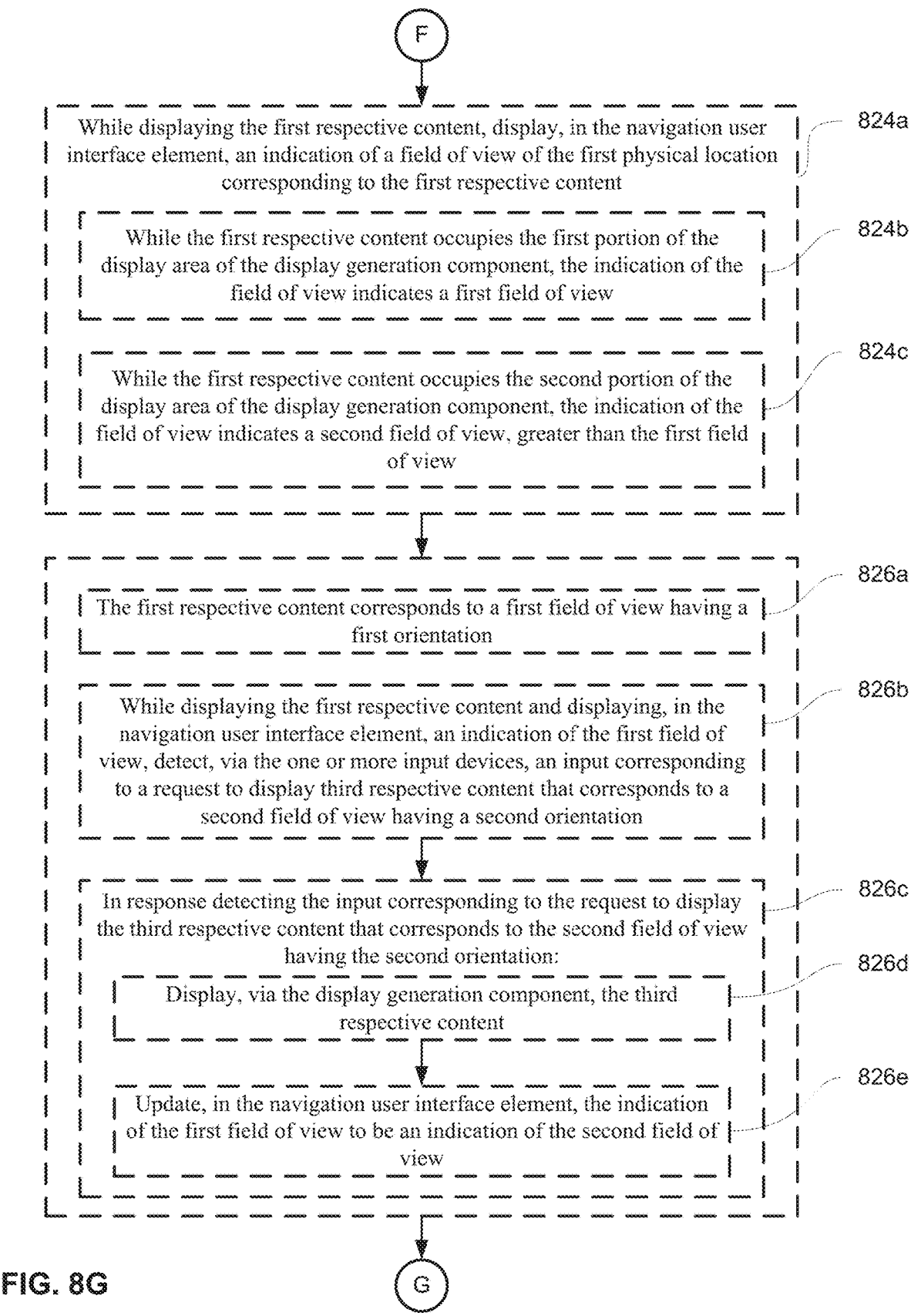
Figure 8I:
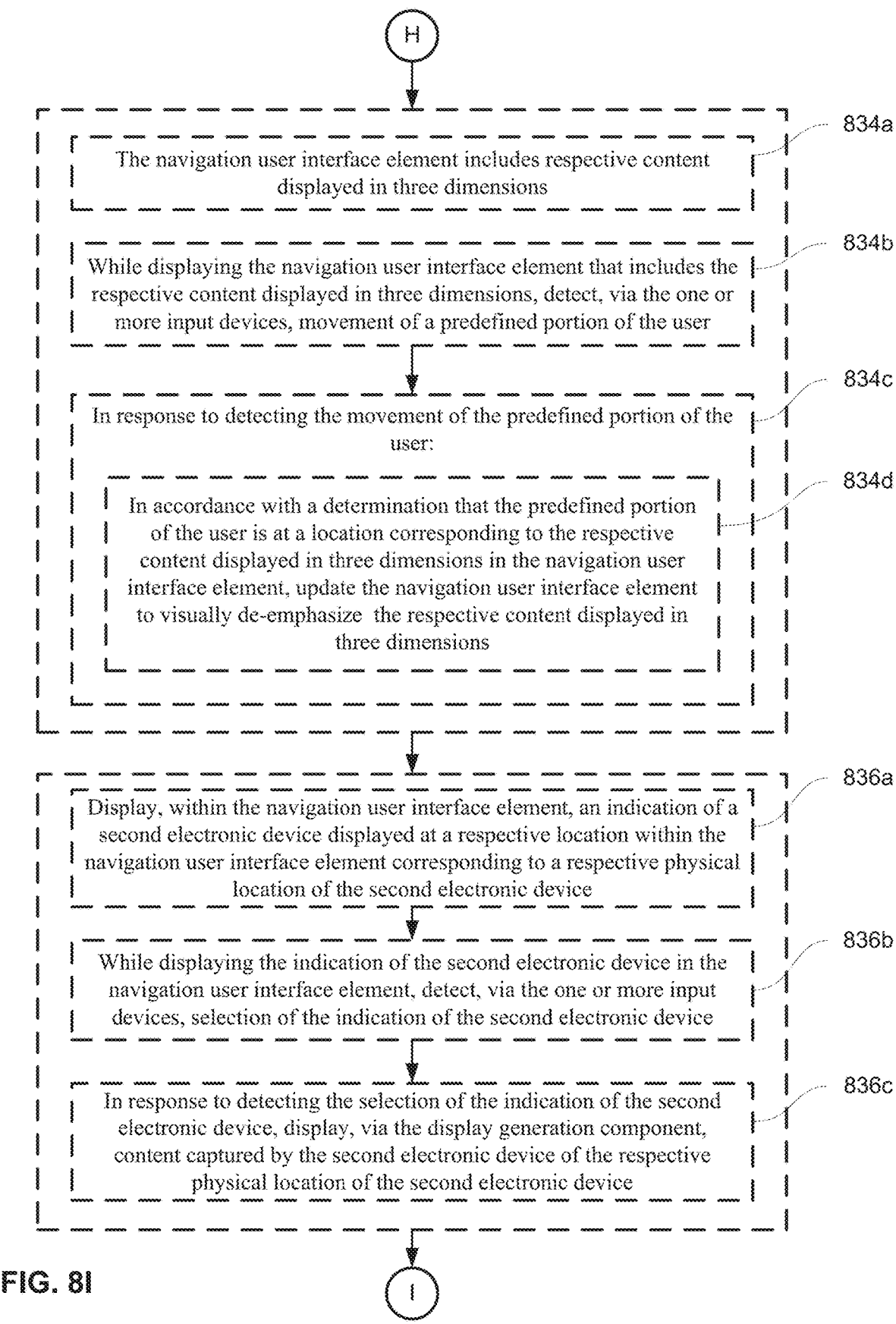
Figure 8J:
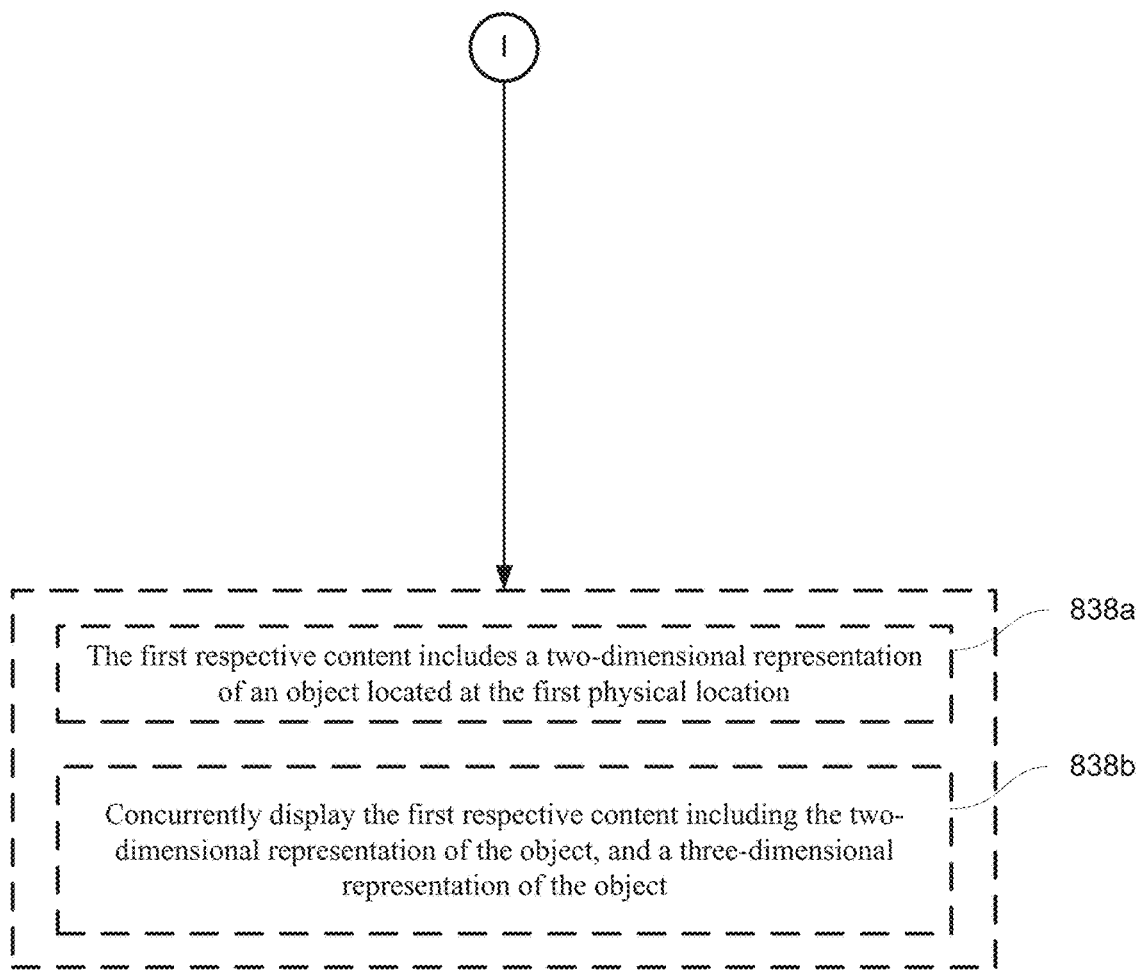
Figure 9A:
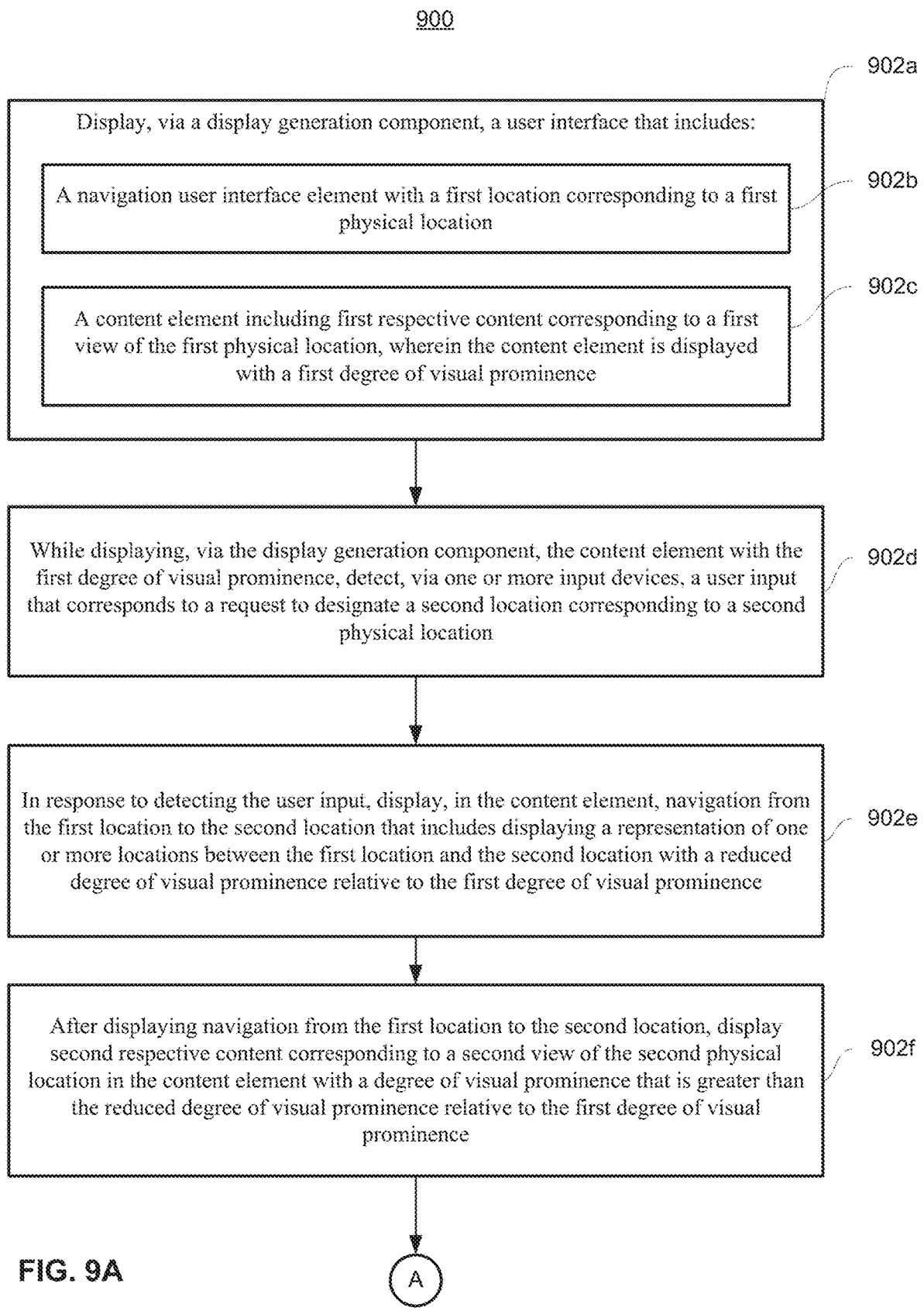
FIGS. 9A-9H is a flowchart illustrating a method of presenting navigation from a first physical location to a second physical location with reduced visual prominence in a content element in response to an input corresponding to a request to present content corresponding to the second physical location in accordance with some embodiments.
Figure 9B:
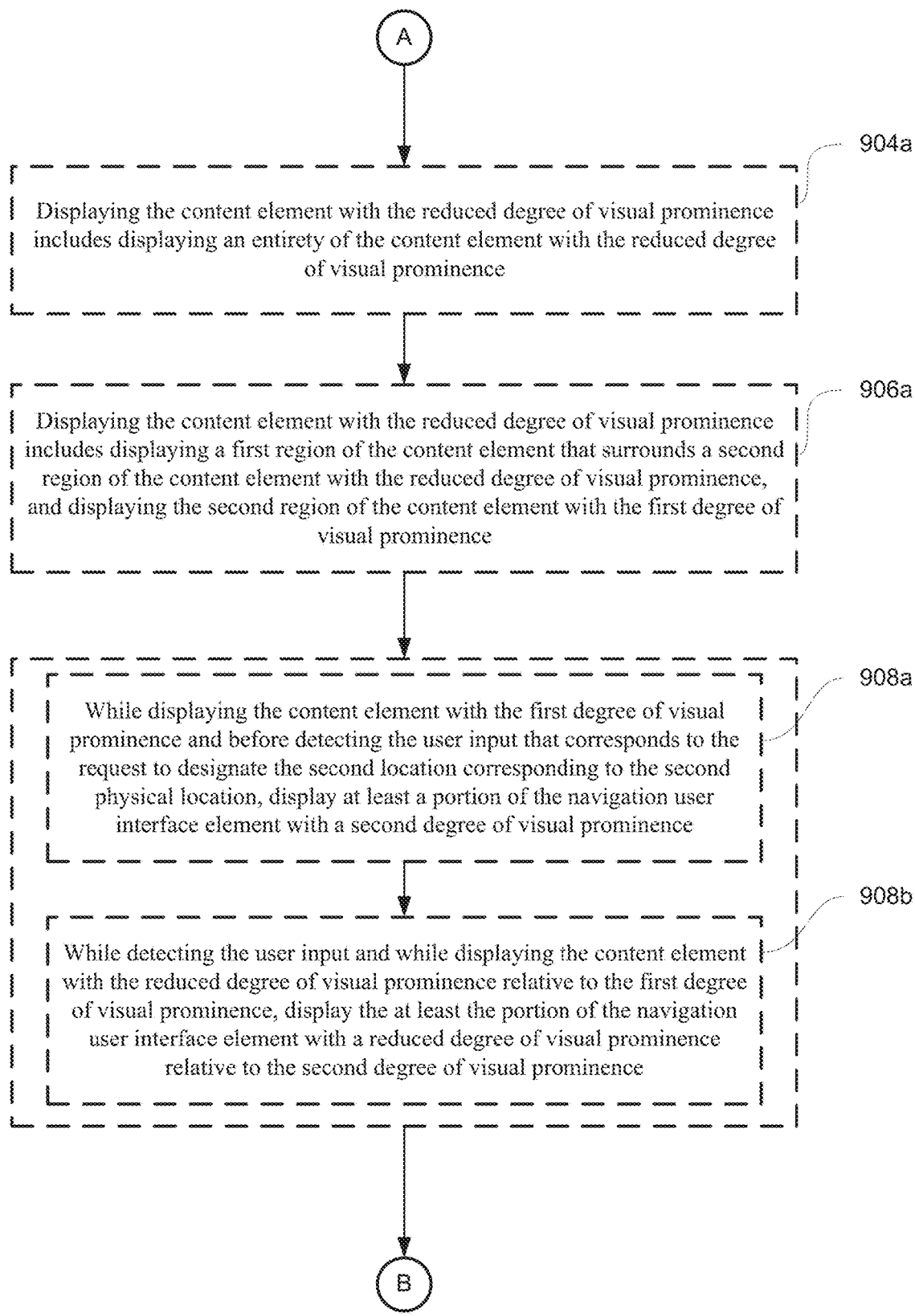
Figure 9C:
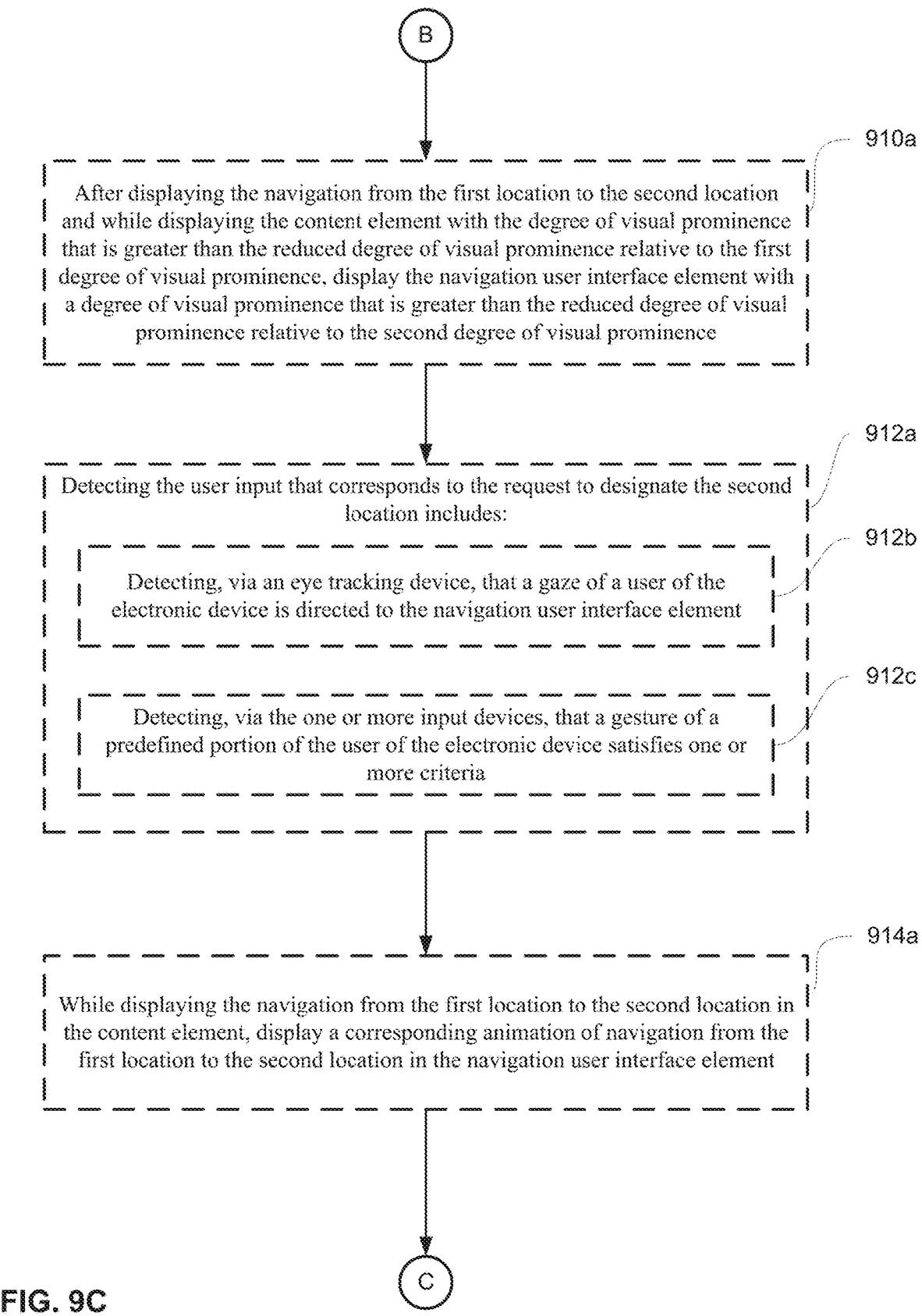
Figure 9D:
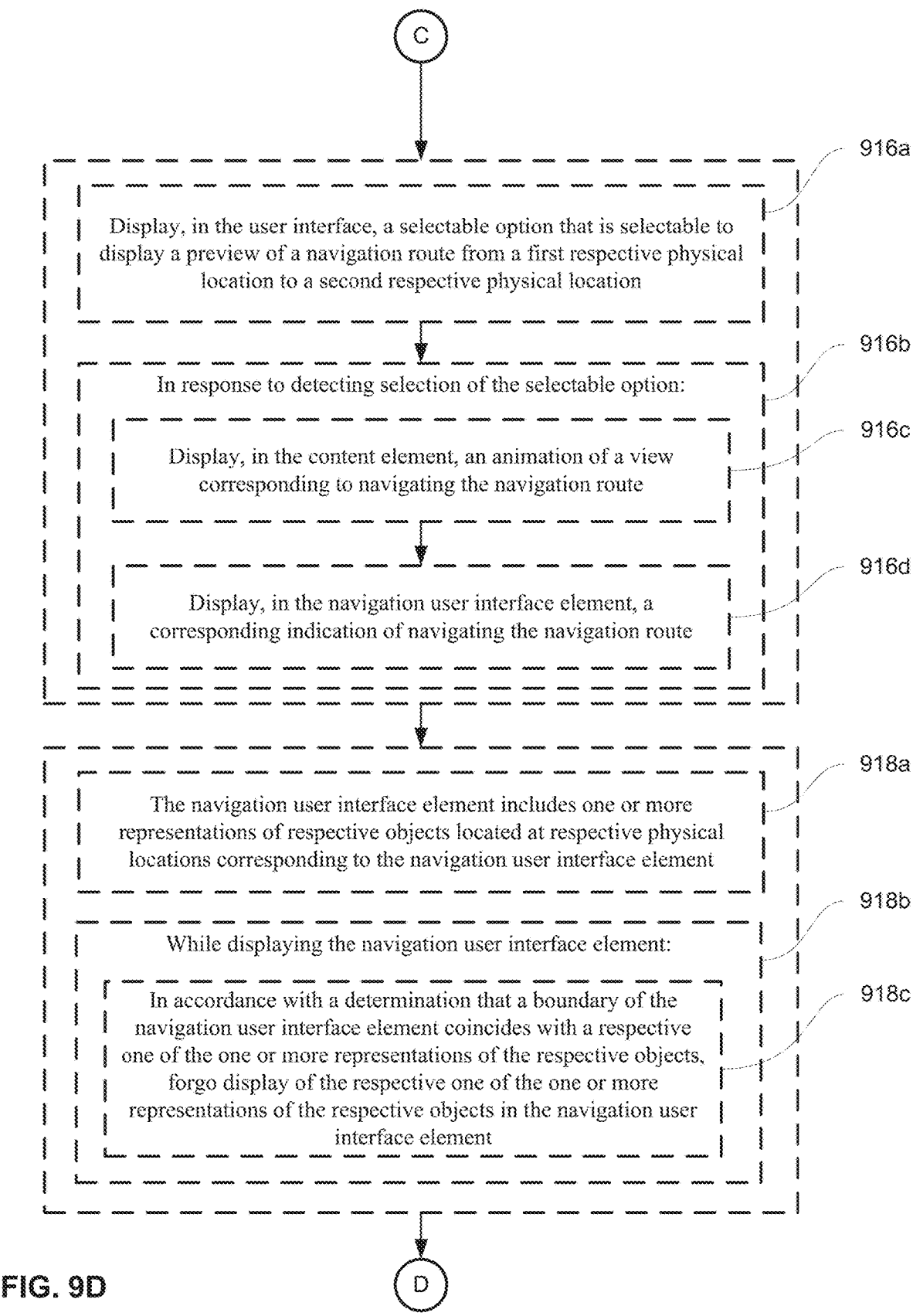
Figure 9E:
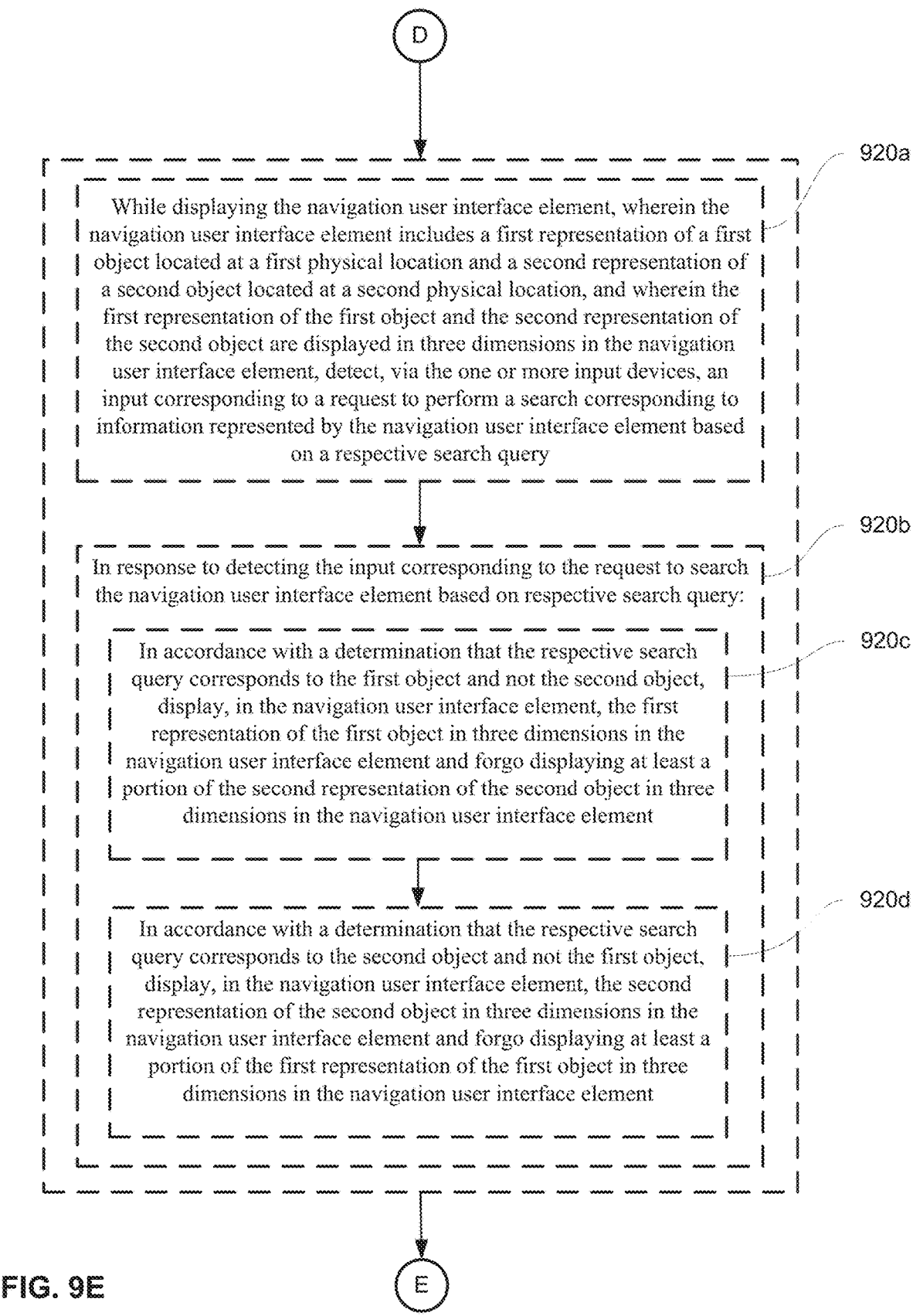
Figure 9F:
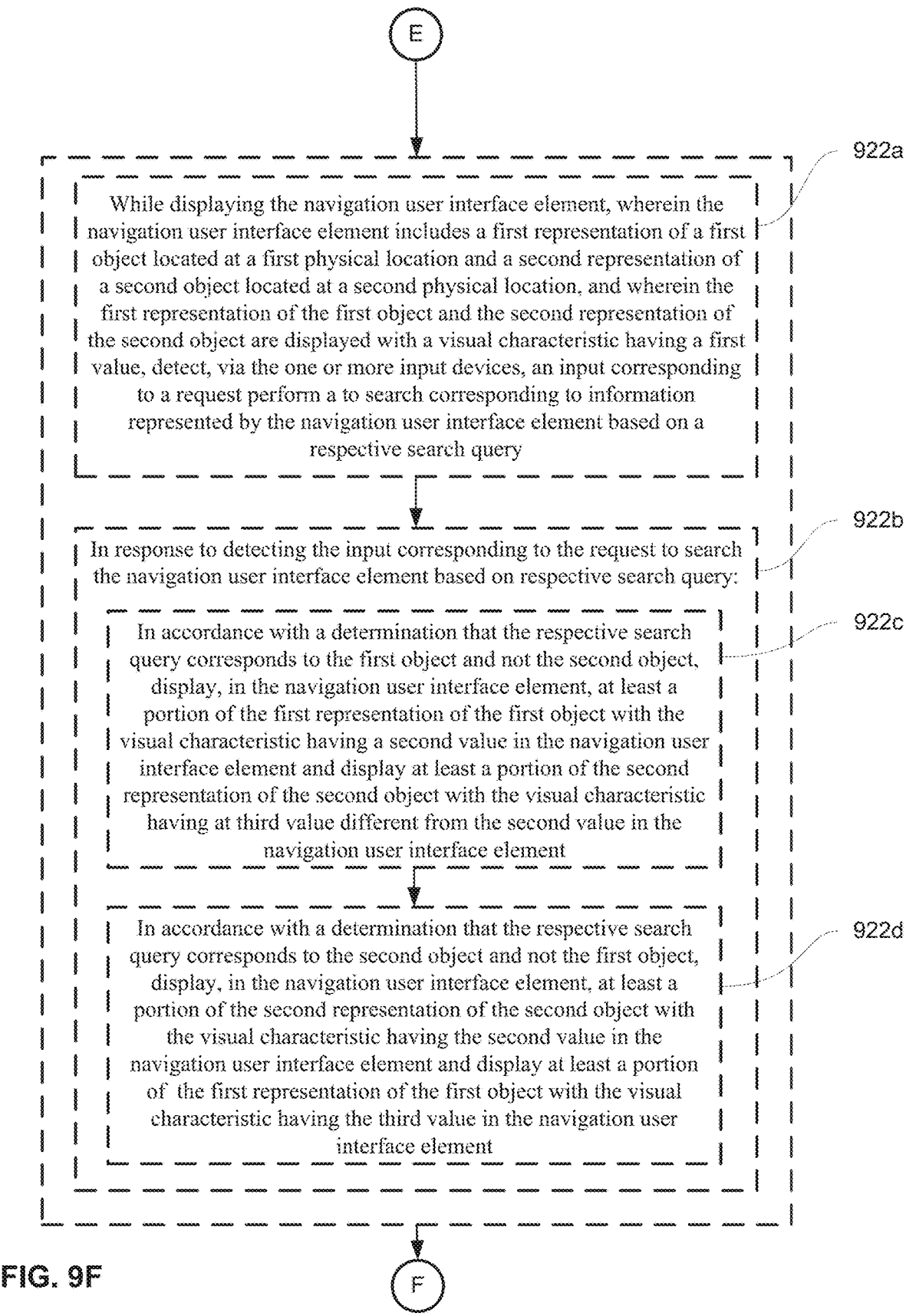
Figure 9G:
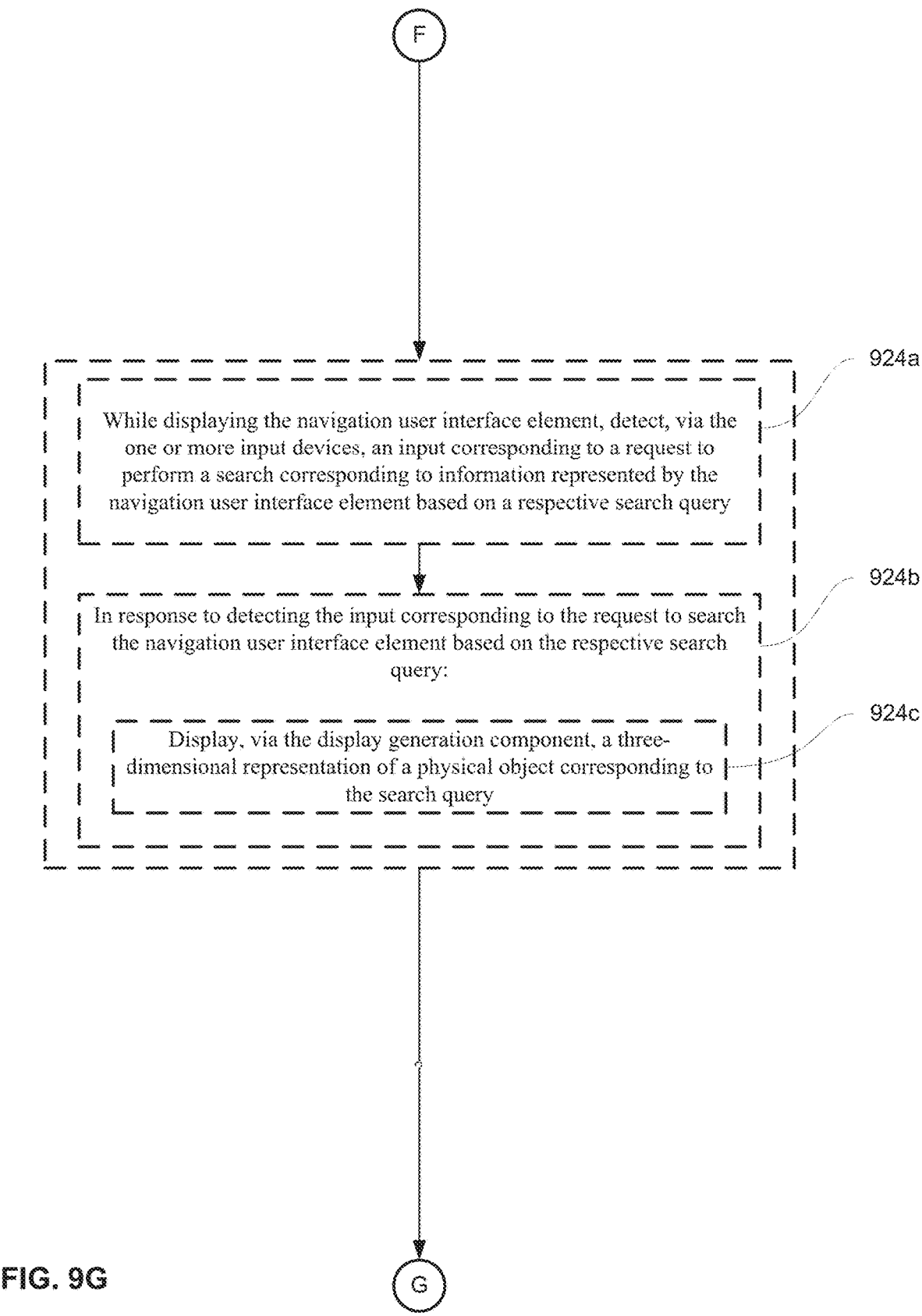
Figure 9H:
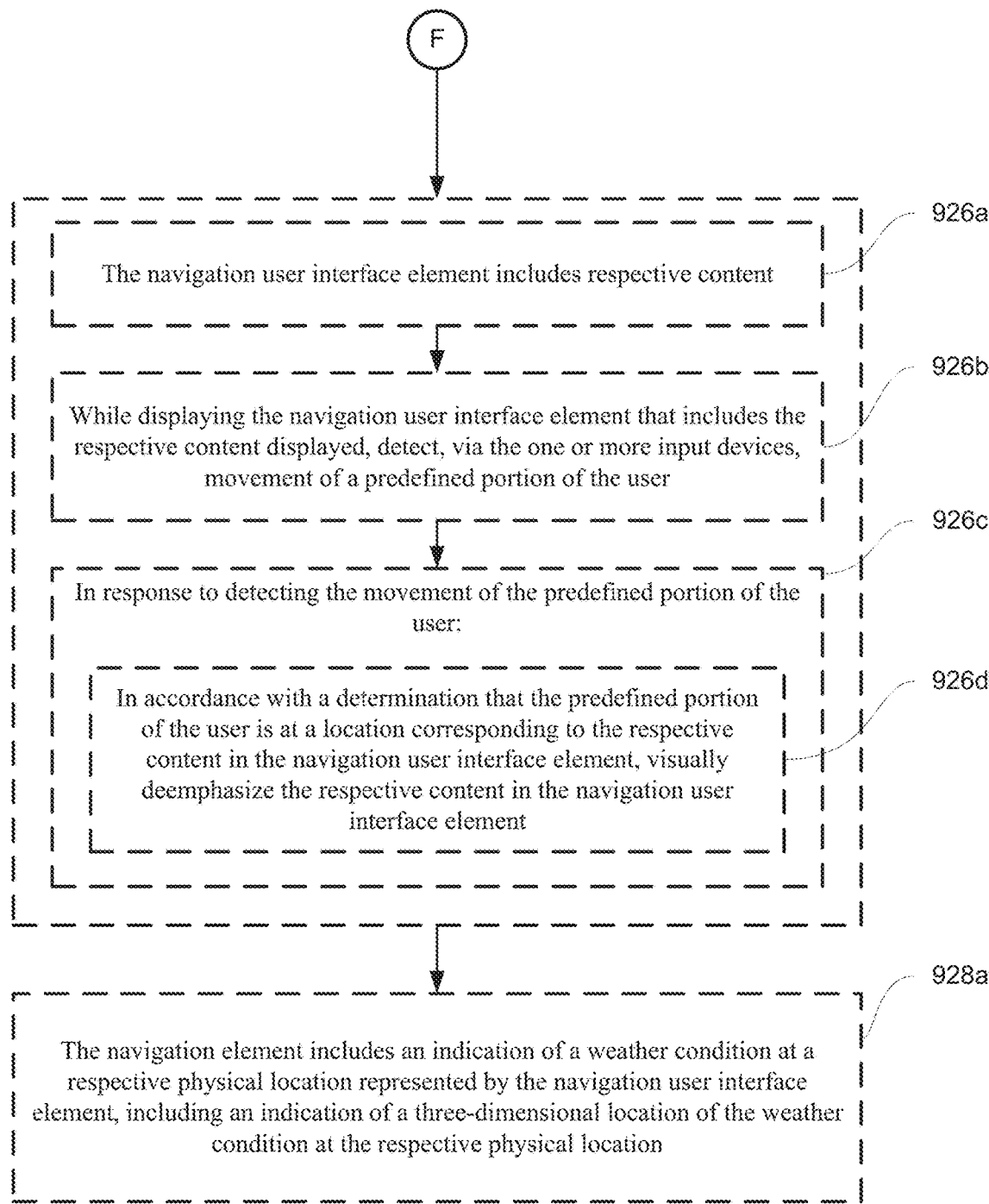

In FIG. 7I, the physical environment of the electronic device 101 is smaller than the physical environment in FIGS. 7A-7E. In particular, FIG. 7I illustrates the electronic device 101 being used inside a cubicle 726. In FIG. 7I, the navigation user interface element 704d is displayed at a smaller size within a representation 726' of the cubicle 726 than the size at which the navigation user interface element 704a was displayed in FIGS. 7A-7E because the cubicle 726 is smaller than the table corresponding to virtual table 702. As shown in FIG. 7I, the electronic device 101 displays the navigation user interface element 704d between the viewpoint of the user and the content user interface element 706 in the three-dimensional environment.

Additional or alternative details regarding the embodiments illustrated in FIGS. 7A-7I are provided below in descriptions of methods 800-900 described with reference to FIGS. 8-9 below.

FIGS. 8A-8J is a flowchart illustrating a method of concurrently presenting a navigation user interface element with a respective physical location designated and a content element including content corresponding to the respective physical location in accordance with some embodiments. In some embodiments, the method 800 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In some embodiments, method 800 is performed at an electronic device in communication with a display generation component and one or more input devices (e.g., a mobile device (e.g., a tablet, a smartphone, a media player, or a wearable device), or a computer). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device, and/or a motion sensor (e.g., a hand tracking device, a hand motion sensor), etc. In some embodiments, the electronic device is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, such as in FIG. 7A, the electronic device (e.g., 101) displays (802a), via the display generation component, a three-dimensional environment including a user interface that includes first respective content (e.g., 708a) corresponding to a first view of a first physical location, wherein the first respective content (e.g., 708a) is displayed at a first respective location in the three-dimensional environment (802b). In some embodiments, the first respective content is an image taken from and/or of the first physical location (e.g., a street level view image from the first physical location). In some embodiments, the first respective content is (e.g., live) video recorded at the first physical location.

In some embodiments, such as in FIG. 7A, the electronic device (e.g., 101) displays (802a), via the display generation component, a three-dimensional environment including a user interface that includes a navigation user interface element (e.g., 704a) with a first location (e.g., 716) corresponding to the first physical location designated, wherein the navigation user interface element (e.g., 704a) is displayed in the three-dimensional environment between the first respective location at which the first respective content (e.g., 708a) is displayed and a viewpoint of a user (e.g., the user of the electronic device) in the three-dimensional environment (802c). In some embodiments, the three-dimensional environment includes representations of virtual objects, including the user interface, and representations of real objects in the physical environment of the electronic device. The three-dimensional environment is optionally presented from a first-person perspective from the viewpoint of a user associated with the electronic device at a respective location in the three-dimensional environment (e.g., corresponding to the location of the electronic device). In some embodiments, the navigation user interface element includes a three-dimensional topographical map of a physical location with a visual indication (e.g., a pin) at the first location corresponding to the first physical location. For example, the navigation user interface element includes a three-dimensional topographical map of a city including three-dimensional representations of buildings, streets, and other landmarks with a flag, pin, or other visual indication displayed at the first location that corresponds to an address, landmark, or coordinates in the city. In some embodiments, the navigation user interface element is oriented along a horizontal surface in the three-dimensional environment or floating along a horizontal plane and the first respective content is oriented vertically. In some embodiments, the map navigation element is between the viewpoint of the user and the first respective content in the three-dimensional environment. In some embodiments, the navigation user interface element and/or first respective content are displayed in a three-dimensional environment that is generated, displayed, or otherwise caused to be viewable by the device (e.g., a computer-generated reality (XR) environment such as a virtual reality (VR) environment, a mixed reality (MR) environment, or an augmented reality (AR) environment, etc.).

In some embodiments, such as in FIG. 7B, while displaying, via the display generation component, the user interface and the navigation user interface element (e.g., 704b), the electronic device detects (802d), via the one or more input devices, a user input corresponding to a request to designate a second location corresponding to a second physical location. In some embodiments, the input is directed towards the navigation user interface element, such as an input to move the indication of the designated location from the first location to the second location on the three-dimensional topographical map. In some embodiments, the input is directed towards the first respective content, such as an input to change the perspective of the content from the first physical location to the second physical location or to rotate the field of view of the first respective content.

In some embodiments, such as in FIG. 7C, in response to detecting the user input, the electronic device updates (802e) the user interface to include second respective content (e.g., 708c) corresponding to a second view of the second physical location, wherein the second respective content (e.g., 708c) is displayed at the first respective location in the three-dimensional environment. In some embodiments, in response to detecting the user input, the electronic device further updates the navigation user interface element to display a visual indication (e.g., pin) at the second location and cease displaying a visual indication (e.g., pin) at the first location. In some embodiments, the second respective content is an image taken from the second physical location. In some embodiments, the second respective content is (e.g., live) video recorded at the second physical location. In some embodiments, the electronic device maintains the locations in the three-dimensional environment at which the content and the navigation user interface element are displayed in response to the user input.

The above-described manner of displaying the second respective content at the same location in the three-dimensional environment at which the first respective content was displayed provides an efficient way of browsing content corresponding to physical locations, which additionally reduces power usage and improves battery life of the electronic device by enabling the user to use the electronic device more quickly and efficiently (e.g., without the user having to direct their attention to a different region of the three-dimensional environment or provide an input to continue displaying the content at the second respective location in the three-dimensional environment).

In some embodiments, the view or style of the navigation user interface element changes depending on the level of zoom applied to the navigation user interface element. For example, when the level of zoom is lower than a first threshold, the navigation user interface element is a globe. As another example, when the level of zoom is between the first threshold and as second threshold greater than the first threshold, the navigation user interface element is a topographical map of a region showing natural features (e.g., landforms, plants, etc.), optionally without showing man-made features (e.g., buildings, infrastructure, etc.). As another example, when the level of zoom is greater than the second threshold, the navigation user interface element includes a topographical map including natural and man-made features and the electronic device displays first-person content from a physical location depicted by the navigation user interface element. In some embodiments, the electronic device forgoes displaying first-person content at the first respective location in the three-dimensional environment while the zoom level is less than the second threshold.

In some embodiments, such as in FIG. 7A, the three-dimensional environment includes a representation (e.g., 702) of a (e.g., horizontal) surface in a physical environment of the electronic device (804a). In some embodiments, the representation of the surface is a representation of the surface presented by the display generation component (e.g., virtual or video passthrough). In some embodiments, the representation of the surface is a view of the surface through a transparent portion of the display generation component (e.g., true or real passthrough). For example, the surface is a table, shelf, counter, or floor in the environment of the electronic device. In some embodiments, such as in FIG. 7A, the navigation user interface element (e.g., 704a) is displayed at a location (and orientation) in the three-dimensional environment corresponding to the representation (e.g., 702) of the (e.g., horizontal) surface (804b). In some embodiments, the electronic device displays the navigation user interface element as though the navigation user interface element is disposed on (e.g., sitting on) the surface. For example, the electronic device displays the navigation user interface element to appear as though it has been placed on a table, shelf, counter, or floor in the physical environment of the electronic device between the first respective location in the three-dimensional environment and the viewpoint of the user.

The above-described manner of displaying the navigation user interface element at the location corresponding to the representation of the surface provides an efficient way of integrating virtual objects with representations of real objects in a mixed reality environment without consuming more space than necessary in the mixed reality environment, which additionally reduces power usage and improves battery life of the electronic device by enabling the user to use the electronic device more quickly and efficiently (e.g., by reducing the number of inputs needed to integrate the virtual and real objects in the environment).

In some embodiments, the navigation user interface element is displayed at a location (and/or orientation) in the three-dimensional environment that does not correspond to a surface in a physical environment of the electronic device (806a), such as, for example, displaying the navigation user interface element 704a in FIG. 7A away from the representation 702 of the table. In some embodiments, the surface corresponds to a real object in the physical environment of the electronic device, such as a table, shelf, counter, or floor. In some embodiments, while displaying the three-dimensional environment including a representation of the surface, the electronic device displays the navigation user interface element at a location that is remote from the representation of the surface (e.g., floating in space, not attached to a physical or virtual object or surface). In some embodiments, the three-dimensional environment does not include a representation of a surface in the physical environment of the electronic device (e.g., because there isn't such a surface in the physical environment of the electronic device, because the surface is not in the field of view of the electronic device, because the three-dimensional environment is a virtual environment that does not include representations of one or more real objects in the physical environment of the electronic device). In some embodiments, the navigation user interface element includes indications of physical places, virtual tours, and landmarks that, when selected, cause the electronic device to present content associated with the selected indication (e.g., in the navigation user interface element and/or at the first respective location in the three-dimensional environment).

The above-described manner of displaying the navigation user interface element at a location in the three-dimensional environment that does not correspond to a surface in the physical environment of the electronic device provides flexibility in placement of the navigation user interface element, which additionally reduces power usage and improves battery life of the electronic device by enabling the user to use the electronic device more quickly and efficiently (e.g., by reducing the number of inputs needed to display the navigation user interface element).

In some embodiments, such as in FIG. 7A, the first respective content (e.g., 708a) is surrounded by (e.g., overlaid on) a representation (e.g., 724') of a physical environment of the electronic device (e.g., 101), and a boundary between the first respective content (e.g., 708a) and the representation (e.g., 724') of the physical environment of the electronic device (e.g., 101) includes a gradual visual transition (e.g., feathering, gradual fading, blending) between the first respective content (e.g., 708a) and the representation (e.g., 724') of the physical environment of the electronic device (808a). In some embodiments, the representation of the physical environment is a representation of the physical environment presented by the display generation component (e.g., virtual or video passthrough). In some embodiments, the representation of the physical environment is a view of the physical environment through a transparent portion of the display generation component (e.g., true or real passthrough). In some embodiments, the first respective content is surrounded by (e.g., overlaid on) a representation of a virtual environment and the boundary between the first respective content and the representation of the virtual environment includes a gradual visual transition between the first respective content and the representation of the virtual environment. In some embodiments, the gradual visual transition is a feathered boundary, a blended boundary, and/or blurred boundary between the first respective content and the representation of the physical (e.g., or virtual) environment. In some embodiments, the electronic device displays the first respective content between the viewpoint of the user in the three-dimensional environment and the representation of the physical environment, including portions of the representation of the physical environment that surround the first respective content.

The above-described manner of displaying the first respective content with the gradual visual transition between the first respective content and the representation of the physical environment maintains context for the user, which avoids mistaken inputs or the user needing to toggle back and forth between different user interfaces, which additionally reduces power usage and improves battery life of the electronic device by enabling the user to use the electronic device more quickly and efficiently (e.g., reducing the number of inputs needed to view the representation of the physical environment and the first respective content).

In some embodiments, such as in FIG. 7D, the first respective content (e.g., 708c) corresponding to the first view of the first physical location is concurrently displayed with a representation (e.g., 724') of a physical environment of the electronic device (e.g., 101) and occupies a first portion of a display area of the display generation component (e.g., 120) (810a) (e.g., the display generation component displays the first respective content at a first size). In some embodiments, the representation of the physical environment is a representation of the physical environment presented by the display generation component (e.g., virtual or video passthrough). In some embodiments, the representation of the physical environment is a view of the physical environment through a transparent portion of the display generation component (e.g., true or real passthrough). In some embodiments, the first respective content obscures, blocks, and/or is displayed in front of a portion of (e.g., the representation of) the physical environment and does not obscure and/or block the portion of the (e.g., representation of) the physical environment that appears to surround the first respective content. In some embodiments, such as in FIG. 7D, while displaying, via the display generation component (e.g., 120), the first respective content (e.g., 708*c*) corresponding to the first view of the first physical location occupying the first portion of the display area concurrently with the representation (e.g., 724') of the physical environment, the electronic device (e.g., 101) detects (810*b*), via the one or more input devices (e.g., (e.g., pressing) a physical button or (e.g., rotation of) a dial of the electronic device, or a different input device in communication with the electronic device; selection of one or more user interface elements displayed via the display generation component), a respective input corresponding to a request to obscure display of the representation (e.g., 724') of the physical environment. In some embodiments, the request to obscure display of the representation of the physical environment corresponds to a request to reduce the number of representations of real objects in the physical environment of the electronic device that are presented by the electronic device. In some embodiments, the request to obscure display of the representation of the physical environment corresponds to a request to cease display of the representation of the physical environment (e.g., and instead display the user interface, first respective content, and navigation user interface element in a virtual environment). In some embodiments, the request to obscure display of the representation of the physical environment corresponds to a request to increase the portion of the display area of the display generation component occupied by virtual objects and/or content (e.g., the first respective content). In some embodiments, the request to obscure display of the representations of the physical environment corresponds to a request to dim the (e.g., representation of the) physical environment. In some embodiments, such as in FIG. 7E, in response to detecting the respective input, the electronic device (e.g., 101) obscures (810*c*) display of the representation (e.g., 724') of the physical environment, including updating the first respective content (e.g., 708*d*) to correspond to a second view, greater than the first view of the first physical location (810*d*) (e.g., increasing the amount of the first respective content displayed by display generation component). In some embodiments, such as in FIG. 7E, in response to detecting the respective input, the electronic device (e.g., 101) obscures (810*c*) display of the representation (e.g., 724') of the physical environment, including updating the first respective content to occupy a second portion, greater than the first portion, of the display area of the display generation component (e.g., 120) (810*e*) (e.g., increasing the size at which the first respective content is displayed by the display generation component). In some embodiments, the display area of the display generation component occupied by the representation of the physical environment and the view of the physical environment is reduced in response to detecting the respective input.

The above-described manner of obscuring display of the representation of the physical environment in response to the respective input provides an efficient way of presenting a greater view of the first physical location which additionally reduces power usage and improves battery life of the electronic device by enabling the user to use the electronic device more quickly and efficiently (e.g., reducing the number of inputs needed to view the first physical location).

In some embodiments, such as in FIG. 7E, while displaying the first respective content (e.g., 708*d*) corresponding to the first view of the first physical location, the electronic device (e.g., 101) detects (812*a*), via the one or more input devices (e.g., accelerometer(s), gyroscope(s)), movement of the viewpoint of the user of the electronic device (e.g., 101) (e.g., movement of the electronic device) in the three-dimensional environment (e.g., by an amount that is less than a predetermined threshold (e.g., the electronic device moves less than 1, 2, 3, 5, 10, 30, 50, etc. centimeters and/or rotates less than 0.1, 0.5, 1, 2, 3, 4, 5, etc. degrees). In some embodiments, the electronic device detects movement of the electronic device. For example, the electronic device is a wearable device (e.g., a head-mounted device, a smart watch) and movement of a predefined portion of the user (e.g., the user's head, the user's wrist) causes movement of the electronic device. In some embodiments, such as in FIG. 7F, in response to detecting the movement of the viewpoint of the user of the electronic device (e.g., 101) in the three-dimensional environment, in accordance with a determination that a gaze (e.g., 701*c*) of the user was directed to the first respective content (e.g., 708*d*) when the movement of the viewpoint of the user was detected, the electronic device updates (812*b*) display of the first view of the first physical location corresponding to the first respective content with a simulated parallax effect in accordance with the movement of the viewpoint of the user. In some embodiments, updating display of the first view of the first physical location with the parallax effect includes shifting the location of object(s) in the foreground of the first view of the first physical location by greater distance(s) than the distance(s) by which object(s) in the background of the first view of the first physical location are shifted. In some embodiments, updating display of the first view of the first physical location with the parallax effect causes one or more portions of the first respective content that were not previously visible (e.g., because they were blocked by other portions of the first respective content) to be visible.

The above-described manner of updating the first view of the first physical location with a parallax effect provides an intuitive way of updating the first content in accordance with movement of the viewpoint of the user, that corresponds to movement of the viewpoint and allows display of additional content not displayed before the movement, which additionally reduces power usage and improves battery life of the electronic device by enabling the user to use the electronic device more quickly and efficiently (e.g., reducing the number of inputs needed to update the first respective content when the viewpoint of the user moves).

In some embodiments, such as in FIG. 7E, while displaying the first respective content (e.g., 708*d*) corresponding to the first view of the first physical location, the electronic device (e.g., 101) detects (814*a*), via the one or more input devices, movement of the electronic device (e.g., 101) (e.g., by an amount that exceeds a predetermined threshold (e.g., 1, 2, 3, 5, 10, 30, 50, etc. centimeters and/or rotating at least 0.1, 0.5, 1, 2, 3, 4, 5, etc. degrees). In some embodiments, the electronic device is a wearable device (e.g., a head-mounted device, a smart watch) and movement of a predefined portion of the user (e.g., the user's head, the user's wrist) causes movement of the electronic device. Thus in some embodiments, while displaying the first respective content corresponding to the first view of the first physical location, the electronic device detects movement of a predefined portion (e.g., head, hand, arm, wrist) of the user (e.g., that satisfies one or more criteria, such as the speed or distance of the movement exceeding a threshold (e.g., 1, 2, 3, 5, 10, 30, 50, etc. centimeters)). In some embodiments, such as in FIG. 7F, in response to detecting the movement of the electronic device (e.g., 101) (e.g., or in response to detecting the movement of the predefined portion of the user), in accordance with a determination that the movement of the electronic device (e.g., 101) (e.g., or the movement of the predefined portion of the user) satisfies one or more criteria (e.g., exceeds a speed threshold, exceeds a distance threshold (e.g., 1, 2, 3, 5, 10, 30, 50, etc. centimeters), exceeds a rotation threshold (e.g., 0.1, 0.5, 1, 2, 3, 4, 5, etc. degrees)), the electronic device (e.g., 101) displays (814*b*), via the display generation component (e.g., 120), additional content (e.g., 708*d*) corresponding to the first physical location (e.g., an extension of the first respective content, additional information about the first physical location, etc.). In some embodiments, the additional information is displayed at a location corresponding to the movement of the electronic device (e.g., or the movement of the predefined portion of the user). For example, in response to detecting movement to the left, the electronic device displays the additional information to the left of the first respective content. In some embodiments, the electronic device expands the view of the first respective content in the direction in which the electronic device moves and increases the field of view of the first respective content and updates an indication of the field of view accordingly.

The above-described manner of displaying the additional information in response to detecting movement of the electronic device provides an efficient way of presenting additional information to the user in response to an intuitive input which additionally reduces power usage and improves battery life of the electronic device by enabling the user to use the electronic device more quickly and efficiently.

In some embodiments, such as in FIG. 7C, while displaying the first respective content (e.g., 708*c*) corresponding to the first view of the first physical location, the electronic device (e.g., 101) detects (816*a*), via the one or more input devices, an input directed to a selectable user interface element (e.g., 720*b*) displayed in the user interface. In some embodiments, the user interface element is a user interface element for shifting the physical location corresponding to the viewpoint of the respective content. In some embodiments, the user interface element is displayed proximate to or overlaid on the first respective content. In some embodiments, the user interface element is one of a plurality of arrows. In some embodiments, the arrows are movement arrows (e.g., to move the perspective of the first respective content laterally) or rotation arrows (e.g., to move the perspective of the first respective content rotationally). In some embodiments, the electronic device detects selection of the user interface element by detecting, via an eye tracking device, that the gaze of the user is directed to the user interface element while detecting, via a hand tracking device, a predefined pose of the hand of the user (e.g., a pinch pose in which the thumb of the hand is within a threshold distance (e.g., 0.1, 0.2, 0.3, 0.5, 1, 2, etc. centimeters) of another finger of the hand). In some embodiments, in response to detecting the input directed to the selectable user interface element (e.g., 720*b*) in FIG. 7C, the electronic device displays (816*b*) third respective content (e.g., 708*d*) corresponding to a respective view of a respective physical location, wherein the third respective content (e.g., 708*d*) is displayed at the first respective location in the three-dimensional environment, such as in FIG. 7D. For example, in response to detecting selection of an option to shift the viewpoint of the respective content to the left, the electronic device displays third respective content corresponding to a physical location to the left of the first physical location. As another example, in response to detecting selection of an option to rotate the viewpoint of the respective content to the left, the electronic device displays fourth respective content corresponding to the first physical location, with a view rotated to the left from the view of the first respective content. In some embodiments, the electronic device maintains the size (e.g., width) of the field of view of the first respective content in response to the input directed to the selectable user interface element, though the location of the field of view is updated.

The above-described manner of displaying the third respective content at the same location in the three-dimensional environment at which the first respective content was displayed provides an efficient way of browsing content corresponding to physical locations, which additionally reduces power usage and improves battery life of the electronic device by enabling the user to use the electronic device more quickly and efficiently (e.g., without the user having to direct their attention to a different region of the three-dimensional environment or provide an input to continue displaying the content at the third respective location in the three-dimensional environment).

In some embodiments, such as in FIG. 7E, while displaying the first respective content (e.g., 708*d*) corresponding to the first view of the first physical location, the electronic device (e.g., 101) detects (818*a*) movement of the electronic device (e.g., 101) relative to the three-dimensional environment. In some embodiments, the electronic device is a wearable device (e.g., a head-mounted device, a smart watch) and movement of a predefined portion of the user (e.g., the user's head, the user's wrist) causes movement of the electronic device. In some embodiments, while displaying the first respective content corresponding to the first view of the first physical location, the electronic device detects movement of a predefined portion (e.g., head, hand, arm, wrist) of the user. In some embodiments, such as in FIG. 7F, in accordance with a determination that the movement of the electronic device (e.g., 101) relative to the three-dimensional environment satisfies one or more criteria, the electronic device (e.g., 101) displays (818*b*), via the display generation component, additional content corresponding to the first physical location (e.g., an extension of the first respective content, additional information about the first physical location, etc.). In some embodiments, the one or more criteria are satisfied when the movement of the electronic device (e.g., or the predefined portion of the user) positions the electronic device such that the electronic device is not oriented towards a respective real object in the physical environment of the electronic device to which the user may wish to direct their attention (e.g., a window, doorway, display screen, person, animal, electronic device, appliance, vehicle, building, etc.) and/or towards a respective virtual object in the three-dimensional environment to which the user may wish to direct their attention (e.g., content, a user interface, etc.). In some embodiments, in accordance with a determination that the movement of the electronic device relative to the three-dimensional environment does not satisfy the one or more criteria, the electronic device forgoes (818*c*) displaying of the additional content corresponding to the first physical location (e.g., while maintaining display of the first respective content), such as forgoing updating the content user interface element 706 in FIG. 7F, for example. For example, in response to movement of the electronic device that orients the electronic device towards an empty wall, the electronic device displays the additional content overlaid on a portion of the empty wall. As another example, in response to movement of the electronic device that orients the electronic device towards a respective real object (e.g., a window, doorway, display screen, person, animal, electronic device, appliance, vehicle, building, etc.) to which the user may wish to direct their attention, the electronic device forgoes displaying the additional content overlaid on the respective object. In some embodiments, the electronic device expands the view of the first content to obscure portions of the three-dimensional environment other than the respective real object to which the user may wish to direct their attention, stopping when the first respective content reaches (e.g., is within a threshold (e.g., 1, 5, 10, 20, 30, 40, 50, 100, etc. centimeters) distance of) the respective real object. As another example, in response to movement of the electronic device that orients the electronic device towards a virtual object (e.g., content, a user interface) to which the user may wish to direct their attention, the electronic device forgoes displaying the additional content overlaid on the virtual object. Thus, in some embodiments, the user is able to view the respective real object or respective virtual object without the respective real object or respective virtual object being obstructed by the additional content. In some embodiments, when the electronic device expands the view of the first respective content, the electronic device increases the field of view of the first respective content and updates an indication of the field of view accordingly.

The above-described manner of selectively displaying the additional content depending on the movement of the electronic device relative to the three-dimensional environment provides an efficient way of preventing content from obscuring portions of the three-dimensional environment, which additionally reduces power usage and improves battery life of the electronic device by enabling the user to use the electronic device more quickly and efficiently (e.g., reducing the number of inputs needed to view the object in the three-dimensional environment other than the additional content, such as an input to cease display of the additional content in order to view the other object).

In some embodiments, such as in FIG. 7F, the one or more criteria include a criterion that is satisfied based on a change in an orientation of the electronic device (e.g., 101) (e.g., relative to one or more respective objects in the three-dimensional environment) and/or a criterion that is satisfied based on whether a gaze (e.g., 701c) of the user is directed to one or more respective objects in the three-dimensional environment (820a). In some embodiments, the electronic device forgoes display of the additional content in accordance with a determination that the electronic device is oriented towards a respective real object in the physical environment of the electronic device to which the user may wish to direct their attention (e.g., a window, doorway, display screen, person, animal, electronic device, appliance, vehicle, building, etc.) and/or towards a respective virtual object in the three-dimensional environment to which the user may wish to direct their attention (e.g., content, a user interface, etc.). In some embodiments, the electronic device forgoes display of the additional content in accordance with a determination that the user is looking at a respective real object in the physical environment of the electronic device to which the user may wish to direct their attention (e.g., a window, doorway, display screen, person, animal, electronic device, appliance, vehicle, building, etc.) and/or towards a respective virtual objecting the three-dimensional environment to which the user may wish to direct their attention (e.g., content, a user interface, etc.) (e.g., as determined by an eye tracking device in communication with the electronic device). In some embodiments, in accordance with a determination that the electronic device is not oriented towards a respective real object in the physical environment of the electronic device to which the user may wish to direct their attention (e.g., a window, doorway, display screen, person, animal, electronic device, appliance, vehicle, building, etc.) and/or towards a respective virtual objecting the three-dimensional environment to which the user may wish to direct their attention (e.g., content, a user interface, etc.), the electronic device displays the additional content in accordance with the movement of the electronic device. In some embodiments, in accordance with a determination that the gaze of the user is not directed towards a respective real object in the physical environment of the electronic device to which the user may wish to direct their attention (e.g., a window, doorway, display screen, person, animal, electronic device, appliance, vehicle, building, etc.) and/or towards a respective virtual objecting the three-dimensional environment to which the user may wish to direct their attention (e.g., content, a user interface, etc.), the electronic device displays the additional content in accordance with the movement of the electronic device. Thus, in some embodiments, the electronic device obscures the respective real or respective virtual object with the additional content. In some embodiments, the electronic device obscures the respective real or virtual object with the additional content if the gaze of the user is not directed to the respective real or virtual object while the movement of the electronic device is detected. In some embodiments, if the gaze of the user is directed to the real or virtual object while the movement of the electronic device is detected, the electronic device does not display the additional content at the location in the three-dimensional environment that obscures the respective real or virtual object.

The above-described manner of selectively displaying the additional content depending on the change in orientation of the electronic device relative to the three-dimensional environment and/or the gaze of the user provides an efficient way of enabling the user to maintain visibility of content in the three-dimensional environment other than the additional content, which additionally reduces power usage and improves battery life of the electronic device by enabling the user to use the electronic device more quickly and efficiently (e.g., reducing the number of inputs needed to view the object in the three-dimensional environment other than the additional content, such as an input to cease display of the additional content in order to view the other object).

In some embodiments, such as in FIG. 7D, while displaying the first respective content (e.g., 708d) occupying a first portion of a display area of the display generation component (e.g., 120) (e.g., a first respective portion of a view of the first physical location), the electronic device (e.g., 101) detects (822a), via an eye tracking device, that a gaze (e.g., 701b) of the user has been directed to the first respective content (e.g., 708d) for an amount of time exceeding a predetermined time threshold (e.g., 0.05, 0.1, 0.2, 0.3, 0.5, 1, 2, 5, 10, etc. seconds). In some embodiments, such as in FIG. 7E, in response to detecting that the gaze (e.g., 701b) of the user has been directed to the first respective content (e.g., 708d) for an amount of time exceeding a predetermined time threshold (e.g., 0.05, 0.1, 0.2, 0.3, 0.5, 1, 2, 5, 10, etc. seconds), the electronic device updates (822b) the first respective content (e.g., 708d) to occupy a second portion, larger than the first portion, of the display area of the display generation component (e.g., 120) (e.g., a second respective portion of the view of the first physical location larger than (e.g., including more content, objects, etc. than) the first respective portion of the view of the first physical location). In some embodiments, in response to detecting the gaze of the user directed to the first respective content for the time exceeding the predetermined time threshold (e.g., 0.05, 0.1, 0.2, 0.3, 0.5, 1, 2, etc. seconds), the electronic device expands the size of the first respective content. In some embodiments, in response to expanding the size of the first respective content, the electronic device increases the field of view of the first respective content (e.g., without updating an orientation of the field of view) and updates an indication of the field of view (e.g., displayed in the navigation user interface element) accordingly. In some embodiments, increasing the display area of the first respective content does not expand the field of view of the first respective content; rather, in some embodiments, the first respective content is scaled up while (e.g., size and orientation of) the field of view remains the same.

The above-described manner of expanding the size of the first respective content in response to detecting the gaze of the user directed to the first respective content for the time exceeding the predetermined threshold provides an efficient way of increasing the view of the first physical location which additionally reduces power usage and improves battery life of the electronic device by enabling the user to use the electronic device more quickly and efficiently (e.g., reducing the number of inputs to, for example, pan the view of the first physical location in order to view the first physical location).

In some embodiments, while displaying the first respective content, the electronic device displays (824a), in the navigation user interface element, an indication of a field of view of the first physical location corresponding to the first respective content. In some embodiments, the indication of the field of view is displayed proximate to or in association with (e.g., proximate to or incorporated with) a visual indication of the first location included in the navigation user interface element. In some embodiments, the indication of the field of view indicates the boundaries of the first physical location that are displayed within the first respective content. In some embodiments, while the first respective content occupies the first portion of the display area of the display generation component, the indication of the field of view indicates a first field of view (824b) (e.g., the boundaries of the first physical location included in the first respective content while the first respective content occupies the first portion of the display area). In some embodiments, while the first respective content occupies the second portion of the display area of the display generation component, the indication of the field of view indicates a second field of view, greater than the first field of view (824c) (e.g., the boundaries of the first physical location included in the first respective content while the first respective content occupies the second portion of the display area). In some embodiments, the second portion of the display area is larger than the first portion of the display area and/or the second field of view is larger than the first field of view.

The above-described manner of displaying the indication of the field of view according to the display area occupied by the first respective content provides an efficient way of indicating the portion of the first physical location represented by the first respective content, which additionally reduces power usage and improves battery life of the electronic device by enabling the user to use the electronic device more quickly and efficiently.

In some embodiments, such as in FIG. 7E, the first respective content (e.g., 708d) corresponds to a first field of view (e.g., 718e) having a first orientation (826a) (e.g., relative to the first physical location). In some embodiments, such as in FIG. 7E, while displaying the first respective content (e.g., 708d) and displaying, in the navigation user interface element (e.g., 704a), an indication of the first field of view (e.g., 718e), the electronic device (e.g., 101) detects (826b), via the one or more input devices, an input corresponding to a request to display third respective content that corresponds to a second field of view having a second orientation. In some embodiments, the third respective content and first respective content are images captured from the same physical location, but with different orientations (e.g., facing different directions while in the same location). In some embodiments, the third respective content and first respective content are images captured from different physical locations (e.g., and different orientations). In some embodiments, the widths of the first and second fields of view are the same. In some embodiments, the widths of the first and second fields of view are different. In some embodiments, the input that corresponds to a request to display third respective content is a request to rotate the viewpoint from the viewpoint of the first respective content to the viewpoint of the third respective content. In some embodiments, the input corresponds to a request to expand the first respective content in one or more (e.g., lateral) directions. In some embodiments, the input corresponds to a request to display the third respective content corresponding to a third physical location (e.g., lateral movement with respect to the first location). In some embodiments, such as in FIG. 7F, in response detecting the input corresponding to the request to display the third respective content (e.g., 708d) that corresponds to the second field of view (e.g., 718e) having the second orientation (826c) (e.g., corresponding to the first physical location or corresponding to a third physical location), the electronic device (e.g., 101) displays (826d), via the display generation component (e.g., 120), the third respective content (e.g., 708d) (e.g., at the first respective location in the three-dimensional environment). In some embodiments, such as in FIG. 7F, in response detecting the input corresponding to the request to display the third respective content (e.g., 708d) that corresponds to the second field of view (e.g., 718) having the second orientation (826c), the electronic device (e.g., 101) updates (826e), in the navigation user interface element (e.g., 704a), the indication of the first field of view to be an indication of the second field of view (e.g., 718e). In some embodiments, the indication of the field of view is displayed proximate to or in association with (e.g., proximate to or incorporated with) a visual indication of the physical location corresponding to the third respective content included in the navigation user interface element. In some embodiments, the indication of the second field of view indicates the boundaries of a physical location that are displayed within the third respective content.

The above-described manner of displaying the indication of the field of view according to the third respective content provides an efficient way of indicating the portion a respective physical location represented by the third respective content, which additionally reduces power usage and improves battery life of the electronic device by enabling the user to use the electronic device more quickly and efficiently.

In some embodiments, such as in FIG. 7A, in accordance with a determination that a physical environment of the electronic device (e.g., 101) satisfies one or more criteria, including a criterion that is satisfied based on an amount of unobstructed space (e.g., 0.5, 1, 2, 3, 4, 5, etc. meters in one or more directions) around the electronic device (e.g., 101) in the physical environment of the electronic device (e.g., 101), the electronic device (e.g., 101) displays (828*a*) the navigation user interface element (e.g., 704*a*) at a first size in the three-dimensional environment. In some embodiments, the electronic device displays the navigation user interface element at locations in the three-dimensional environment that do not overlap or intersect with locations of physical objects in the three-dimensional environment. In some embodiments, the size at which the navigation user interface element is displayed depends on the amount of unobstructed space around the electronic device in the physical environment of the electronic device. In some embodiments, such as in FIG. 7I, in accordance with a determination that the physical environment of the electronic device (e.g., 101) does not satisfy the one or more criteria, the electronic device (e.g., 101) displays (828*b*) the navigation user interface element (e.g., 704*d*) at a second size, different from (e.g., smaller than) the first size, in the three-dimensional environment. For example, the electronic device displays the navigation user interface element at a larger size when displaying the navigation user interface element in a room with empty space above a dining room table (e.g., approximately 2 meters of unobstructed space in multiple directions around the electronic device) than the size at which the electronic device displays the navigation user interface element in an office cubicle (e.g., approximately 0.5-1 meter of unobstructed space in multiple directions around the electronic device).

The above-described manner of displaying the navigation user interface element at a size corresponding to the amount of unobstructed space around the electronic device in the physical environment of the electronic device provides an efficient way of concurrently presenting representations of objects in the physical environment of the user with the navigation user interface element, which additionally reduces power usage and improves battery life of the electronic device by enabling the user to use the electronic device more quickly and efficiently (e.g., reducing the number of inputs needed to toggle between viewing the navigation user interface element and the representations of the objects in the physical environment of the electronic device).

In some embodiments, the navigation element (e.g., 704*a* in FIG. 7A) includes a first respective portion displayed in three dimensions in the three-dimensional environment (e.g., including three-dimensional representations of physical objects (e.g., buildings, landmarks, roads, infrastructure, geographic features, landforms, bodies of water, plants, natural features) in a physical location depicted by the navigation user interface element), and a second respective portion displayed in two dimensions in the three-dimensional environment (e.g., including two-dimensional representations of physical objects (e.g., buildings, landmarks, roads, infrastructure, geographic features, landforms, bodies of water, plants, natural features) in a physical location depicted by the navigation user interface element), wherein the first respective portion is closer (e.g., within a threshold distance (e.g., 0.5, 1, 2, 3, 4, 5, etc. meters)) to the viewpoint of the user than the second respective portion (830*a*). In some embodiments, in response to an input corresponding to a request to move the (e.g., representations of physical objects included in the) second respective portion of the navigation user interface element closer to the user (e.g., within the threshold distance of the user that defined the boundary between the first and second respective portions of the navigation user interface element), the electronic device displays the representations of physical objects in the second respective portion of the navigation user interface element in three dimensions. In some embodiments, in response to an input corresponding to a request to move the (e.g., representations of physical objects included in the) first respective portion of the navigation user interface element further from the user (e.g., outside of the threshold distance of the user that defines the boundary between the first and second respective portions of the navigation user interface element), the electronic device displays the representations of physical objects in the first respective portion of the navigation user interface element in two dimensions. In some embodiments, the first respective portion of the navigation user interface element is oriented along a horizontal plane (e.g., a real or virtual surface, a virtual plane) in the three-dimensional environment and the second respective portion of the navigation user interface element is displayed vertically behind the first respective portion of the navigation user interface element (e.g., curved up from the horizontal plane). In some embodiments, the first respective portion and the second respective portion of the navigation user interface element are joined by a curved portion of the navigation user interface element.

The above-described manner of displaying the first respective portion of the navigation user interface element in three dimensions and displaying the second respective portion of the navigation user interface element in two dimensions provides an efficient way of increasing the areas of the navigation user interface element concurrently visible to the user, which additionally reduces power usage and improves battery life of the electronic device by enabling the user to use the electronic device more quickly and efficiently.

In some embodiments, such as in FIG. 7A, while displaying the first respective content (e.g., 708*a*) (832*a*), the navigation user interface element (e.g., 704*a*) corresponds to a first physical region including the first physical location (832*b*). In some embodiments, the navigation user interface element includes representations of other physical locations in the first physical region, including representations of buildings, landmarks, roads, infrastructure, geographic features, landforms, bodies of water, plants, natural features, etc. In some embodiments, such as in FIG. 7A, while displaying the first respective content (e.g., 708*a*) (832*a*), the navigation user interface element (e.g., 704*a*) includes an indication of a topography of the first physical region (832*c*). In some embodiments, the navigation user interface element is displayed in three dimensions and includes a three-dimensional rendering of the topography (e.g., of the ground) of the first physical region. For example, if the first physical region includes a hill, the navigation user interface element includes a three-dimensional rendering of the hill. In some embodiments, the edges of the navigation user interface element show cross-sections of the topography of the physical locations corresponding to the edges of the navigation user interface element.

The above-described manner of displaying an indication of the topography of the first physical region within the navigation user interface element provides an efficient way of representing not only objects at the first physical location but also topography the first physical location, which additionally reduces power usage and improves battery life of the electronic device by enabling the user to use the electronic device more quickly and efficiently.

In some embodiments, such as in FIG. 7A, the navigation user interface element (e.g., 704*a*) includes respective content (e.g., 710*a*, 710*b*) displayed in three dimensions (834*a*) (e.g., three-dimensional representations of physical objects (e.g., buildings, landmarks, roads, infrastructure, geographic features, landforms, bodies of water, plants, natural features) in the physical region corresponding to the navigation user interface element). In some embodiments, such as in FIG. 7B, while displaying the navigation user interface element (e.g., 704*b*) that includes the respective content displayed in three dimensions, the electronic device (e.g., 101) detects (834*b*), via the one or more input devices (e.g., one or more cameras, range sensor, hand tracking devices, eye tracking devices), movement of a predefined portion (e.g., 728*a*) (e.g., hand, arm, head, etc.) of the user. In some embodiments, such as in FIG. 7B, in response to detecting the movement of the predefined portion (e.g., 728*a*) of the user (834*c*), in accordance with a determination that the predefined portion (e.g., 728*a*) of the user is at a location corresponding to the respective content displayed in three dimensions in the navigation user interface element (e.g., 704*b*) (e.g., the location of the predefined portion of the user in the three-dimensional environment intersects with or is within a threshold distance (e.g., 0.1, 0.2, 0.3, 0.5, 1, 2, 3, 4, 5, 10, etc. centimeters) of the location of the respective content in the three-dimensional environment), the electronic device (e.g., 101) updates (834*d*) the navigation user interface element (e.g., 704*b*) to visually de-emphasize (e.g., no longer include) the respective content displayed in three dimensions, such as in FIG. 7B (e.g., ceasing display of or deemphasizing display of (e.g., making more transparent, less opaque) the respective content or displaying the respective content in two dimensions). In some embodiments, the electronic device ceases three-dimensional display of the content that is at the location corresponding to the predefined portion of the user and maintains display of other content of the navigation user interface element in three dimensions at locations not corresponding to the location of the predefined portion of the user. In some embodiments, the electronic device presents a representation of the predefined portion of the user. In some embodiments, the representation of the predefined portion of the user is a representation of the predefined portion of the user presented by the display generation component (e.g., virtual or video passthrough). In some embodiments, the representation of the predefined portion of the user is a view of the predefined portion of the user through a transparent portion of the display generation component (e.g., true or real passthrough).

The above-described manner of ceasing display of the respective content in the three dimensions in response to detecting the movement of the predefined portion of the user to the location corresponding to the respective content provides an efficient way of maintaining visibility of a representation of the predefined portion of the user, which additionally reduces power usage and improves battery life of the electronic device by enabling the user to use the electronic device more quickly and efficiently.

In some embodiments, the electronic device displays (836*a*), within the navigation user interface element, an indication of a second electronic device (e.g., associated with a user that is different from the user of the electronic device) displayed at a respective location within the navigation user interface element corresponding to a respective physical location of the second electronic device, such as displaying an indication of a second electronic device in the navigation user interface element 704*a* in FIG. 7A. In some embodiments, the electronic device receives an indication (e.g., from the second electronic device, from a server) of the location of the second electronic device. For example, the user of the electronic device and the second user of the second electronic device are connected via a service that presents the locations of the second electronic device to the electronic device and the location of the electronic device to the second electronic device. In some embodiments, while displaying the indication of the second electronic device in the navigation user interface element, the electronic device detects (836*b*), via the one or more input devices, selection of the indication of the second electronic device, in a manner similar to detecting selection of option 720*b* in FIG. 7C. In some embodiments, detecting selection of the indication includes detecting, via an eye tracking device, that the gaze of the user is directed to the indication of the second electronic device and detecting, via a hand tracking device, the user perform a predetermined gesture (e.g., a pinch gesture in which the user moves their thumb within a threshold distance (e.g., 0.05, 0.1, 0.5, 1, 2, etc. centimeters) of another finger of the hand). In some embodiments, detecting selection of the indication includes detecting, via a hand tracking device, the user perform a predetermined gesture (e.g., a pinch gesture in which the user moves their thumb within a threshold distance (e.g., 0.05, 0.1, 0.5, 1, 2, etc. centimeters) of another finger of the hand) while the predetermined portion (e.g., the hand) of the user is within a threshold distance (e.g., 1, 2, 3, 5, 10, 20, etc. centimeters) of a location corresponding to the indication of the second electronic device. In some embodiments, in response to detecting the selection of the indication of the second electronic device, the electronic device displays (836*c*), via the display generation component (e.g., at the first respective location in the three-dimensional environment), content captured by the second electronic device of the respective physical location of the second electronic device, in a manner similar to the manner in which electronic device presents content 708*a* corresponding to indication 716 in FIG. 7A. For example, the content is live video captured by (e.g., one or more cameras and/or microphones in communication with) the second electronic device. In some embodiments, the content is one or more images and/or video content associated with the physical location of the second electronic device (e.g., captured by or not captured by the second electronic device).

The above-described manner of presenting the content captured by the second electronic device in response to detecting selection of the indication of the second electronic device displayed at a location in the navigation user interface element corresponding to the location of the second electronic device provides an efficient way of viewing content corresponding to the location of the second electronic device, which additionally reduces power usage and improves battery life of the electronic device by enabling the user to use the electronic device more quickly and efficiently.

In some embodiments, such as in FIG. 7G, the first respective content includes a two-dimensional representation (e.g., 732*b*) of an object (e.g., building, landmark, road, infrastructure, geographic feature, landform, body of water, plant, natural feature) located at (or visible from) the first physical location (838*a*). In some embodiments, such as in FIG. 7G, the electronic device (e.g., 101) concurrently displays (838*b*) the first respective content including the two-dimensional representation (e.g., 732*b*) of the object and a three-dimensional representation of the object (e.g., 708*e*) (e.g., displayed in front of the first respective content). In some embodiments, while displaying the two-dimensional and three-dimensional representations of the object, the electronic device maintains display of the navigation user interface element. In some embodiments, the three-dimensional representation of the object is displayed in response to detecting selection of a user interface element displayed in the first respective location of the three-dimensional environment (e.g., within, proximate to, overlaid on, etc. the first respective content). In some embodiments, the three-dimensional representation of the object is displayed in response to detecting selection of the two-dimensional representation of the object. In some embodiments, the three-dimensional representation of the object is displayed between the viewpoint of the user and the two-dimensional representation of the object.

The above-described manner of concurrently displaying the two-dimensional representation and three dimensional representation of the object provides an efficient way of viewing more information about (e.g., different views of) an object, which additionally reduces power usage and improves battery life of the electronic device by enabling the user to use the electronic device more quickly and efficiently.

FIGS. 9A-9H is a flowchart illustrating a method of presenting navigation from a first physical location to a second physical location with reduced visual prominence in a content element in response to an input corresponding to a request to present content corresponding to the second physical location in accordance with some embodiments. In some embodiments, the method 900 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 900 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 900 are, optionally, combined and/or the order of some operations is, optionally, changed.

In some embodiments, method 900 is performed at an electronic device (e.g., 101) in communication with a display generation component and one or more input devices (e.g., a mobile device (e.g., a tablet, a smartphone, a media player, or a wearable device), or a computer). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device, and/or a motion sensor (e.g., a hand tracking device, a hand motion sensor), etc. In some embodiments, the electronic device is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, such as in FIG. 7A, the electronic device (e.g., 101) displays (902*a*), via the display generation component (e.g., 120), a user interface that includes a navigation user interface element (e.g., 704*a*) with a first location (e.g., 716) corresponding to a first physical location (902*b*). In some embodiments, the user interface includes a three-dimensional environment that includes representations of virtual objects, including the user interface, and representations of real objects in the physical environment of the electronic device. The three-dimensional environment is optionally presented from a first-person perspective from the viewpoint of a user associated with the electronic device at a respective location in the three-dimensional environment (e.g., corresponding to the location of the electronic device). In some embodiments, the navigation user interface element includes a three-dimensional topographical map of a physical location with a visual indication (e.g., a pin) at the first location corresponding to the first physical location, such as described with reference to method 800. For example, the navigation user interface element includes a three-dimensional topographical map of a city including three-dimensional representations of buildings, streets, and other landmarks with a flag, pin, or other visual indication displayed at the first location that corresponds to an address, landmark, or coordinates in the city. In some embodiments, the electronic device displays the navigation user interface element with the first location corresponding to the first physical location designated.

In some embodiments, such as in FIG. 7A, the electronic device (e.g., 101) displays (902*a*), via the display generation component (e.g., 120), a user interface that includes a content element (e.g., 706) including first respective content (e.g., 708*a*) corresponding to a first view of the first physical location (e.g., 716), wherein the content element (e.g., 706) is displayed with a first degree of visual prominence (902*c*). In some embodiments, the first respective content is an image taken from and/or of the first physical location (e.g., a street level view image from the first physical location). In some embodiments, the first respective content is (e.g., live) video recorded at the first physical location. In some embodiments, the first respective content has one or more characteristics of the first respective content described with reference to method 800. In some embodiments, the degree of visual prominence is an amount of blur applied to the content element and/or first respective content included in the content element, and displaying the content element with the first degree of visual prominence is displaying the content element and/or first respective content included in the content element with no (or relatively low) blur. In some embodiments, the degree of visual prominence is an amount of translucency (e.g., relatively low translucency), contrast (e.g., relatively high contrast), color (e.g., relatively high or light color), size (e.g., relatively large size), and/or position (e.g., relatively prominent/central position) in the user interface. In some embodiments, the navigation user interface element and/or content element and/or first respective content are displayed in a three-dimensional environment that is generated, displayed, or otherwise caused to be viewable by the device (e.g., a computer-generated reality (XR) environment such as a virtual reality (VR) environment, a mixed reality (MR) environment, or an augmented reality (AR) environment, etc.).

In some embodiments, such as in FIG. 7B, while displaying, via the display generation component (e.g., 120), the content element (e.g., 706) with the first degree of visual prominence, the electronic device (e.g., 101) detects (902*d*), via the one or more input devices, a user input (or a sequence of a plurality of user inputs) that corresponds to a request to designate a second location corresponding to a second physical location. In some embodiments, the input is directed towards the navigation user interface element, such as an input to move the indication of the designated location from the first location to the second location on the topographical map. In some embodiments, the input is directed towards the first respective content, such as an input to change the perspective of the content from the first physical location to the second physical location or to rotate the field of view of the first respective content. In some embodiments, the user input has one or more characteristics of the user input corresponding to the request to designate the second location corresponding to the second physical location described with reference to method 800.

In some embodiments, such as in FIG. 7B, in response to (e.g., while) detecting the user input, the electronic device (e.g., 101) displays (902*e*), in the content element (e.g., 706), navigation from the first location to the second location that includes displaying a representation of one or more locations between the first location and the second location with a reduced degree of visual prominence relative to the first degree of visual prominence. In some embodiments, the degree of visual prominence is the degree of one or more of translucency (e.g., relatively high translucency), contrast (e.g., relatively low contrast), color (e.g., relatively low or dark color), size (e.g., relatively small size), and/or position (e.g., relatively subtle/peripheral position) in the user interface. In some embodiments, while the user input is being provided, the electronic device displays the content element and/or the content included in the content element with a blurred (e.g., relatively high blur) appearance. In some embodiments, the input is the user moving the visual indication (e.g., pin) of a respective location corresponding to a respective physical location from one location in the navigation user interface element to a different location in the navigation user interface element. For example, the user picks up the visual indication from the first location and places it at the second location in the navigation user interface element and while the user is moving the visual indication, the electronic device blurs the content element. In some embodiments, while detecting the user input (or sequence of a plurality of user inputs), the content element includes the first respective content with the reduced degree of visual prominence (e.g., relatively high amount of blur). In some embodiments, while detecting the user input (or sequence of a plurality of user inputs), the content element updates to include respective content corresponding to the current position of the visual indication of a respective location in the map navigation element displayed with the reduced degree of visual prominence (e.g., relatively high amount of blur).

In some embodiments, such as in FIG. 7C, after displaying navigation from the first location to the second location (and in response to detecting the user input), the electronic device (e.g., 101) displays (902*f*) second respective content (e.g., 708*c*) corresponding to a second view of the second physical location (e.g., 716) (e.g., such as described with reference to method 800) in the content element (e.g., 706) with a degree of visual prominence that is greater than the reduced degree of visual prominence relative to the first degree of visual prominence. In some embodiments, after the user finishes providing the input or inputs for designating the second location, the electronic device updates the content element to include the second respective content and updates the navigation user interface to include a visual indication (e.g., pin) of the designation of the second physical location. In some embodiments, the second respective content is an image taken from the second physical location. In some embodiments, the first respective content is (e.g., live) video recorded at the second physical location. In some embodiments, the electronic device maintains the locations in the three-dimensional environment at which the content and the navigation user interface element are displayed in response to the user input. In some embodiments, in response to detecting the input and/or after the input is detected, the electronic device displays the second respective content with no blur (and/or the other characteristics of visual prominence corresponding to the first degree of visual prominence, as described previously). In some embodiments, the degree of visual prominence that is greater than the reduced degree of visual prominence is the same as the first degree of visual prominence with which the user interface is displayed prior to detecting the input. In some embodiments, the degree of visual prominence that is greater than the reduced degree of visual prominence is more visually prominent than the first degree of visual prominence with which the user interface is displayed prior to detecting the input. In some embodiments, the degree of visual prominence that is greater than the reduced degree of visual prominence is less visually prominent than the first degree of visual prominence with which the user interface is displayed prior to detecting the input.

The above-described manner of updating the visual characteristic of the content element while detecting the user input corresponding to the request to designate the second location provides an efficient way of indicating to the user that designating the second location will update the content element, which additionally reduces power usage and improves battery life of the electronic device by enabling the user to use the electronic device more quickly and efficiently and reduces errors in usage which would have to be corrected with further user inputs and reduces the need for the electronic device to fully render content corresponding to the first location and/or intermediate locations between the first and second location (e.g., while the visual indication of the location corresponding to the content is being moved).

In some embodiments, such as in FIG. 7B, displaying the content element (e.g., 706) with the reduced degree of visual prominence includes displaying an entirety of the content element (e.g., 706) with the reduced degree of visual prominence (904*a*) (e.g., blurring, fading, darkening, etc. the entire area of the content element). In some embodiments, displaying the entire content element with the reduced degree of visual prominence includes displaying the entire respective content included in the content element with the reduced degree of visual prominence.

The above-described manner of displaying the entirety of the content element with the reduced degree of visual prominence provides an efficient way of indicating to the user that designating the second location will update the content element, which additionally reduces power usage and improves battery life of the electronic device by enabling the user to use the electronic device more quickly and efficiently and reduces errors in usage which would have to be corrected with further user inputs and reduces the need for the electronic device to fully render content corresponding to the first location and/or intermediate locations between the first and second location (e.g., while the visual indication of the location corresponding to the content is being moved).

In some embodiments, displaying the content element with the reduced degree of visual prominence includes displaying a first region of the content element that (e.g., at least partially) surrounds a second region of the content element (e.g., the edges of the content element) with the reduced degree of visual prominence (e.g., blurring, fading, darkening, etc.), and displaying the second region of the content element with the first degree of visual prominence, such as displaying a center portion of the content user interface element 704b in FIG. 7B without the reduced degree of visual prominence (906a) (e.g., without being blurred, faded, darkened, etc.). In some embodiments, displaying the first region of the content element with the reduced degree of visual prominence includes displaying the portions of respective content included in the first region of the content element with the reduced degree of visual prominence. In some embodiments, the electronic device content element with edges that are blurred, faded, and/or darkened.

The above-described manner of displaying the first region of the content element with the reduced degree of visual prominence provides an efficient way of indicating to the user that designating the second location will update the content element, which additionally reduces power usage and improves battery life of the electronic device by enabling the user to use the electronic device more quickly and efficiently and reduces errors in usage which would have to be corrected with further user inputs and reduces the need for the electronic device to fully render content corresponding to the first location and/or intermediate locations between the first and second location (e.g., while the visual indication of the location corresponding to the content is being moved).

In some embodiments, such as in FIG. 7A, while displaying the content element (e.g., 706) with the first degree of visual prominence and before detecting the user input that corresponds to the request to designate the second location corresponding to the second physical location, the electronic device (e.g., 101) displays (908a) at least a portion of the navigation user interface element (e.g., 704a) with a second degree of visual prominence (e.g., in three dimensions, with full color). In some embodiments, the navigation user interface element is a three-dimensional map of a region including the first location. For example, the navigation user interface element includes three-dimensional representations of buildings, landmarks, roads, infrastructure, geographic features, landforms, bodies of water, plants, natural features, etc. in the region. In some embodiments, while displaying (at least the portion of) the navigation user interface element with the second degree of visual prominence, the electronic device displays all of (or at least the portion of) the representations in the navigation user interface element in three dimensions and with full color, translucency, etc. In some embodiments, such as in FIG. 7B, while detecting the user input and while displaying the content element (e.g., 706) with the reduced degree of visual prominence relative to the first degree of visual prominence, the electronic device (e.g., 101) displays (908b) the at least the portion of the navigation user interface element (e.g., 704b) with a reduced degree of visual prominence relative to the second degree of visual prominence (e.g., in two dimensions, with faded/darkened color, with increased translucency). In some embodiments, the electronic device updates the navigation user interface element to include two-dimensional and/or darkened, faded, and/or translucent representations of the one or more of the objects in the region represented by the navigation user interface element while detecting the user input. In some embodiments, the electronic device displays the entire navigation user interface element with the reduced degree of visual prominence while detecting the user input. In some embodiments, the electronic device displays at least the portion of the navigation user interface element (e.g., the edges, a portion at a location corresponding to a predefined portion (e.g., hand, arm, head, fingers) of the user) with the reduced degree of visual prominence while detecting the user input.

The above-described manner of displaying at least the portion of the navigation user interface element with the reduced degree of visual prominence while detecting the user input reduces the need for the electronic device to fully render the navigation user interface element while the input is detected, which reduces power usage and improves battery life of the electronic device by reducing the number and/or complexity of operations being performed by the electronic device.

In some embodiments, such as in FIG. 7C, after displaying the navigation from the first location to the second location and while displaying the content element (e.g., 706) with the degree of visual prominence that is greater than the reduced degree of visual prominence relative to the first degree of visual prominence, the electronic device (e.g., 101) displays (910a) the navigation user interface element (e.g., 704a) with a degree of visual prominence that is greater than the reduced degree of visual prominence relative to the second degree of visual prominence (e.g., with the second degree of visual prominence, with a degree of visual prominence different from the second degree of visual prominence). In some embodiments, after displaying the navigation from the first location to the second location, the electronic device displays the navigation user interface element with one or more representations of physical objects (e.g., buildings, landmarks, roads, infrastructure, geographic features, landforms, bodies of water, plants, natural features) in three dimensions and/or with colors that are more saturated, less translucent, less blurred relative to the colors of the representations while displaying the navigation user interface element with the reduced degree of visual prominence relative to the second degree of visual prominence. In some embodiments, while displaying the navigation from the first location to the second location, the electronic device displays the navigation user interface element with reduced visual prominence and after displaying the navigation from the first location to the second location, the electronic device increases the visual prominence of the navigation user interface element.

The above-described manner of increasing the visual prominence with which the navigation user interface element is displayed after displaying the navigation from the first location to the second location provides an efficient way of improving the visibility of the navigation user interface element automatically, which additionally reduces power usage and improves battery life of the electronic device by enabling the user to use the electronic device more quickly and efficiently (e.g., reducing the number of inputs needed to view the navigation user interface element after displaying the navigation from the first location to the second location).

In some embodiments, such as in FIG. 7B, detecting the user input that corresponds to the request to designate the second location includes (912a) detecting, via an eye tracking device, that a gaze (e.g., 701*d*) of a user of the electronic device (e.g., 101) is directed to the navigation user interface element (e.g., 704*b*) (912*b*). In some embodiments, the electronic device detects that the gaze of the user is directed to a visual indication of the designation of the first physical location (e.g., displayed at the first location in the navigation user interface element). In some embodiments, the electronic device detects that the gaze of the user is directed to the second location of the navigation user interface element corresponding to the second physical location. In some embodiments, such as in FIG. 7B, detecting the user input that corresponds to the request to designate the second location includes (912*a*) detecting, via the one or more input devices (e.g., a hand tracking device), that a gesture of a predefined portion (e.g., 728*a*) (e.g., finger(s), hand, arm, head, etc.) of the user of the electronic device (e.g., 101) satisfies one or more criteria (912*c*). In some embodiments, the predefined gesture corresponds to a pinch gesture in which the user moves the thumb of their hand to touch another finger on the hand. In some embodiments, the electronic device detects the user looking at the visual indication of the designation of the first location while making the gesture that satisfies the one or more criteria to "pick up" the designation to initiate a process to move the designation (e.g., in accordance with movement of the predefined portion of the user). In some embodiments, the electronic device detects the user looking at the second location while making the gesture that satisfies the one or more criteria to move the designation to the second location.

The above-described manner of navigating from the first location to the second location in response to detecting the gaze of the user and a gesture performed by the user provides an intuitive way of navigating the user interface (e.g., without manipulating a tactile input device), which additionally reduces power usage and improves battery life of the electronic device by enabling the user to use the electronic device more quickly and efficiently.

In some embodiments, such as in FIG. 7B, while displaying the navigation from the first location to the second location in the content element (e.g., 706), the electronic device (e.g., 101) displays (914*a*) a corresponding animation of navigation from the first location to the second location in the navigation user interface element (e.g., 704*b*). In some embodiments, the corresponding animation of navigation from the first location to the second location in the navigation user interface element includes panning and/or zooming the navigation user interface element. In some embodiments, the corresponding animation of navigation from the first location to the second location in the navigation user interface element includes displaying an animation moving a visual indication of a designated location (e.g., a flag, a pin, etc.) from the first location to the second location in the navigation user interface element.

The above-described manner of displaying the animation of navigation from the first location to the second location in the navigation user interface element provides an efficient way of indicating to the user that designating the second location will update the user interface, which additionally reduces power usage and improves battery life of the electronic device by enabling the user to use the electronic device more quickly and efficiently and reduces errors in usage which would have to be corrected with further user inputs.

In some embodiments, the electronic device displays (916*a*), in the user interface, a selectable option that is selectable to display a preview of a navigation route from a first respective physical location to a second respective physical location (e.g., such as the preview of the navigation route in FIG. 7H). In some embodiments, the selectable option is displayed in response to a request to present the navigation route from the first respective physical location to the second respective physical location. In some embodiments, the selectable option is concurrently displayed with an indication of the navigation route from the first respective physical location to the second respective physical location. In some embodiments, such as in FIG. 7H, in response to detecting selection of the selectable option (916*b*), the electronic device (e.g., 101) displays (916*c*) in the content element (e.g., 706), an animation (e.g., 7080 of a view corresponding to navigating the navigation route. In some embodiments, the animation of the view corresponding to navigating the navigation route is video content and/or a series of images from the perspective of someone navigating the navigation route. In some embodiments, such as in FIG. 7H, in response to detecting selection of the selectable option (916*b*), the electronic device (e.g., 101) displays (916*d*), in the navigation user interface element (e.g., 704*c*), a corresponding indication (e.g., 736) of navigating the navigation route (e.g., 740). In some embodiments, the corresponding indication displayed in the navigation user interface element includes a visual indication of the navigation route (e.g., a navigation path overlaid on the navigation user interface element) and an indication of a respective physical location that corresponds to the portion of the animation displayed in the content element. In some embodiments, as the animation in the content element progresses, the indication of the respective physical location corresponding to the portion of the animation displayed in the content element moves such that the indication in the navigation user interface element moves in a manner that is synchronized with the animation displayed in the content element. In some embodiments, the visual indication of the navigation route is a representation of the navigation route displayed with a different visual characteristic (e.g., color, thickness, etc.) than the visual characteristic of other roads included in the navigation user interface element that are not along the navigation route.

The above-described manner of displaying the animation in the content element and the corresponding indication in the navigation user interface element provides an efficient way of concurrently presenting the animation with an indication of a respective physical location corresponding to the currently-displayed portion of the animation, which additionally reduces power usage and improves battery life of the electronic device by enabling the user to use the electronic device more quickly and efficiently (e.g., by reducing the number of inputs needed to determine the physical location corresponding to portions of the animation).

In some embodiments, such as while detecting the input illustrated in FIG. 7B, the navigation user interface element (e.g., 704*b*) includes one or more (e.g., three-dimensional, two-dimensional) representations (e.g., 710*c*) of respective objects (e.g., buildings, landmarks, roads, infrastructure, geographic features, landforms, bodies of water, plants, natural features) located at respective physical locations corresponding to the navigation user interface element (e.g., 704*b*) (918*a*). In some embodiments, the navigation user interface element includes three-dimensional representations of physical objects located in a respective physical region corresponding to the region displayed in the navigation user interface element. In some embodiments, while displaying the navigation user interface element (e.g., 704*b* in FIG. 7B) (918*b*), in accordance with a determination that a boundary of the navigation user interface element (e.g., 704b) coincides with a respective one of the one or more representations (e.g., 710c) of the respective objects, the electronic device (e.g., 101) forgoes (918c) display of the respective one of the one or more representations of the respective objects in the navigation user interface element. In some embodiments, while displaying the navigation user interface element, in accordance with a determination that a respective one of the one or more representations of the respective objects is within the boundary of the navigation user interface element, the electronic device maintains display of the respective one of the one or more representations of the respective objects in the navigation user interface element. In some embodiments, the electronic device displays representations of objects that are fully within the boundaries of the navigation user interface element. In some embodiments, in response to panning the navigation user interface element, the electronic device updates the navigation user interface element to cease display of representations of objects that, due to the panning of the navigation user interface element, are now displayed at locations corresponding to the boundary of the navigation user interface element (e.g., the boundary between the navigation user interface element and a representation of a physical environment of the device that is displayed as surrounding the navigation user interface element). In some embodiments, in response to panning the navigation user interface element, the electronic device updates the navigation user interface element to initiate display of representations of objects that, due to the panning of the navigation user interface element, are now displayed at locations fully within the boundary of the navigation user interface element. In some embodiments, the electronic device forgoes display of representations of first types of objects (e.g., buildings, plants) that are located at locations corresponding to the boundary of the navigation user interface element and displays portions of representations of objects of second types (e.g., roads, geographic features, bodies of water) that are located at locations corresponding to the boundary of the navigation user interface element.

The above-described manner of forging display of representations of objects that coincide with the boundary of the navigation user interface element reduces the amount of content displayed by the electronic device via the display generation component, which reduces power usage and improves battery life of the electronic device (e.g., by rendering fewer representations).

In some embodiments, such as in FIG. 7A, while displaying the navigation user interface element (e.g., 704a), wherein the navigation user interface element (e.g., 704a) includes a first representation (e.g., 710a) of a first (e.g., physical) object located at a first physical location and a second representation (e.g., 710b) of a second (e.g., physical) object located at a second physical location, and wherein the first representation (e.g., 710a) of the first object and the second representation (e.g., 710b) of the second object are displayed in three dimensions in the navigation user interface element (e.g., 704a), the electronic device (e.g., 101) detects (920a), via the one or more input devices, an input corresponding to a request to perform a search corresponding to information represented by the navigation user interface element (e.g., 704a) based on a respective search query. In some embodiments, the navigation user interface element includes three-dimensional representations of physical objects (e.g., buildings, landmarks, roads, infrastructure, geographic features, landforms, bodies of water, plants, natural features) located in a respective physical region. In some embodiments, the respective search query corresponds to a respective physical location, respective landmark, respective address, etc. In some embodiments, in response to detecting the input corresponding to the request to search the navigation user interface element based on the respective search query (920b), in accordance with a determination that the respective search query corresponds to the first object and not the second object (e.g., the first object matches the query and the second object does not match the query), the electronic device (e.g., 101) displays (920c), in the navigation user interface element (e.g., 704b), the first representation (e.g., 710d) of the first object in three dimensions in the navigation user interface element (e.g., 704b) and forgoes (920c) displaying at least a portion (e.g., or all of) of the second representation of the second object in three dimensions in the navigation user interface element (e.g., 704b), such as in FIG. 7G. In some embodiments, the second representation of the second object (and representations of other objects that do not correspond to the respective search query) is displayed in two dimensions. In some embodiments, the electronic device ceases display of the second representation of the second object (and representations of other objects that do not correspond to the respective search query). In some embodiments, the electronic device decreases the height of the second representation of the second object (and representations of other objects that do not correspond to the respective search query) and/or reduces the degree to which the second representation of the second object (and representations of other objects that do not correspond to the respective search query) are displayed in three dimensions. In some embodiments, in response to detecting the input corresponding to the request to search the navigation user interface element (e.g., 704b) based on respective search query (920b), in accordance with a determination that the respective search query corresponds to the second object and not the first object (e.g., the second object matches the query and the first object does not match the query), the electronic device (e.g., 101) displays (920d), in the navigation user interface element (e.g., 704b), the second representation (e.g., 710d) of the second object in three dimensions in the navigation user interface element and forgoes (920d) displaying at least a portion (or all) of the first representation of the first object in three dimensions in the navigation user interface element (e.g., 704b), such as in FIG. 7G. In some embodiments, the first representation of the first object (and representations of other objects that do not correspond to the respective search query) is displayed in two dimensions. In some embodiments, the electronic device ceases display of the first representation of the first object (and representations of other objects that do not correspond to the respective search query). In some embodiments, prior to detecting the input corresponding to the request to search the navigation user interface element based on a respective search query, the representations of objects in the navigation user interface element are displayed in two dimensions and, in response to the search query, the electronic device updates the navigation user interface element to display representations of objects matching the search query in three dimensions (e.g., and maintains display of representations of objects that do not match the search query in two dimensions). In some embodiments, prior to detecting the input corresponding to the request to search the navigation user interface element based on a respective search query, the representations of objects in the navigation user interface element are displayed in three dimensions and, in response to the search query, the electronic device maintains display representations of objects matching the search query in three dimensions (e.g., and updates the navigation user interface element to display representations of objects that do not match the search query in two dimensions).

The above-described manner of displaying the objects corresponding to the search query in three dimensions and ceasing display of three-dimensional representations of objects that do not correspond to the search query in the navigation user interface element provides an efficient way of highlighting representations of objects that match the respective search query, which additionally reduces power usage and improves battery life of the electronic device by enabling the user to use the electronic device more quickly and efficiently (e.g., reducing the number of inputs needed to determine which objects correspond to the search query and which do not).

In some embodiments, such as in FIG. 7A, while displaying the navigation user interface element (e.g., 704*a*), wherein the navigation user interface element (e.g., 704*a*) includes a first representation (e.g., 710*a*) of a first (e.g., physical) object located at a first physical location and a second representation (e.g., 710*b*) of a second (e.g., physical) object located at a second physical location, and wherein the first representation (e.g., 710*a*) of the first object and the second representation (e.g., 710*b*) of the second object are displayed with a visual characteristic (e.g., color, color scheme, translucency, brightness, color saturation) having a first value, the electronic device (e.g., 101) detects (922*a*), via the one or more input devices, an input corresponding to a request perform a to search corresponding to information represented by the navigation user interface element based on a respective search query. In some embodiments, the navigation user interface element includes representations of physical objects (e.g., buildings, landmarks, roads, infrastructure, geographic features, landforms, bodies of water, plants, natural features) located in a respective physical region displayed in first color(s). For example, the representations are displayed in colors corresponding to the type of object corresponding to the representation (e.g., buildings in a first color, roads in a second color, plants in a third color). As another example, the representations are displayed in full color corresponding to the colors of the objects corresponding to the representations. In some embodiments, the respective search query corresponds to a respective physical location, respective landmark, respective address, etc. In some embodiments, in response to detecting the input corresponding to the request to search the navigation user interface element based on respective search query (922*b*), in accordance with a determination that the respective search query corresponds to the first object and not the second object (e.g., the first object matches the query and the second object does not match the query), the electronic device (e.g., 101) displays (922*c*), in the navigation user interface element (e.g., 704*b*), at least a portion of (or all of) the first representation (e.g., 710*d*) of the first object with the visual characteristic having a second value (e.g., that is the same as or different from the first value) in the navigation user interface element (e.g., 704*b*) and displays (922*c*) at least a portion of (or all of) the second representation (e.g., 710*e*) of the second object with the visual characteristic having at third value (e.g., that is the same as or different from the first value) different from the second value in the navigation user interface element (e.g., 704*b*), such as in FIG. 7G. In some embodiments, the second representation of the second object (and representations of other objects that do not correspond to the respective search query) is displayed in a different color, with a different color scheme or setting, etc. than the first representation of the first object that corresponds to the respective search query. In some embodiments, in response to detecting the input corresponding to the request to search the navigation user interface element based on respective search query (922*b*), in accordance with a determination that the respective search query corresponds to the second object and not the first object (e.g., the second object matches the query and the first object does not match the query), the electronic device (e.g., 101) displays (922*d*), in the navigation user interface element (e.g., 704*b*), at least a portion of (or all of) the second representation (e.g., 710*d*) of the second object with the visual characteristic having the second value (e.g., that is the same as or different from the first value) in the navigation user interface element (e.g., 704*b*) and displays (922*d*) at least a portion of (or all of) the first representation (e.g., 710*e*) of the first object with the visual characteristic having the third value (e.g., that is the same as or different from the first value) in the navigation user interface element (e.g., 704*b*). In some embodiments, the first representation of the first object (and representations of other objects that do not correspond to the respective search query) is displayed in a different color, with a different color scheme or setting, etc. than the second representation of the second object that corresponds to the respective search query). In some embodiments, the electronic device maintains the color, color scheme or setting, etc. of representations of objects that correspond to the search query and modifies the color, color scheme or setting, etc. of representations of objects that do not correspond to the search query. For example, the electronic device reduces the color saturation or contrast of the representations that do not correspond to the search query or displays the representations that do not correspond to the search query in a predetermined color. In some embodiments, the electronic device maintains the color, color scheme or setting, etc. of representations of objects that do not correspond to the search query and modifies the color, color scheme, or setting, etc. of representations of objects that correspond to the search query. For example, the electronic device highlights, brightens or uses a predetermined color for representations of objects that correspond to the search query. In some embodiments, the electronic device displays representations of objects that correspond to the search query in a first color or with a first color scheme or setting different from the way in which the representations of objects were displayed prior to detecting the request to search and displays representations of objects that do not correspond to the search query in a second color or with a second color scheme or setting different from the way in which the representations of objects were displayed prior to detecting the request to search.

The above-described manner of displaying the objects corresponding to the search query and objects that do not correspond to the search query in the navigation user interface element with visual characteristics having different values provides an efficient way of distinguishing representations of objects that match the respective search query, which additionally reduces power usage and improves battery life of the electronic device by enabling the user to use the electronic device more quickly and efficiently (e.g., reducing the number of inputs needed to determine which objects correspond to the search query and which do not).

In some embodiments, while displaying the navigation user interface element (e.g., the navigation user interface element 704*a* in FIG. 7A), the electronic device (e.g., 101) detects (924*a*), via the one or more input devices, an input corresponding to a request to perform a search corresponding to information represented by the navigation user interface element (e.g., 704*a*) based on a respective search query. In some embodiments, the respective search query corresponds to a respective physical location, respective landmark, respective address, etc. In some embodiments, such as in FIG. 7G, in response to detecting the input corresponding to the request to search the navigation user interface element (e.g., 704*b*) based on the respective search query (924*b*), the electronic device (e.g., 101) displays (924*c*), via the display generation component (e.g., 120), a three-dimensional representation (e.g., 708*e*) of a physical object (e.g., and/or location) corresponding to the search query (e.g., within the content element). In some embodiments, the three-dimensional representation is at actual scale with respect to the physical object to which the representation corresponds. In some embodiments, the electronic device displays an indication of the location of the physical object in the navigation user interface element concurrently with the three-dimensional representation of the physical object. In some embodiments, the electronic device displays information about the physical object concurrently with the three-dimensional representation of the physical object. In some embodiments, the electronic device displays the three-dimensional representation of the physical object in response to detecting selection of a representation of the object in the content element or in the navigation user interface element. In some embodiments, the three-dimensional representation is displayed in accordance with one or more steps of method 800.

The above-described manner of displaying the three-dimensional representation of the physical object corresponding to the search query provides an efficient way of identifying the object that corresponds to the search query, which additionally reduces power usage and improves battery life of the electronic device by enabling the user to use the electronic device more quickly and efficiently.

In some embodiments, such as in FIG. 7A, the navigation user interface element (e.g., 704*a*) includes respective content (e.g., 710*a*, 710*b*) (926*a*) (e.g., displayed in three-dimensions). In some embodiments, the navigation user interface element includes representations of physical objects (e.g., buildings, landmarks, roads, infrastructure, geographic features, landforms, bodies of water, plants, natural features) in a physical region. In some embodiments, such as in FIG. 7B, while displaying the navigation user interface element (e.g., 704*b*) that includes the respective content displayed, the electronic device detects (926*b*), via the one or more input devices, movement of a predefined portion (e.g., 728*a*) (e.g., fingers, hand, arm, head, etc.) of the user. In some embodiments, the electronic device presents a representation of the predefined portion of the user in a three-dimensional environment including the user interface. In some embodiments, the representation is a photorealistic representation of the predefined portion of the user displayed via the display generation component of the electronic device (e.g., video or virtual passthrough). In some, the representation is a view of the predefined portion of the user visible through a transparent portion of the display generation component (e.g., real or true passthrough). In some embodiments, such as in FIG. 7B, in response to detecting the movement of the predefined portion (e.g., 728*a*) of the user (926*c*), in accordance with a determination that the predefined portion (e.g., 728*a*) of the user is at a location corresponding to the respective content in the navigation user interface element (e.g., 704*b*) (e.g., the location of the predefined portion of the user in the three-dimensional environment intersects with or is within a threshold distance (e.g., 0.1, 0.2, 0.3, 0.5, 1, 2, 3, 4, 5, 10, etc. centimeters) of the location of the respective content in the three-dimensional environment), the electronic device (e.g., 101) visually deemphasizes (926*d*) (e.g., ceasing display of, flattening, blurring, increasing the translucency of) the respective content in the navigation user interface element (e.g., 704*b*). For example, the electronic device displays the respective content in two dimensions in accordance with the determination that the predefined portion of the user is at the location corresponding to the respective content in the content navigation user interface element while maintaining display of other content in the navigation user interface element in three dimensions. In some embodiments, the electronic device visually deemphasizes the respective content in response to detecting the predefined portion of the user at the location corresponding to the respective content in accordance with one or more steps of method 800.

The above-described manner of visually deemphasizing the respective content in accordance with the determination that the predefined portion of the user is at the location corresponding to the respective content in the navigation user interface element provides an efficient way of maintaining visibility of a representation of the predefined portion of the user, which additionally reduces power usage and improves battery life of the electronic device by enabling the user to use the electronic device more quickly and efficiently (e.g., by providing the user visual feedback of the predefined portion of the user while providing inputs to the electronic device using the predefined portion of the user).

In some embodiments, such as in FIG. 7A, the navigation element (e.g., 704*a*) includes an indication (e.g., 712) of a weather condition (e.g., precipitation, clouds, sunshine, wind, fog, haze) at a respective physical location (e.g., at which the weather condition is occurring, has occurred, or is forecasted to occur) represented by the navigation user interface element (e.g., 704*a*), including an indication (e.g., 712) of a three-dimensional location of the weather condition at the respective physical location (928*a*). In some embodiments, the indication is a pictorial representation of the weather condition displayed at a location in the navigation user interface element. For example, if a respective physical location is experiencing rain, the electronic device displays a representation of a raincloud and rain at the three-dimensional location in the navigation user interface element corresponding to the respective three-dimensional physical location experiencing the rain. As another example, the electronic device displays three-dimensional representations of clouds at three-dimensional locations corresponding to the three-dimensional physical locations of clouds. For example, a representation of a high altitude cloud is an image of a cloud displayed at a position corresponding to a relatively high altitude above the physical location corresponding to the navigation user interface element and a representation of a low altitude cloud is an image of a cloud displayed at a position corresponding to a relatively low altitude above the physical location corresponding to the navigation user interface element. In some embodiments, an indication of a respective weather condition at a respective three-dimensional location in the navigation user interface element is the indication of the weather condition and the indication of the three-dimensional location of the weather condition at the physical location. For example, an indication of a cloud at a first location in the navigation user interface element is an indication of cloudy weather and an indication of the physical location experiencing the cloudy weather and an indication of smog at a second location in the navigation user interface element is an indication of the smog and an indication of the physical location experiencing the smog. The above-described manner of displaying the indication of the weather condition in the navigation user interface element provides an efficient way of presenting weather conditions at one or more physical locations represented by the navigation user interface element, which additionally reduces power usage and improves battery life of the electronic device by enabling the user to use the electronic device more quickly and efficiently (e.g., by reducing the number of inputs needed to view weather conditions at multiple locations concurrently).

In some embodiments, aspects/operations of methods 800 and 900 may be interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can be generated by inferring preferences based on non-personal information data or a bare minimum amount of personal information, such as the content being requested by the device associated with a user, other non-personal information available to the service, or publicly available information.

What is claimed is:

1. A method, comprising:
    at an electronic device in communication with a display generation component and one or more input devices:
        displaying, via the display generation component, a three-dimensional environment including a user interface that includes:

first respective content corresponding to a first view of a first physical location, wherein the first respective content is displayed at a first respective location in the three-dimensional environment, and wherein the first respective content corresponding to the first view of the first physical location is concurrently displayed with a representation of a physical environment of the electronic device and occupies a first portion of a display area of the display generation component; and a navigation user interface element with a first location designated within the navigation user interface element, the first location within the navigation user interface element corresponding to the first physical location, wherein the navigation user interface element is displayed in the three-dimensional environment between the first respective location at which the first respective content is displayed and a viewpoint of a user in the three-dimensional environment, and while displaying, via the display generation component, the user interface and the navigation user interface element, detecting, via the one or more input devices, a user input directed towards the navigation user interface element, the user input corresponding to a request to designate a second location corresponding to a second physical location;

in response to detecting the user input, updating the user interface to include second respective content corresponding to a second view of the second physical location, wherein the second respective content is displayed at the first respective location in the three-dimensional environment; and while displaying, via the display generation component, the first respective content corresponding to the first view of the first physical location occupying the first portion of the display area concurrently with the representation of the physical environment, detecting, via the one or more input devices, a respective input corresponding to a request to obscure display of the representation of the physical environment; and in response to detecting the respective input, obscuring display of the representation of the physical environment, including updating the first respective content to:

correspond to a third view, greater than the first view of the first physical location; and occupy a second portion, greater than the first portion, of the display area of the display generation component.

2. The method of claim 1, wherein:

the three-dimensional environment includes a representation of a surface in a physical environment of the electronic device, and the navigation user interface element is displayed at a location in the three-dimensional environment corresponding to the representation of the surface.

3. The method of claim 1, wherein the navigation user interface element is displayed at a location in the three-dimensional environment that does not correspond to a surface in a physical environment of the electronic device.

4. The method of claim 1, wherein the first respective content is surrounded by a representation of a physical environment of the electronic device, and a boundary between the first respective content and the representation of the physical environment of the electronic device includes a gradual visual transition between the first respective content and the representation of the physical environment of the electronic device.

5. The method of claim 1, further comprising:

while displaying the first respective content corresponding to the first view of the first physical location, detecting, via the one or more input devices, movement of the viewpoint of the user of the electronic device in the three-dimensional environment; and in response to detecting the movement of the viewpoint of the user of the electronic device in the three-dimensional environment, in accordance with a determination that a gaze of the user was directed to the first respective content when the movement of the viewpoint of the user was detected, updating display of the first view of the first physical location corresponding to the first respective content with a simulated parallax effect in accordance with the movement of the viewpoint of the user.

6. The method of claim 1, further comprising:

while displaying the first respective content corresponding to the first view of the first physical location, detecting, via the one or more input devices, movement of the electronic device; and in response to detecting the movement of the electronic device, in accordance with a determination that the movement of the electronic device satisfies one or more criteria, displaying, via the display generation component, additional content corresponding to the first physical location.

7. The method of claim 1, further comprising:

while displaying the first respective content corresponding to the first view of the first physical location, detecting, via the one or more input devices, an input directed to a selectable user interface element displayed in the user interface; and in response to detecting the input directed to the selectable user interface element, displaying third respective content corresponding to a respective view of a respective physical location, wherein the third respective content is displayed at the first respective location in the three-dimensional environment.

8. The method of claim 1, further comprising:

while displaying the first respective content corresponding to the first view of the first physical location, detecting movement of the electronic device relative to the three-dimensional environment; and in accordance with a determination that the movement of the electronic device relative to the three-dimensional environment satisfies one or more criteria, displaying, via the display generation component, additional content corresponding to the first physical location; and in accordance with a determination that the movement of the electronic device relative to the three-dimensional environment does not satisfy the one or more criteria, forgoing displaying of the additional content corresponding to the first physical location.

9. The method of claim 8, wherein the one or more criteria include a criterion that is satisfied based on a change in an orientation of the electronic device and/or a criterion that is satisfied based on whether a gaze of the user is directed to one or more respective objects in the three-dimensional environment.

10. The method of claim 1, wherein the first respective content corresponds to a first field of view having a first orientation, and the method further comprises:
- while displaying the first respective content and displaying, in the navigation user interface element, an indication of the first field of view, detecting, via the one or more input devices, an input corresponding to a request to display third respective content that corresponds to a second field of view having a second orientation; and
- in response detecting the input corresponding to the request to display the third respective content that corresponds to the second field of view having the second orientation:
  - displaying, via the display generation component, the third respective content; and
  - updating, in the navigation user interface element, the indication of the first field of view to be an indication of the second field of view.

11. The method of claim 1, further comprising:
- in accordance with a determination that a physical environment of the electronic device satisfies one or more criteria, including a criterion that is satisfied based on an amount of unobstructed space around the electronic device in the physical environment of the electronic device, displaying the navigation user interface element at a first size in the three-dimensional environment; and
- in accordance with a determination that the physical environment of the electronic device does not satisfy the one or more criteria, displaying the navigation user interface element at a second size, different from the first size, in the three-dimensional environment.

12. The method of claim 1, wherein the navigation user interface element includes a first respective portion displayed in three dimensions in the three-dimensional environment, and a second respective portion displayed in two dimensions in the three-dimensional environment, wherein the first respective portion is closer to the viewpoint of the user than the second respective portion.

13. The method of claim 1, wherein:
- while displaying the first respective content:
  - the navigation user interface element corresponds to a first physical region including the first physical location, and
  - the navigation user interface element includes an indication of a topography of the first physical region.

14. The method of claim 1, wherein the navigation user interface element includes respective content displayed in three dimensions, and the method further comprises:
- while displaying the navigation user interface element that includes the respective content displayed in three dimensions, detecting, via the one or more input devices, movement of a predefined portion of the user; and
- in response to detecting the movement of the predefined portion of the user:
  - in accordance with a determination that the predefined portion of the user is at a location corresponding to the respective content displayed in three dimensions in the navigation user interface element, updating the navigation user interface element to visually de-emphasize the respective content displayed in three dimensions.

15. The method of claim 1, further comprising:
- displaying, within the navigation user interface element, an indication of a second electronic device displayed at a respective location within the navigation user interface element corresponding to a respective physical location of the second electronic device;
- while displaying the indication of the second electronic device in the navigation user interface element, detecting, via the one or more input devices, selection of the indication of the second electronic device; and
- in response to detecting the selection of the indication of the second electronic device, displaying, via the display generation component, content captured by the second electronic device of the respective physical location of the second electronic device.

16. The method of claim 1, wherein the first respective content includes a two-dimensional representation of an object located at the first physical location, the method further comprising:
- concurrently displaying the first respective content including the two-dimensional representation of the object, and a three-dimensional representation of the object.

17. An electronic device, comprising:
- one or more processors;
- memory; and
- one or more programs, wherein the one or more programs are stored in the memory and configured to be executed by the one or more processors, the one or more programs including instructions for:
- displaying, via a display generation component, a three-dimensional environment including a user interface that includes:
  - first respective content corresponding to a first view of a first physical location, wherein the first respective content is displayed at a first respective location in the three-dimensional environment, and wherein the first respective content corresponding to the first view of the first physical location is concurrently displayed with a representation of a physical environment of the electronic device and occupies a first portion of a display area of the display generation component; and
  - a navigation user interface element with a first location designated within the navigation user interface element, the first location within the navigation user interface element corresponding to the first physical location, wherein the navigation user interface element is displayed in the three-dimensional environment between the first respective location at which the first respective content is displayed and a viewpoint of a user in the three-dimensional environment, and
- while displaying, via the display generation component, the user interface and the navigation user interface element, detecting, via one or more input devices, a user input directed towards the navigation user interface element, the user input corresponding to a request to designate a second location corresponding to a second physical location;
- in response to detecting the user input, updating the user interface to include second respective content corresponding to a second view of the second physical location, wherein the second respective content is displayed at the first respective location in the three-dimensional environment; and
- while displaying, via the display generation component, the first respective content corresponding to the first view of the first physical location occupying the first portion of the display area concurrently with the representation of the physical environment, detecting, via the one or more input devices, a respective input corresponding to a request to obscure display of the representation of the physical environment; and in response to detecting the respective input, obscuring display of the representation of the physical environment, including updating the first respective content to:
correspond to a third view, greater than the first view of the first physical location; and
occupy a second portion, greater than the first portion, of the display area of the display generation component.

18. A non-transitory computer readable storage medium storing one or more programs, the one or more programs comprising instructions, which when executed by one or more processors of an electronic device, cause the electronic device to perform a method comprising:

displaying, via a display generation component, a three-dimensional environment including a user interface that includes:
first respective content corresponding to a first view of a first physical location, wherein the first respective content is displayed at a first respective location in the three-dimensional environment, and wherein the first respective content corresponding to the first view of the first physical location is concurrently displayed with a representation of a physical environment of the electronic device and occupies a first portion of a display area of the display generation component; and
a navigation user interface element with a first location designated within the navigation user interface element, the first location within the navigation user interface element corresponding to the first physical location, wherein the navigation user interface element is displayed in the three-dimensional environment between the first respective location at which the first respective content is displayed and a viewpoint of a user in the three-dimensional environment, and
while displaying, via the display generation component, the user interface and the navigation user interface element, detecting, via one or more input devices, a user input directed towards the navigation user interface element, the user input corresponding to a request to designate a second location corresponding to a second physical location;
in response to detecting the user input, updating the user interface to include second respective content corresponding to a second view of the second physical location, wherein the second respective content is displayed at the first respective location in the three-dimensional environment; and
while displaying, via the display generation component, the first respective content corresponding to the first view of the first physical location occupying the first portion of the display area concurrently with the representation of the physical environment, detecting, via the one or more input devices, a respective input corresponding to a request to obscure display of the representation of the physical environment; and
in response to detecting the respective input, obscuring display of the representation of the physical environment, including updating the first respective content to:
correspond to a third view, greater than the first view of the first physical location; and
occupy a second portion, greater than the first portion, of the display area of the display generation component.

19. The electronic device of claim 17, wherein:
the three-dimensional environment includes a representation of a surface in a physical environment of the electronic device, and
the navigation user interface element is displayed at a location in the three-dimensional environment corresponding to the representation of the surface.

20. The electronic device of claim 17, wherein the navigation user interface element is displayed at a location in the three-dimensional environment that does not correspond to a surface in a physical environment of the electronic device.

21. The electronic device of claim 17, wherein the first respective content is surrounded by a representation of a physical environment of the electronic device, and a boundary between the first respective content and the representation of the physical environment of the electronic device includes a gradual visual transition between the first respective content and the representation of the physical environment of the electronic device.

22. The electronic device of claim 17, wherein the one or more programs further include instructions for:
while displaying the first respective content corresponding to the first view of the first physical location, detecting, via the one or more input devices, movement of the viewpoint of the user of the electronic device in the three-dimensional environment; and
in response to detecting the movement of the viewpoint of the user of the electronic device in the three-dimensional environment, in accordance with a determination that a gaze of the user was directed to the first respective content when the movement of the viewpoint of the user was detected, updating display of the first view of the first physical location corresponding to the first respective content with a simulated parallax effect in accordance with the movement of the viewpoint of the user.

23. The electronic device of claim 17, wherein the one or more programs further include instructions for:
while displaying the first respective content corresponding to the first view of the first physical location, detecting, via the one or more input devices, movement of the electronic device; and
in response to detecting the movement of the electronic device, in accordance with a determination that the movement of the electronic device satisfies one or more criteria, displaying, via the display generation component, additional content corresponding to the first physical location.

24. The electronic device of claim 17, wherein the one or more programs further include instructions for:
while displaying the first respective content corresponding to the first view of the first physical location, detecting, via the one or more input devices, an input directed to a selectable user interface element displayed in the user interface; and
in response to detecting the input directed to the selectable user interface element, displaying third respective content corresponding to a respective view of a respective physical location, wherein the third respective content is displayed at the first respective location in the three-dimensional environment.

25. The electronic device of claim 17, wherein the one or more programs further include instructions for:
- while displaying the first respective content corresponding to the first view of the first physical location, detecting movement of the electronic device relative to the three-dimensional environment; and
- in accordance with a determination that the movement of the electronic device relative to the three-dimensional environment satisfies one or more criteria, displaying, via the display generation component, additional content corresponding to the first physical location; and
- in accordance with a determination that the movement of the electronic device relative to the three-dimensional environment does not satisfy the one or more criteria, forgoing displaying of the additional content corresponding to the first physical location.

26. The electronic device of claim 25, wherein the one or more criteria include a criterion that is satisfied based on a change in an orientation of the electronic device and/or a criterion that is satisfied based on whether a gaze of the user is directed to one or more respective objects in the three-dimensional environment.

27. The electronic device of claim 17, wherein the first respective content corresponds to a first field of view having a first orientation, and the one or more programs further include instructions for:
- while displaying the first respective content and displaying, in the navigation user interface element, an indication of the first field of view, detecting, via the one or more input devices, an input corresponding to a request to display third respective content that corresponds to a second field of view having a second orientation; and
- in response detecting the input corresponding to the request to display the third respective content that corresponds to the second field of view having the second orientation:
  - displaying, via the display generation component, the third respective content; and
  - updating, in the navigation user interface element, the indication of the first field of view to be an indication of the second field of view.

28. The electronic device of claim 17, wherein the one or more programs further include instructions for:
- in accordance with a determination that a physical environment of the electronic device satisfies one or more criteria, including a criterion that is satisfied based on an amount of unobstructed space around the electronic device in the physical environment of the electronic device, displaying the navigation user interface element at a first size in the three-dimensional environment; and
- in accordance with a determination that the physical environment of the electronic device does not satisfy the one or more criteria, displaying the navigation user interface element at a second size, different from the first size, in the three-dimensional environment.

29. The electronic device of claim 17, wherein the navigation user interface element includes a first respective portion displayed in three dimensions in the three-dimensional environment, and a second respective portion displayed in two dimensions in the three-dimensional environment, wherein the first respective portion is closer to the viewpoint of the user than the second respective portion.

30. The electronic device of claim 17, wherein:
- while displaying the first respective content:
  - the navigation user interface element corresponds to a first physical region including the first physical location, and
  - the navigation user interface element includes an indication of a topography of the first physical region.

31. The electronic device of claim 17, wherein the navigation user interface element includes respective content displayed in three dimensions, and the one or more programs further include instructions for:
- while displaying the navigation user interface element that includes the respective content displayed in three dimensions, detecting, via the one or more input devices, movement of a predefined portion of the user; and
- in response to detecting the movement of the predefined portion of the user:
  - in accordance with a determination that the predefined portion of the user is at a location corresponding to the respective content displayed in three dimensions in the navigation user interface element, updating the navigation user interface element to visually de-emphasize the respective content displayed in three dimensions.

32. The electronic device of claim 17, wherein the one or more programs further include instructions for:
- displaying, within the navigation user interface element, an indication of a second electronic device displayed at a respective location within the navigation user interface element corresponding to a respective physical location of the second electronic device;
- while displaying the indication of the second electronic device in the navigation user interface element, detecting, via the one or more input devices, selection of the indication of the second electronic device; and
- in response to detecting the selection of the indication of the second electronic device, displaying, via the display generation component, content captured by the second electronic device of the respective physical location of the second electronic device.

33. The electronic device of claim 17, wherein the first respective content includes a two-dimensional representation of an object located at the first physical location, and the one or more programs further include instructions for:
- concurrently displaying the first respective content including the two-dimensional representation of the object, and a three-dimensional representation of the object.

34. The non-transitory computer readable storage medium of claim 18, wherein:
- the three-dimensional environment includes a representation of a surface in a physical environment of the electronic device, and
- the navigation user interface element is displayed at a location in the three-dimensional environment corresponding to the representation of the surface.

35. The non-transitory computer readable storage medium of claim 18, wherein the navigation user interface element is displayed at a location in the three-dimensional environment that does not correspond to a surface in a physical environment of the electronic device.

36. The non-transitory computer readable storage medium of claim 18, wherein the first respective content is surrounded by a representation of a physical environment of the electronic device, and a boundary between the first respective content and the representation of the physical environment of the electronic device includes a gradual visual transition between the first respective content and the representation of the physical environment of the electronic device.

37. The non-transitory computer readable storage medium of claim 18, wherein the method further comprises:
    while displaying the first respective content corresponding to the first view of the first physical location, detecting, via the one or more input devices, movement of the viewpoint of the user of the electronic device in the three-dimensional environment; and
    in response to detecting the movement of the viewpoint of the user of the electronic device in the three-dimensional environment, in accordance with a determination that a gaze of the user was directed to the first respective content when the movement of the viewpoint of the user was detected, updating display of the first view of the first physical location corresponding to the first respective content with a simulated parallax effect in accordance with the movement of the viewpoint of the user.

38. The non-transitory computer readable storage medium of claim 18, wherein the method further comprises:
    while displaying the first respective content corresponding to the first view of the first physical location, detecting, via the one or more input devices, movement of the electronic device; and
    in response to detecting the movement of the electronic device, in accordance with a determination that the movement of the electronic device satisfies one or more criteria, displaying, via the display generation component, additional content corresponding to the first physical location.

39. The non-transitory computer readable storage medium of claim 18, wherein the method further comprises:
    while displaying the first respective content corresponding to the first view of the first physical location, detecting, via the one or more input devices, an input directed to a selectable user interface element displayed in the user interface; and
    in response to detecting the input directed to the selectable user interface element, displaying third respective content corresponding to a respective view of a respective physical location, wherein the third respective content is displayed at the first respective location in the three-dimensional environment.

40. The non-transitory computer readable storage medium of claim 18, wherein the method further comprises:
    while displaying the first respective content corresponding to the first view of the first physical location, detecting movement of the electronic device relative to the three-dimensional environment; and
    in accordance with a determination that the movement of the electronic device relative to the three-dimensional environment satisfies one or more criteria, displaying, via the display generation component, additional content corresponding to the first physical location; and
    in accordance with a determination that the movement of the electronic device relative to the three-dimensional environment does not satisfy the one or more criteria, forgoing displaying of the additional content corresponding to the first physical location.

41. The non-transitory computer readable storage medium of claim 40, wherein the one or more criteria include a criterion that is satisfied based on a change in an orientation of the electronic device and/or a criterion that is satisfied based on whether a gaze of the user is directed to one or more respective objects in the three-dimensional environment.

42. The non-transitory computer readable storage medium of claim 18, wherein the first respective content corresponds to a first field of view having a first orientation, and the method further comprises:
    while displaying the first respective content and displaying, in the navigation user interface element, an indication of the first field of view, detecting, via the one or more input devices, an input corresponding to a request to display third respective content that corresponds to a second field of view having a second orientation; and
    in response detecting the input corresponding to the request to display the third respective content that corresponds to the second field of view having the second orientation:
        displaying, via the display generation component, the third respective content; and
        updating, in the navigation user interface element, the indication of the first field of view to be an indication of the second field of view.

43. The non-transitory computer readable storage medium of claim 18, wherein the method further comprises:
    in accordance with a determination that a physical environment of the electronic device satisfies one or more criteria, including a criterion that is satisfied based on an amount of unobstructed space around the electronic device in the physical environment of the electronic device, displaying the navigation user interface element at a first size in the three-dimensional environment; and
    in accordance with a determination that the physical environment of the electronic device does not satisfy the one or more criteria, displaying the navigation user interface element at a second size, different from the first size, in the three-dimensional environment.

44. The non-transitory computer readable storage medium of claim 18, wherein the navigation user interface element includes a first respective portion displayed in three dimensions in the three-dimensional environment, and a second respective portion displayed in two dimensions in the three-dimensional environment, wherein the first respective portion is closer to the viewpoint of the user than the second respective portion.

45. The non-transitory computer readable storage medium of claim 18, wherein:
    while displaying the first respective content:
        the navigation user interface element corresponds to a first physical region including the first physical location, and
        the navigation user interface element includes an indication of a topography of the first physical region.

46. The non-transitory computer readable storage medium of claim 18, wherein the navigation user interface element includes respective content displayed in three dimensions, and the method further comprises:
    while displaying the navigation user interface element that includes the respective content displayed in three dimensions, detecting, via the one or more input devices, movement of a predefined portion of the user; and
    in response to detecting the movement of the predefined portion of the user:
        in accordance with a determination that the predefined portion of the user is at a location corresponding to the respective content displayed in three dimensions in the navigation user interface element, updating the navigation user interface element to visually de-emphasize the respective content displayed in three dimensions.

47. The non-transitory computer readable storage medium of claim 18, wherein the method further comprises:
- displaying, within the navigation user interface element, an indication of a second electronic device displayed at a respective location within the navigation user interface element corresponding to a respective physical location of the second electronic device;
- while displaying the indication of the second electronic device in the navigation user interface element, detecting, via the one or more input devices, selection of the indication of the second electronic device; and
- in response to detecting the selection of the indication of the second electronic device, displaying, via the display generation component, content captured by the second electronic device of the respective physical location of the second electronic device.

48. The non-transitory computer readable storage medium of claim 18, wherein the first respective content includes a two-dimensional representation of an object located at the first physical location, and the method further comprises:
- concurrently displaying the first respective content including the two-dimensional representation of the object, and a three-dimensional representation of the object.

* * * * *